US012471566B2

(12) United States Patent
Franklin et al.

(10) Patent No.: US 12,471,566 B2
(45) Date of Patent: Nov. 18, 2025

(54) AUTOMATIC ANIMAL FEEDING SYSTEM FOR PRESENTING AND SECURING FOOD PODS

(71) Applicant: PAWS FORWARD INC., Austin, TX (US)

(72) Inventors: Peter Franklin, Austin, TX (US); Jeffrey Pon, Southlake, TX (US); Matthew Firlik, Buena Park, CA (US); Eric Liu, Houston, TX (US); George Turvey, Brookdale, CA (US); Charles Putland, Ben Lomond, CA (US)

(73) Assignee: PAWS FORWARD INC., Austin, TX (US)

( * ) Notice: Subject to any disclaimer, the term of this patent is extended or adjusted under 35 U.S.C. 154(b) by 0 days.

(21) Appl. No.: 18/464,977

(22) Filed: Sep. 11, 2023

(65) Prior Publication Data

US 2024/0081280 A1 Mar. 14, 2024

Related U.S. Application Data

(60) Provisional application No. 63/375,651, filed on Sep. 14, 2022.

(51) Int. Cl.
*A01K 5/02* (2006.01)
*A01K 5/01* (2006.01)
(Continued)

(52) U.S. Cl.
CPC .......... *A01K 5/0283* (2013.01); *A01K 5/0114* (2013.01); *A01K 5/0121* (2013.01);
(Continued)

(58) Field of Classification Search
CPC .. A01K 5/0142; A01K 5/0283; A01K 5/0233; A01K 5/0291; A01K 5/02;
(Continued)

(56) References Cited

U.S. PATENT DOCUMENTS 2,528,742 A 11/1950 Coffing
4,248,175 A 2/1981 Navarro
(Continued)

FOREIGN PATENT DOCUMENTS

WO 2021/225531 A1 11/2021

OTHER PUBLICATIONS

Non-Final Office Action received for U.S. Appl. No. 18/464,966, mailed on Dec. 26, 2024, 14 pages.
(Continued)

*Primary Examiner* — Peter M Poon
*Assistant Examiner* — Sahar Almatrahi
(74) *Attorney, Agent, or Firm* — Shook, Hardy & Bacon L.L.P.

(57) ABSTRACT

An automatic animal feeding system is provided. Embodiments of the automatic animal feeding system include an automatic food dispenser and a food canister storing food pods. The automatic food dispenser couples to the food canister, receives a food pod form the food canister, removes a cover or lid from the food pod, presents the opened food pod for pet consumption, disposes of the food pod into a disposal compartment that is sealed off from the ambient air, and implements other steps of an automatic feeding process. Aspects of the automatic feeding process can be efficiently implemented, for example, by actuating two motors based on data received from sensors of the automatic animal feeding system. Accordingly, embodiments of the present disclosure provide a compact, control-efficient, self-cleaning automatic animal feeding system that can continuously personalize feeding patterns or feed a pet with little to no human intervention over a period of time.

11 Claims, 34 Drawing Sheets

(51) Int. Cl.
*A01K 29/00* (2006.01)
*G06F 21/44* (2013.01)
*G06V 10/77* (2022.01)
*B67B 7/00* (2006.01)

(52) U.S. Cl.
CPC .......... *A01K 5/0128* (2013.01); *A01K 5/0208* (2013.01); *A01K 5/0225* (2013.01); *A01K 5/0233* (2013.01); *A01K 5/025* (2013.01); *A01K 5/0275* (2013.01); *A01K 5/0291* (2013.01); *A01K 29/005* (2013.01); *G06F 21/44* (2013.01); *G06V 10/7715* (2022.01); *B67B 7/38* (2013.01)

(58) Field of Classification Search
CPC .. A01K 5/0114; A01K 5/0121; A01K 5/0128; A01K 5/0135
USPC ....................................................... 119/57.92
See application file for complete search history.

(56) References Cited

U.S. PATENT DOCUMENTS

| | | |
|---|---|---|
| 4,249,483 A | 2/1981 | Sobky |
| 4,421,059 A | 12/1983 | Cousino |
| 4,617,874 A | 10/1986 | Zammarano |
| 4,671,210 A | 6/1987 | Robinson et al. |
| 5,150,664 A | 9/1992 | Kirk |
| 5,176,103 A | 1/1993 | Reid et al. |
| 6,349,671 B1 | 2/2002 | Lewis et al. |
| 7,650,855 B2 | 1/2010 | Krishnamurthy |
| 8,220,413 B2 | 7/2012 | Laro |
| 8,800,488 B2 | 8/2014 | Stone |
| 9,930,866 B2 | 4/2018 | Deritis et al. |
| 10,479,566 B2 | 11/2019 | Doyle et al. |
| 10,517,267 B2 | 12/2019 | Gordon et al. |
| 10,568,301 B2 | 2/2020 | Chen |
| 10,743,517 B2 | 8/2020 | Springer et al. |
| 11,363,798 B2 | 6/2022 | Oates |
| 11,712,022 B2 | 8/2023 | Zhu |
| D1,027,057 S | 5/2024 | Wu |
| 12,058,982 B2 | 8/2024 | Qiu |
| 12,127,534 B1 | 10/2024 | Quick et al. |
| 2008/0289580 A1 | 11/2008 | Krishnamurthy |
| 2012/0060761 A1 | 3/2012 | Laro |
| 2016/0174521 A1* | 6/2016 | Davis ..................... A01K 15/02 119/57.92 |
| 2017/0035025 A1 | 2/2017 | Oates |
| 2017/0055492 A1* | 3/2017 | Lowenthal ........... A01K 5/0114 |
| 2017/0202178 A1 | 7/2017 | Gordon et al. |
| 2020/0253162 A1 | 8/2020 | Vachula et al. |
| 2021/0176957 A1 | 6/2021 | List |

OTHER PUBLICATIONS

Non-Final Office Action received for U.S. Appl. No. 18/464,974, mailed on Feb. 13, 2025, 9 pages.
Notice of Allowance received for U.S. Appl. No. 18/464,984, mailed on Feb. 5, 2025, 8 pages.

\* cited by examiner

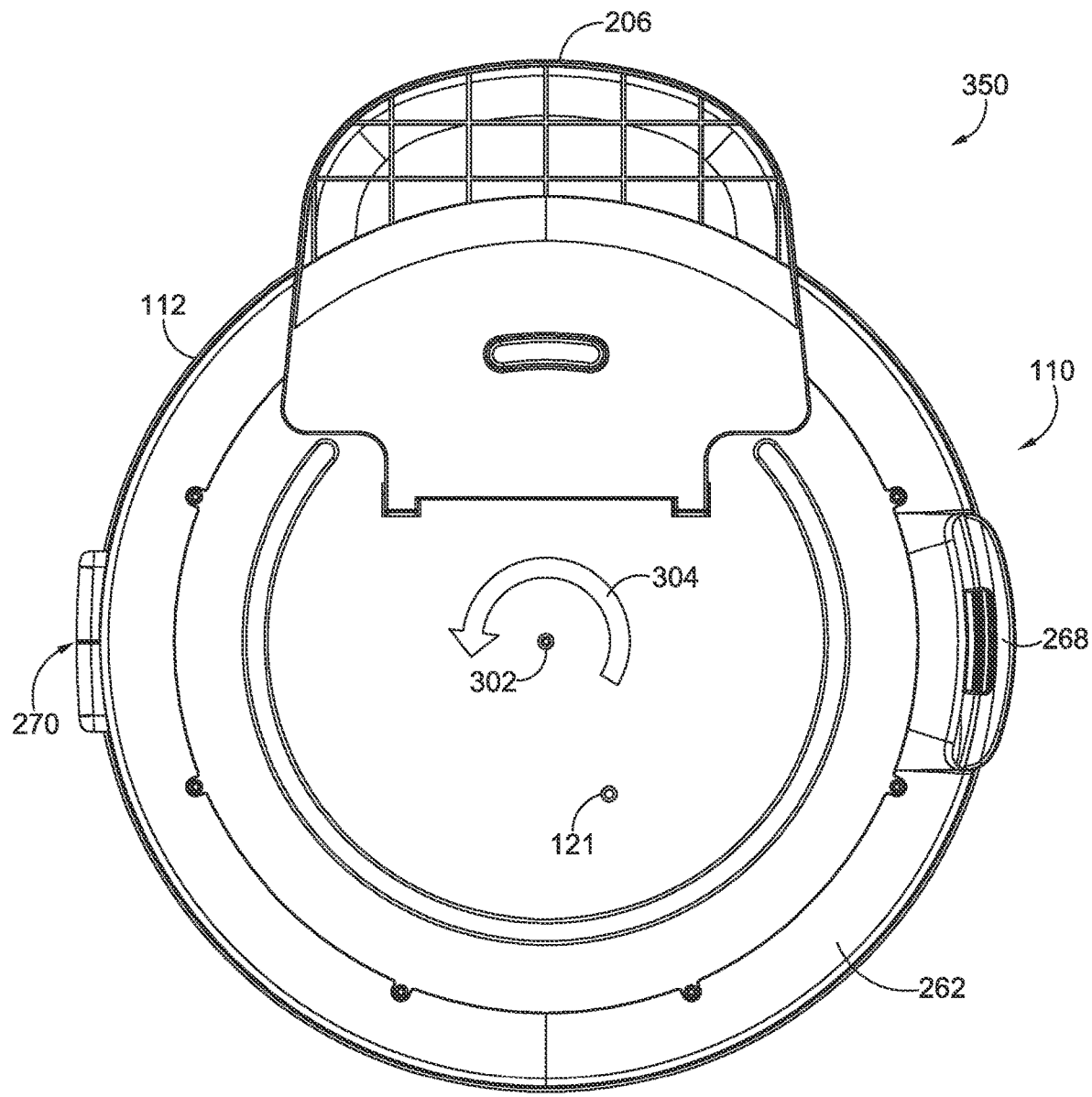
FIG. 3F
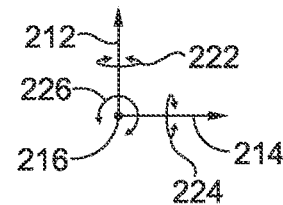

AUTOMATIC ANIMAL FEEDING SYSTEM FOR PRESENTING AND SECURING FOOD PODS

CROSS-REFERENCE TO RELATED APPLICATIONS

This application claims priority to U.S. Provisional Application No. 63/375,651, filed on Sep. 14, 2022, the entire contents of which is incorporated by reference herein.

TECHNICAL FIELD

The present disclosure relates generally to automatic animal feeding systems, methods, and computer storage media. More particularly, the present disclosure relates to an automatic animal feeding system that implements an automatic feeding process with minimal human intervention.

BACKGROUND

Animals, such as cats, dogs, rabbits, guinea pigs, and others, can serve as companionship pets for human pet owners. Typically, pets consume their food out of a bowl or other feeding container that a pet owner manually fills with food. To feed their pets, pet owners typically perform a manual pet feeding process whereby a pet owner manually measures the pet food, manually deposits the pet food inside the bowl, and manually places the bowl within reach of the pet. Thereafter, the pet owner leaves the pet to consume the food on the pet's own accord with little to no supervision. In this regard, conventional feeding processes are largely iterative manual processes whereby human efforts are expended on preparing and filling up a bowl for every meal, but little to no effort is expended on monitoring the pet during food consumption. To make matters worse, conventional pet food products come in the form of dried pellets, such as kibble, which is typically exposed to open air and can lose freshness. Accordingly, certain pets grow preferences for wet food.

SUMMARY

Embodiments of the present disclosure relate to automatic feeder systems for animals. More specifically, systems and methods are disclosed relating to systems for automatic dispensing and disposing of prepackaged servings of pet food. Conventional automatic animal feeder systems are generally limited to the dispensing of dry foods. However, feeding wet food to one's pet can offer a plethora of health benefits. For instance, wet pet foods can give pet owners assurances that their pets are receiving healthier and fresher ingredients in their meals. Wet pet foods also facilitate an increase in water intake, can be easier for pets to digest, and generally provide more variety.

In various embodiments, an automatic animal feeding system is provided. The automatic animal feeding system can include a food canister that can store a plurality of prepackaged servings of wet pet food (referred to herein, in at least one example, as "food pods") and an automatic food dispenser. At a high level, the automatic food dispenser can receive the food canister, remove an individual prepackaged serving of wet pet food from the food canister, remove a cover (in one example, also or alternatively referred to as a "lid" or a "top cover") from the prepackaged serving of wet pet food, and present the opened serving of wet pet food to the pet for consumption. Upon instruction, or after a predefined period of time, the automatic food dispenser can dispose of the opened serving of wet pet food into a retractable or removable disposal tray. Embodiments of the disposal tray can include one or more pod chambers that receive the opened servings of wet pet food that have been disposed.

In some further embodiments, the dispenser of the automatic animal feeding system includes a computing device that employs "smart" or otherwise intelligent features to learn and identify pet food preferences, determine feeding speeds or patterns, determine quantity (e.g., weight) of food consumed, and generally analyze pet behaviors during or after feeding, among other things. The computing device of the automatic animal feeding system can perform the smart features, either alone or in communication with one or more remote devices of a distributed computing system, such as a cloud-based computing infrastructure. For example, certain smart features of the automatic animal feeding system are employed in a distributed computing system, such as a cloud-based infrastructure.

In one embodiment, an automatic pet feeding system that implements an automatic feeding process is provided. The automatic pet feeding system includes a rotary plate positioned within an enclosure, configured to rotate about an axis, and that includes a food pod holder positioned a radial distance away from the axis. The food pod holder corresponds to a vertical opening extending along a height of the rotary plate, and the food pod holder coaxially aligns with a feeding port on the enclosure. The automatic pet feeding system includes a food canister comprising a food pod positioned within the food canister at the radial distance away from the axis. The food pod is gravity fed from the food canister into the food pod holder when the food pod holder coaxial aligns with the food pod at the radial distance.

In another embodiment, a system includes a rotary plate, a food canister, a base rotation motor, and a control system. The rotary plate is positioned within an enclosure and includes a food pod holder. The food canister includes a food pod that is positioned within the food canister and that is gravity fed from the food canister into the food pod holder when the food pod holder coaxial aligns with the food pod. The base rotation motor is actuatable to cause the rotary plate to rotate about an axis. The control system includes one or more processors and computer memory having computer-readable instructions embodied thereon, that, when executed by at least one processor of the one or more processors, causes the control system to generate and send a first control signal causing the base rotation motor to actuate to cause the rotary plate to rotate until the food pod holder of the rotary plate is positioned under the food canister.

In yet another embodiment, a computer-implemented method implemented by an automatic animal feeding system is provided. The computer-implemented method includes generating and sending a first control signal to a base rotation motor of the automatic animal feeding system, such that the base rotation motor actuates to control rotation of a rotary plate until a food pod holder of the rotary plate coaxial aligns with a food canister based on the first control signal. The computer implemented method includes generating and sending a second control signal to the base rotation motor. The base rotation motor actuates, based on the second control signal, to cause the rotary plate to rotate until the food pod holder of the rotary plate is below a feeding port corresponding to an opening of an enclosure of the automatic animal feeding system. The food pod holder, the feeding port, and the food canister are radially equidistant from an axis of rotation of the rotary plate.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present disclosure is described in detail below with reference to the attached drawing figures, wherein:

FIG. 3F is a bottom view of an automatic animal feeding system, in accordance with embodiments of the present disclosure;

DETAILED DESCRIPTION

Figure 1:
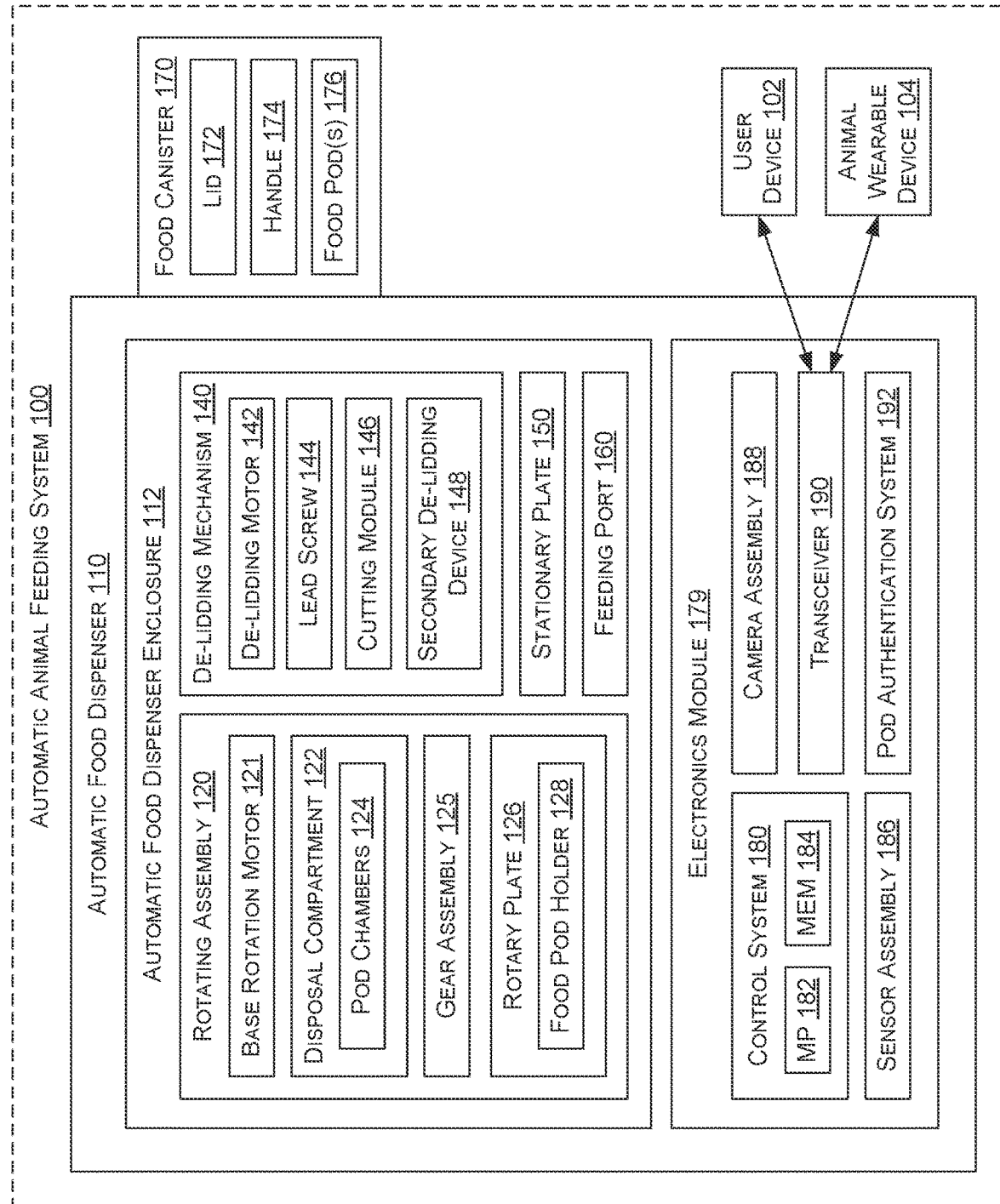
FIG. 1 is a block diagram of an example automatic animal feeding system, in accordance with embodiments of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, such as to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. The method(s) described herein may comprise a computing process performed using any combination of hardware, firmware, and/or software. For example, various functions are carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Conventional automatic feeding devices generally dispense dry foods, such as kibble. It is no surprise that these automatic animal feeder systems are limited to such dry foods, as the dehydrated nature of dry pet food eliminates problems associated with food storage, bacterial growth, or food odor. However, certain dry foods suffer from certain drawbacks, such as having less nutrient density, containing more added preservatives, having lower moisture (which may dehydrate an animal), being tougher on animal teeth, and often failing to satisfy an animal's appetite, among other drawbacks. Feeding wet food to one's pet, on the other hand, can offer a plethora of health benefits. For instance, certain wet pet foods generally include healthier and fresher ingredients, facilitate an increase in water intake, improve pet energy and mood, and facilitate easier digestion, among many other benefits. Developing an alternative and efficient feeding device that automatically presents wet food (or a combination of wet and another type of food) may be desirable, but difficult to achieve in practice. Indeed, certain existing feeding devices attempt to offer a wet food feeding alternative. However, those existing feeding devices have their shortcomings. More specifically, conventional automatic wet food feeder systems require constant human engagement, fail to avoid odors, do not provide a system for ensuring constant food freshness and quality, are difficult to clean, do not self-dispose of used food, and fail to include control logic for implementing a "smart" feeding process that adapts to the pet's particular moods and feeding patterns, the improvements of which are difficult to achieve in practice.

To improve upon this technology, aspects of the disclosed embodiments provide a compact, control-efficient, self-cleaning automatic animal/pet feeding system that can reliably feed a pet with little to no human intervention over a period of time. Indeed, embodiments of the present disclosure are directed to an automatic animal feeding system and methods for automatically dispensing and disposing of prepackaged servings of wet pet food in a "smart" manner, accounting for specific pet preferences. In at least one example, these prepackaged servings of wet pet food are referred to as "food pods." However, certain embodiments disclosed herein are not limited to food pods containing only wet pet food. Indeed, certain embodiments disclosed herein can be used in the context of food pods containing wet food, dry food, liquid, medication, or any combination thereof, among other possible types of consumables. Additionally, certain embodiments disclosed herein are not limited to food pods, and are applicable to other methods for delivering food alternative to food pods. Moreover, any reference to a "pet" or "pets" is not limited to any particular animal, as the disclosed embodiments may be applicable to any animal that may benefit from the disclosed aspects of the automated feeding systems.

In some embodiments, the automatic animal feeding system includes an automatic food dispenser and a food canister. In one example, the "automatic food dispenser" refers to an assembly that performs one or more steps associated with an automatic feeding process. In one example, an "automatic feeding process" refers to a collection of tasks associated with feeding an animal, such as a pet. In accordance with some embodiments, the collection of tasks can be automatically performed by the automatic food dispenser without human input or interaction, with minimal human input or interaction, or even based on the pet's mood and feeding patterns. However, it should be understood that other system entities, such as a food canister, a user device, an animal wearable device, a user, or other aspects disclosed herein may provide inputs or perform actions to facilitate performing aspects of the automatic feeding process. An example automatic feeding process includes receiving unopened food pods, opening or removing a lid from food pods, making the opened food pods accessible for pet consumption, and disposing of used food pods into a disposal compartment, among other or alternative tasks associated with performing the automatic feeding process.

In one example, the "food canister" refers to an assembly that is sized to hold a plurality of unopened food pods until the unopened food pods are directed to any suitable position by the automatic food dispenser. In one example, the unopened food pods are individually gravity-fed into the automatic food dispenser so that the automatic food dispenser can direct the food pod to one or more target positions along a predefined path. In some embodiments, the food canister is removable from the automatic food dispenser. In one example, the food canister is removed from the automatic food dispenser to access the inside of the food canister and fill the food canister with food pods. In another example, the food canister is filled with food pods by removing a lid of the food canister and filling the inside of the food canister with food pods, without removing the food canister from the food dispenser.

Embodiments of the automatic food dispenser include a rotating assembly, a de-lidding mechanism, and an electronics module. In one example, the "rotating assembly" refers to an assembly of components that rotate within an enclosure of the automatic food dispenser. In one example, the rotating assembly includes a base rotation motor and a rotary plate having a food pod holder. In this example, the base rotation motor can be actuated or otherwise activated to cause rotation of the rotary plate and other components of the rotating assembly, as discussed herein. In some embodiments, the food pod holder of the rotary plate receives an unopened food pod from the food canister while the food pod holder is in a pod-loading position. In one example, the food pod is received when the food pod holder is empty (e.g., does not have a food canister) while in the pod-loading position. Alternatively, the food pod is received when the food pod holder includes an opened, empty, or used food pod while in the pod-loading position, such that the newly received food pod is vertically stacked on top of the existing food pod within the food canister. After receiving the unopened food pod, an example base rotation motor further actuates to rotate the rotary plate and change a position of the food pod holder from the pod-loading position to a de-lidding position, or in other words from being coaxially aligned with the food canister to being coaxially aligned with the de-lidding mechanism. In this manner, the unopened food pod positioned in the food pod holder can be directed to the de-lidding mechanism while in the de-lidding position.

In one example, "coaxially aligned" refers to the arrangement of components that share a common axis and are equidistant (e.g., radially equidistant) from the common axis. For example, a first and second component are coaxially aligned when the first and second component are equidistant (e.g., radially equidistant) from the common axis along respective planes substantially orthogonal to the common axis. In this example, the first and second components are coaxially aligned despite being at different vertical positions. Certain components discussed herein, such as the food pod holder, the disposal port, the feeding port, the cutting module, and the food canister, are coaxially aligned to each other, such that they are equidistant with an axis of rotation.

In one example, the "de-lidding mechanism" refers to a device responsible for removing a lid or otherwise opening the unopened food pod while the unopened food pod is in the de-lidding position. In one embodiment, the de-lidding mechanism includes a de-lidding motor that controls motion of a cutting module. For example, the cutting module descends downward onto the unopened food pod to open the food pod based on actuation of the de-lidding motor. The cutting module can pierce the lid and rotate (e.g., about a circumference less than or equal to the unopened food pod lid) to remove the lid from the food pod (e.g., lift the lid off the food pod). In one example, the de-lidding mechanism opens the food pod while the food pod is positioned in or secured by the food pod holder at the de-lidding position of the rotary plate. In one example, the de-lidding mechanism and the food pod holder of the rotary plate are enclosed within an enclosure of the automatic food dispenser while the de-lidding mechanism opens the food pod. In this manner, the freshness of the food inside the food pod can be preserved by not exposing it to the ambient air.

In some embodiments, the base rotation motor further actuates to rotate the rotary plate and change a position of the food pod holder from the de-lidding position to a feeding position, or in other words from being aligned with the de-lidding mechanism to being aligned with a feeding port that exposes a component aligned with the feeding port to the ambient air. In one example, the "feeding port" refers to an opening on the enclosure that aligns with the food pod holder when the rotary plate is rotated to a feeding position. The feeding port, when aligned with the food pod holder, provides access to contents positioned within the food pod holder. In one example, when the food pod is described as being positioned within the food pod holder, it should be understood that the food pod is secured to the food pod holder for transportation to various positions, as described herein.

In one embodiment, when the food pod holder is in the feeding position or otherwise aligned with the feeding port, the food within the opened food pod is accessible to pets for consumption. Alternatively, during actuation of the base rotation motor, the rotary plate can rotate, such that the food pod holder is inside the enclosure of the automatic food dispenser because the food pod holder is not aligned with the feeding port. In this instance, a surface of the rotary plate is exposed to the feeding port. In one embodiment, the surface of the rotary plate remains generally flush with the opening so that the inside of the automatic food dispenser remains sealed or otherwise less exposed to ambient air. Indeed, in some embodiments, the enclosure of the automatic food dispenser creates an seal (e.g., airtight seal) to preserve freshness of food pods positioned within the enclosure, while preventing the escape of certain odors.

Embodiments of the rotating assembly include a disposal compartment on which a plurality of pod chambers are positioned. In one example, the "disposal compartment" refers to a section within the enclosure where the used food pods are disposed or otherwise stored for eventual disposal. In some embodiments, the disposal compartment is isolated or separated (e.g., by the stationary plate described herein) from the rotary plate because the disposal compartment contains used or empty food pods, whereas the rotary plate can contain an unopened or opened food pod. In one example, "pod chambers" refers to individual sections of the disposal compartment that are sized to receive a used food pod from the food pod holder. In one embodiment, the pod chambers are rotatable based on actuation of the base rotation motor of the rotating assembly. In one example, the rotation rate (e.g., angular velocity) of the pod chambers is different from the rotation rate (e.g., angular velocity) of the rotary plate. In some embodiments, a gear ratio between a component associated with the rotary plate and a component associated with the disposal compartment enables different respective rotation rates. In this manner, the pod chambers can alternate between which pod chamber receives a used food pod from the food pod holder of the rotary plate, as described herein. In one example, the pod chamber can refer to one large bin or compartment that accepts all used food pods.

To facilitate control of these components, embodiments of the electronics module of the automatic food dispenser include a control system or controller configured to control any number of motors of the automatic food dispenser. In one embodiment, the control system is communicatively coupled to the base rotation motor to control rotation of the rotating assembly. In a further embodiment, the control system is also or alternatively communicatively coupled to the de-lidding motor. In some embodiments, the automatic feeding process is performed by actuating these two motors, making for a computationally effective technique whereby a control system is not excessively burdened with actuating a large number of components. In some embodiments, actuation of the motors is based on data received from a sensor assembly, a camera assembly, a pod authentication system, or any combination thereof, as disclosed herein. In some embodiments, processing speed is increased by sending or communicating control signals to no more than two motors, as opposed to a larger number of components, to help the disclosed automatic animal feeding system achieve near real-time computation. However, it should be understood that the embodiments disclosed herein are not limited to systems including two or fewer components (e.g., motors) that can be actuated by the control system, and instead are applicable to systems including any suitable number of actuatable components, such as three, four, six, eight, ten, twenty, and so forth, or any number of actuatable components there between.

Figures 8A, 8B, 8C:
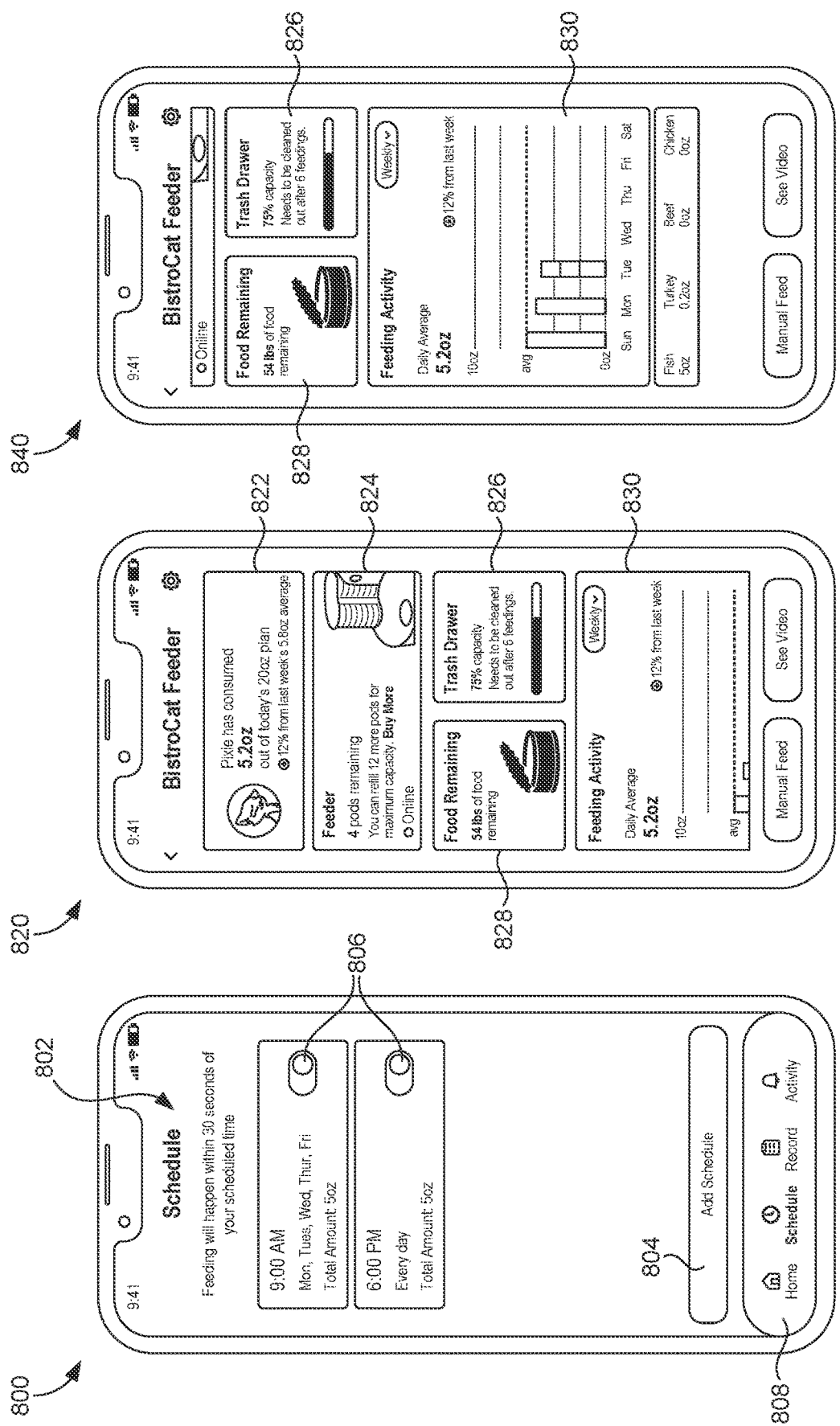
FIGS. 8A, 8B, and 8C are graphical user interfaces displayed on a user device, in accordance with embodiments of the present disclosure.
Figure 17:
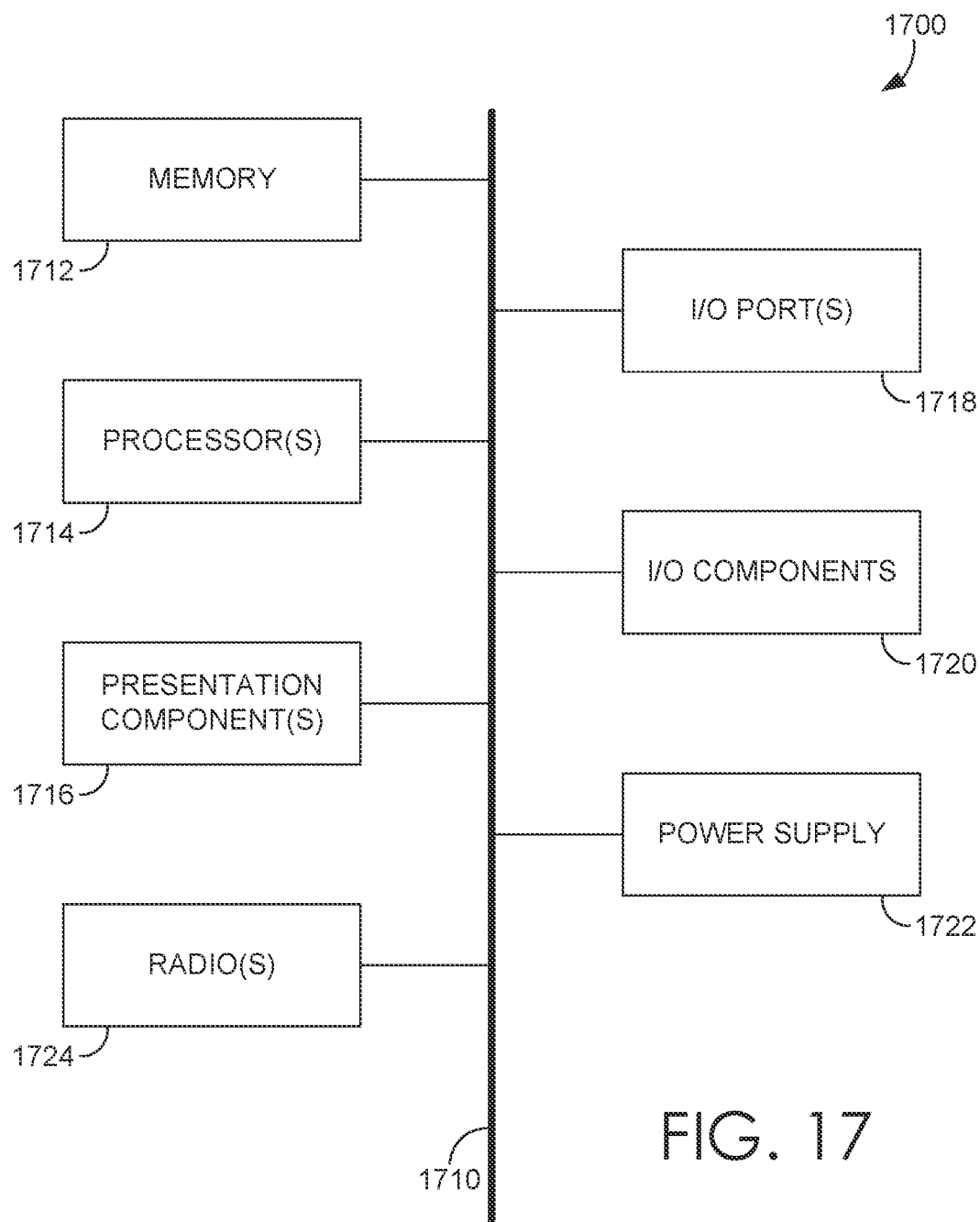
FIG. 17 depicts a block diagram of an example distributed computing environment suitable for use in implementing aspects of the technology described herein.

With regard to the various automatic operations described herein, any of such operations can be initiated or otherwise triggered and managed via a computing device (such as a computing device 1700 described in FIG. 17 configured to allow a user to interact with graphical user interface (GUI) controls, such as those depicted in FIGS. 8A, 8B, and 8C) included in or coupled to the described automatic animal feeding system. In one embodiment, the computing device (as described in FIG. 17) includes components incorporated into the control system discussed herein. Further embodiments are directed to systems and methods for providing a variety of analytics applications and/or services associated with the consumption of the pet food dispensed via the automatic animal feeding system. Similarly, any of such methods can be facilitated via a computing device of the described automatic animal feeding system.

Example Automatic Animal Feeding System

Aspects of the technical solution can be described by way of examples and with reference to FIGS. 1-18. FIG. 1 illustrates a block diagram of an example automatic animal feeding system 100, in accordance with some embodiments of the present disclosure. As used herein and in one example, a "user device" 102 refers to a personal computing device with which a user engages to interact with certain components of the automatic animal feeding system. Example user devices 102 include a mobile device, a laptop, a virtual-reality (VR) or augmented-reality (AR) headset, among other devices such as those described with respect to FIGS. 17 and 18. In some embodiments, the user device 102 displays a graphical user interface that receives user inputs to control aspects of the automatic feeding process. Example graphical user interfaces are illustrated in FIGS. 8A, 8B, and 8C. In one embodiment, the user device 102, the animal wearable device 104, and automatic food dispenser 110 are communicatively coupled to each other.

In one example, the "animal wearable device" refers to a device that is worn by a pet or animal and that includes computational devices, sensors, or control circuitry. Example animal wearable devices include artificial intelligence training systems; location, health, and well-being monitors; location trackers; heart monitors; ingestible s for disease detection; sleep trackers; temperature and respiration monitors; and so forth. In some embodiments, the animal wearable device 104 communicates data to the user device or the automatic food dispenser 110. In one embodiment, the user device generates a notification based on the data communicated from the animal wearable device 104. In one embodiment, a control system of the automatic food dispenser 110 actuates any suitable component of the automatic animal feeding system 100.

As described above, the automatic food dispenser 110 refers to an assembly that performs one or more steps associated with an automatic feeding process. An example automatic feeding process includes receiving unopened food pods, opening or removing a lid from food pods, making the opened food pods accessible for pet consumption, or disposing of used food pods into a disposal compartment, among other or alternative tasks associated with performing the automatic feeding process. As illustrated, the automatic food dispenser 110 includes various components enclosed by the automatic food dispenser enclosure 112, including a rotating assembly 120 comprising a base rotation motor 121, a disposal compartment 122, pod chambers 124, a gear assembly 125, and a rotary plate 126 that includes a food pod holder 128; a de-lidding mechanism 140, including a de-lidding motor 142, a lead screw 144, a cutting module 146, and a secondary de-lidding device 148; a stationary plate 150; and a feeding port. As illustrated, the automatic food dispenser 110 couples to a food canister 170 that includes a lid 172, a handle 174, and food pods 176. As illustrated, the automatic food dispenser 110 further includes an electronics module 179 that includes a control system 180, including a processor 182 and a memory device 184; a sensor assembly 186; a camera assembly 188; a transceiver 190; and a pod authentication system 192.

In one example, the "rotating assembly" 120 refers to an assembly of components that rotate within the enclosure 112 of the automatic food dispenser 110. In some embodiments, the base rotation motor 121 is actuatable to cause rotation of the disposal compartment 122 and the rotary plate 126, as discussed herein. The base rotation motor 121 can include any suitable motor. Example motors include brushed direct-current (DC) motors, brushless DC motors, coreless motors, geared motors, stepper motors, or any suitable motor. Taking a brushed DC motor as an example, a brushed DC motor consists of a rotor made of a copper wire coil and a magnetic stator, such that an end of the copper wire coil is connected to a commutator that creates a contact point. For example, the commutator is able to rotate while maintaining contact with the brush, enabling DC current to flow through the brush into the coil, creating a magnetic field that repels or attracts a stator, causing rotation of a rotor. In one embodiment, rotation of a rotor causes rotation of the rotary plate 126, the disposal compartment 122, or any other component housed within the enclosure 112.

In one example, the "disposal compartment" 122 refers to a portion of the automatic food dispenser 110 that receives used food pods. For example, the disposal compartment 122 corresponds to a section within the enclosure where the used food pods are disposed of, for example, after a triggering event (e.g., consumption of the food inside the food pod, expiration of a time period, such as a preset time period, and so forth). In some embodiments, the disposal compartment 122 is isolated or separate from other components housed within the enclosure because the disposal compartment contains used or empty food pods. In some embodiments, the disposal compartment is communicatively coupled to the base rotation motor 121, such that the disposal compartment 122 moves based on a control signal received by the base rotation motor. For example, the disposal compartment 122 rotates about a first axis of rotation oriented along the gravity vector.

To organize and facilitate the temporary storage of the used pods, some embodiments of the disposal compartment 122 include pod chambers 124. In one example, "pod chambers" 124 refers to individual sections of the disposal compartment that are sized to receive a used food pod from the food pod holder. However, it should be understood, that in one embodiment, the pod chamber 124 includes one large bin that receives the used food pods. In some embodiments, the pod chambers 124 are radially disposed around the first axis of rotation of the disposal compartment 122. For example, each of the pod chambers 124 are equidistant from the first axis of rotation of the disposal compartment 122. In one embodiment, the pod chambers 124 are removable from the disposal compartment 122, for example, to clean the pod chambers 124 and remove used food pods stored therein. For example, the pod chambers 124 are removably fixed to the disposal compartment 122, such that the pod chambers 124 are removed for cleaning from the disposal compartment 122, as illustrated in FIG. 7K.

In one embodiment, the rotating assembly 120 includes a gear assembly 125 that allows the various components coupled to the base rotation motor to rotate at different angular velocities. In one example, a "gear assembly" 125 refers to a machine used to transmit power and control angular velocities between components, such as between the disposal compartment 122 and the rotary plate 126. Example gear assemblies 125 include (1) a toothed crown, which transfers the movement; (2) a bearing, where a shaft is coupled; and (3) a partition between them. In some embodiments, a gear assembly 125 associated with the rotating assembly 120 causes the disposal compartment 122 to rotate at a different angular velocity than that of the rotary plate 126. In this manner, the angular velocities of the disposal compartment 122 and the rotary plate 126 can be coordinated so that respective points on the rotary plate 126 and the disposal compartment 122, respectively, align with each other at particular angular positions. As described in detail below, despite having different angular velocities, the rotary plate 126 and a respective pod chamber 124 of the disposal compartment 122 align at an opening of the stationary plate 150 based at least on the gear ratio established by the gear assembly 125.

In one embodiment, the pod chambers 124 are rotatable based on actuation of the base rotation motor 121 of the rotating assembly 120. In one example, the rotation rate (e.g., angular velocity) of the pod chambers is different from the rotation rate (e.g., angular velocity) of the rotary plate based on a gear ratio established by the gear assembly 125. In some embodiments, a gear ratio between a component associated with the rotary plate 126 and a component associated with the disposal compartment 122 enables different respective rotation rates. In this manner, the pod chambers can alternate between which pod chamber 124 receives a used food pod from the food pod holder 128 of the rotary plate 126, as described herein.

In some embodiments, the food pod holder 128 of the rotary plate receives an unopened food pod 176 from the food canister 170. The food pod 176 can be of any suitable shape. For example, certain food pods 176 have a cover with a larger circumference than a circumference of the base, such that the food pod 176 is of a conical shape (or the cover can be smaller than the base of the food pod 176). The cover and the lid can be substantially parallel to each other, such that the base can remain flush against a surface against which it rests. In one embodiment, the food pod 176 is cylindrical, such that the circumference of the cover matches the circumference of the base. In either case, certain embodiments of disposal port 266 (FIG. 2) are at least as large or larger than the largest dimension of the food pod 176 so that the food pod 176 can be dropped into the disposal compartment 122 disclosed herein. Additionally, the food pod 176 may be manufactured of any suitable material, with any suitable lid of the same or different materials. For example, the material of the food pods and their lids are made of respective recyclable materials, such as foil, cardboard, plastic, and the like.

In one example, the food pod 176 is received when the food pod holder 128 is empty (e.g., does not have a food canister). Alternatively, the food pod 176 is received when the food pod holder 128 includes a food pod 176, such that the newly received food pod 176 is vertically stacked on top of the existing food pod 176 within the food pod holder 128. After receiving the unopened food pod 176, an example base rotation motor 121 further actuates to rotate the rotary plate 126 and change a position of the food pod holder 128 from being aligned with the food canister 170 to being aligned with the de-lidding mechanism 140. In this manner, the unopened food pod positioned in the food pod holder can be directed to the de-lidding mechanism 140. During rotation of the rotary plate 126 or while the food pod 176 is positioned within the food pod holder 128, the food pod holder 128 secures the food pod 176, for example, while the food pod 176 is directed to or transported from the disclosed positions, such as a pod-loading position, a pod authentication positon, a de-lidding position, a feeding position, or any other suitable position.

In one example, the "de-lidding mechanism" 140 refers to a device that removes a lid from or otherwise opens the unopened food pod 176. In one embodiment, the de-lidding mechanism 140 includes a de-lidding motor 142 that controls motion of the cutting module 146. In some embodiments, the de-lidding motor 142 is separate from the base rotation motor 121 of the rotating assembly 120. The de-lidding motor 142 may be the same type of motor as the base rotation motor 121, but in some embodiments, the de-lidding motor 142 is a different type of motor from the base rotation motor 121.

Example de-lidding motors 142 include brushed direct-current (DC) motors, brushless DC motors, coreless motors, geared motors, stepper motors, or any suitable motor. Taking a brushed DC motor as an example, a brushed DC motor consists of a rotor made of a copper wire coil and a magnetic stator, such that an end of the copper wire coil is connected to a commutator that creates a contact point. For example, the commutator is able to rotate while maintaining contact with the brush, enabling DC current to flow through the brush into the coil, creating a magnetic field that repels or attracts a stator causing rotation of a rotor. In one embodiment, rotation of a rotor causes rotation of the cutting module 146 along screw threads on the lead screw 144.

In one example, a "lead screw" 144, also known as a power screw or translation screw, refers to a screw used as a linkage in a machine to translate rotation motion into linear motion. Certain lead screws are used in certain linear actuators to facilitate control of linear motion of certain components. In some embodiments, lead screws 144 include a large area of sliding contact between its respective male and female members, for example, as compared to alternatives, such as hydrostatic lead screws, for example. In one embodiment, the lead screw includes a split nut (also called a "half nut") which allows the nut to be disengaged from the screw threads of the linear screw and moved axially, independently of the screw's rotation. In one embodiment, a split nut is employed to compensate for wear by compressing the parts of the nut.

Figure 5A:
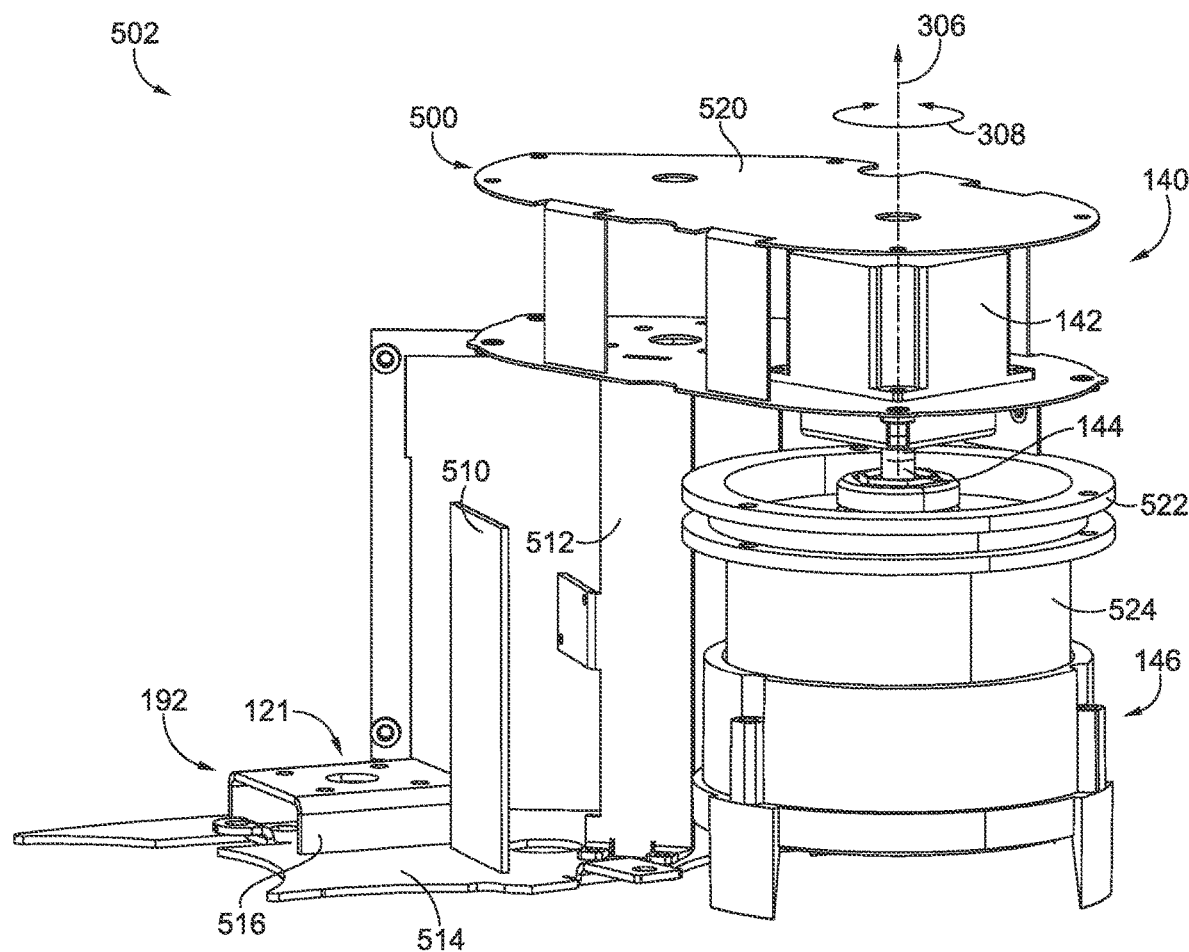
FIG. 5A is a perspective view of a de-lidding mechanism and corresponding mounting assembly of an automatic animal feeding system, in accordance with embodiments of the present disclosure.
Figure 5A:
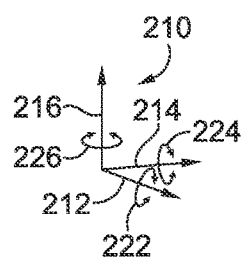
Figure 5B:
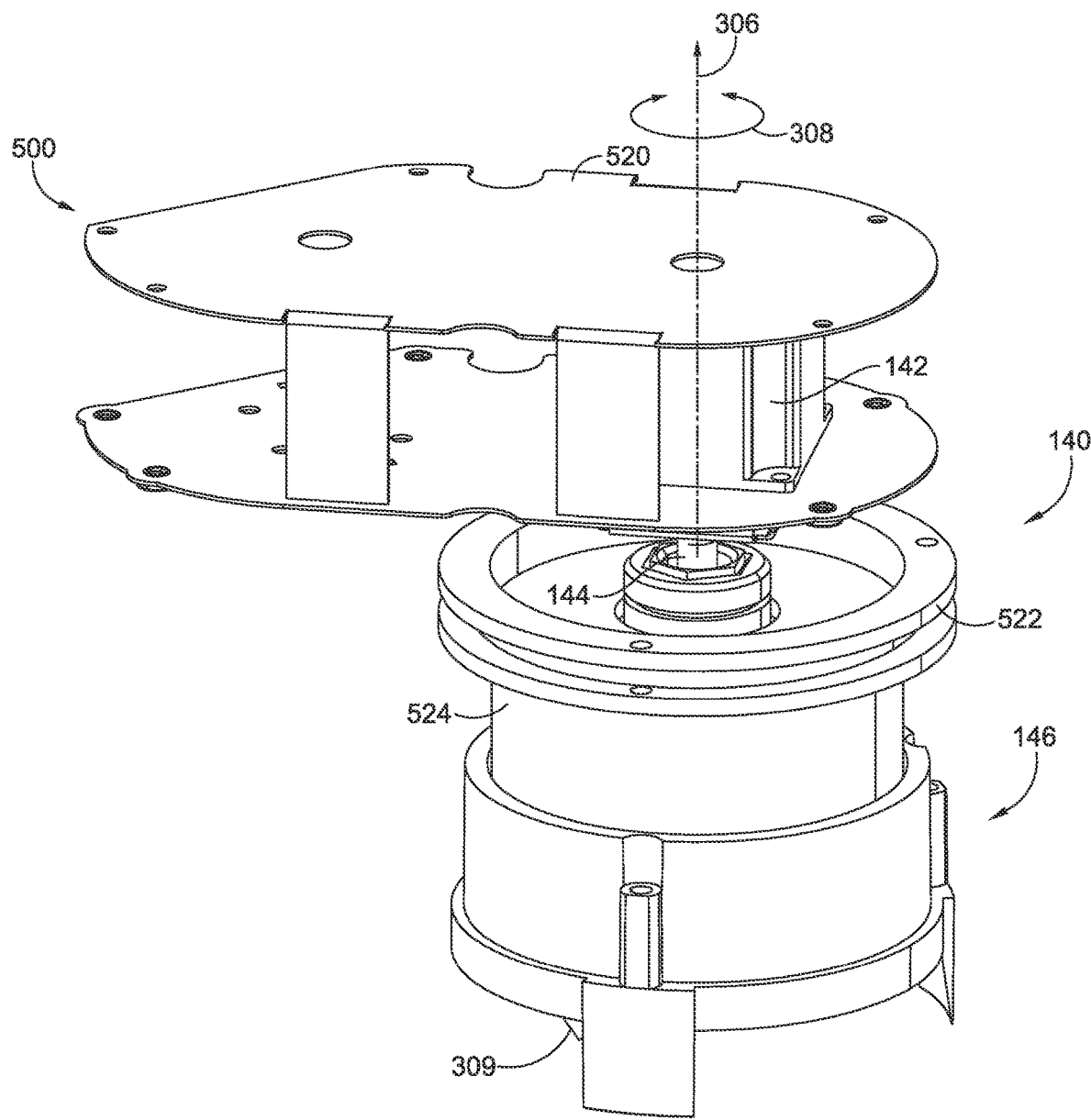
FIG. 5B is a perspective view of a de-lidding mechanism of an automatic animal feeding system, in accordance with embodiments of the present disclosure.
Figure 5B:
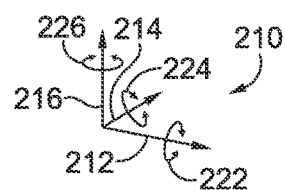
Figure 5C:
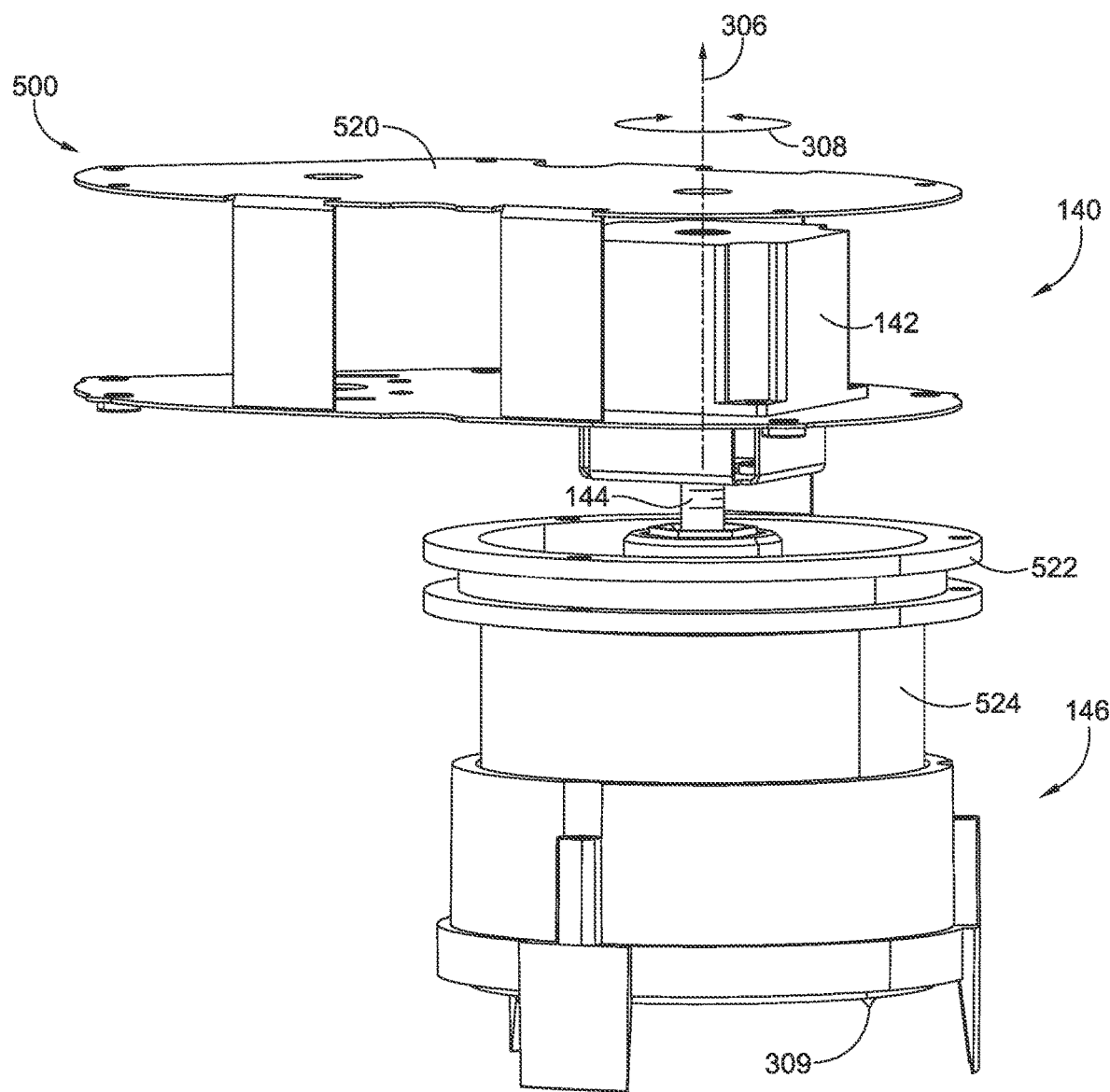
FIG. 5C is a perspective view of a de-lidding mechanism of an automatic animal feeding system, in accordance with embodiments of the present disclosure.
Figure 5C:
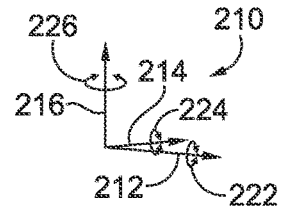

In one example, the cutting module 146 refers to an assembly that includes a body that includes blades arranged to pierce the lid of the food pod 176. An example cutting module 146 is illustrated in FIGS. 5A, 5B, and 5C. The cutting module 146 can remove the lid via any suitable de-lidding process, such as, but not limited to, piercing the food pod 176, removing the perimeter of the lid of the food pod 176, engaging with and pulling a portion of a lid of the food pod, or any other suitable method for exposing the content of the food pod 176.

An example de-lidding process is illustrated with respect to FIGS. 7A, 7B, 7C, 7D, 7E, 7F, 7G, 7H, 7I, 7J, and 7K. By way of a non-limiting example of a de-lidding process, the de-lidding motor 142 actuates to cause the cutting module 146 to rotate about the lead screw 144 (e.g., along screw threads of the lead screw 144) in order to vertically descend downward along the lead screw 144. The cutting module 146 may descend downward onto the unopened food pod 176 (e.g., positioned within the food pod holder 128) to open the food pod 176 based on actuation of the de-lidding motor 142. Embodiments of the cutting module 146 pierce the top component of the food pod 176 and continue to rotate to remove (e.g., cut and lift) the top surface (e.g., the lid) from the food pod. In one example, the de-lidding mechanism 140 opens the food pod 176 while the food pod 176 is secured by the food pod holder 128 of the rotary plate 126. In one example, the de-lidding mechanism 140 and the food pod holder 128 of the rotary plate 126 are enclosed within the enclosure 112 of the automatic food dispenser 110 while the de-lidding mechanism 140 opens the food pod 176. In this manner, the freshness of the food inside the food pod 176 can be preserved by not exposing it to the ambient air, and any odors within the food pod 176 can be contained therein to prevent dissemination of the odors to the environment.

In some embodiments, the automatic food dispenser enclosure 112, also referred to as the enclosure 112, corresponds to any number of components or surfaces that provide a seal for certain components of the automatic food dispenser. As discussed herein, embodiments of the enclosure 112 include an opening corresponding to a feeding port 160. In one embodiment, the opening corresponding to a feeding port 160 remains fixed on the enclosure 112 during the rotation of the rotating assembly 120 (e.g., including at least one of: the cutting module or the rotary plate). In one example, the "feeding port" 160 refers to an opening that is fixed on a top component of the enclosure 112 and that aligns with the food pod holder 128 when the rotary plate 126 is rotated to a feeding position. The feeding port 160, when aligned with the food pod holder 128, provides access to contents positioned within the food pod holder 128. For example, when the food pod holder 128 is aligned with the feeding port 160, the food the food pod 176 is accessible to pets for consumption because the food pod 176 was previously automatically opened by the de-lidding mechanism 140.

Alternatively, during actuation of the base rotation motor 121, the rotary plate 126 can rotate, such that the food pod holder 128 is inside the enclosure 112 of the automatic food dispenser 110 when the food pod holder 128 is not aligned with the feeding port 160. In one embodiment, the feeding port 160 is the only opening (e.g., to the environment) on the enclosure 112. In this example, the food pod holder 128 rotates within the enclosure 112 when the food pod holder 128 is not aligned with the feeding port 160. When the food pod holder 128 is not aligned with the feeding port 160, a surface of the rotary plate can be exposed to the feeding port 160. In one embodiment, the surface of the rotary plate remains flush with the feeding port 160 so that the inside of the automatic food dispenser remains sealed. Indeed, in some embodiments, the enclosure 112 of the automatic food dispenser 110 creates a seal to preserve freshness of food pods positioned within the enclosure, while preventing the escape of certain odors.

In one example, the "stationary plate" 150 refers to a member that does not necessarily rotate based on motor actuation and that generally separates the disposal compartment 122 from the rotary plate 126. For example, the pod chamber(s) 124 are vertically separated from the rotary plate 126 by the stationary plate 150. In some embodiments, the stationary plate 150 includes a disposal port that connects the disposal compartment 122 and the rotary plate 126. In one embodiment, the stationary plate 150 is positioned between the pod chamber(s) 124 and the enclosure 112. In one embodiment, although the stationary plate 150 remains stationary during actuation of the base rotation motor 121, actuation of the base rotation motor 121 causes the rotation of the pod chamber(s) 124 and the rotary plate. In one example, rotation of the disposal compartment 122 (based on actuation of the base rotation motor 121) causes the disposal port of the stationary plate 150 to change from being aligned with a first pod chamber 124 to being aligned with a second pod chamber 124.

In another example, rotation of the pod chambers 124 and the rotary plate 126 occurs until the food pod holder 128, the disposal port of the stationary plate 150, and a particular pod chamber 124 align. In this example, when the food pod holder 128, the disposal port of the stationary plate 150, and the particular pod chamber 124 align, a direct conduit from the food pod holder to the particular pod chamber 124 is created by way of the disposal port of the stationary plate 150. In this manner, the food pod 176 in the food pod holder 128 can directly drop into the pod chamber 124 of the disposal compartment 122.

Continuing with FIG. 1, the "food canister" 170 refers to an assembly that is sized to hold a plurality of unopened food pods 176 until the unopened food pods 176 are directed to any suitable position by the automatic food dispenser 110. In one example, the unopened food pods are individually gravity-fed into the food pod holder 128 of the rotary plate 126 so that the base rotation motor 121 can direct the food pod 176 to one or more positions along a predefined rotation path about a first axis of rotation of the base rotation motor 121. The food pod holder 128 is sized to substantially conform to the contour or size of the food pods 176 to secure the food pods 176 during the automatic feeding process until the food pods are disposed into the disposal compartment 122. Based on the food pod holder 128 being sized to substantially conform to the contour or size of the food pods 176, vibrations or movement of the food pod 176 relative to the food pod holder 128 can be reduced. In some embodiments, the food canister 170 is configured to fix to the enclosure 112 of the automatic food dispenser 110 via respective locking mechanisms on the food canister 170 and the enclosure 112, respectively. In some embodiments, the food canister 170 is removable from the enclosure of the automatic food dispenser 110. In one example, the food canister 170 is removed to access the inside of the food canister 170 and fill the food canister with food pods. In another example, the food canister is filled by removing a lid 172 and filling the inside of the food canister with food pods 176, without removing the food canister 170 from the automatic food dispenser 110.

Figure 3A:
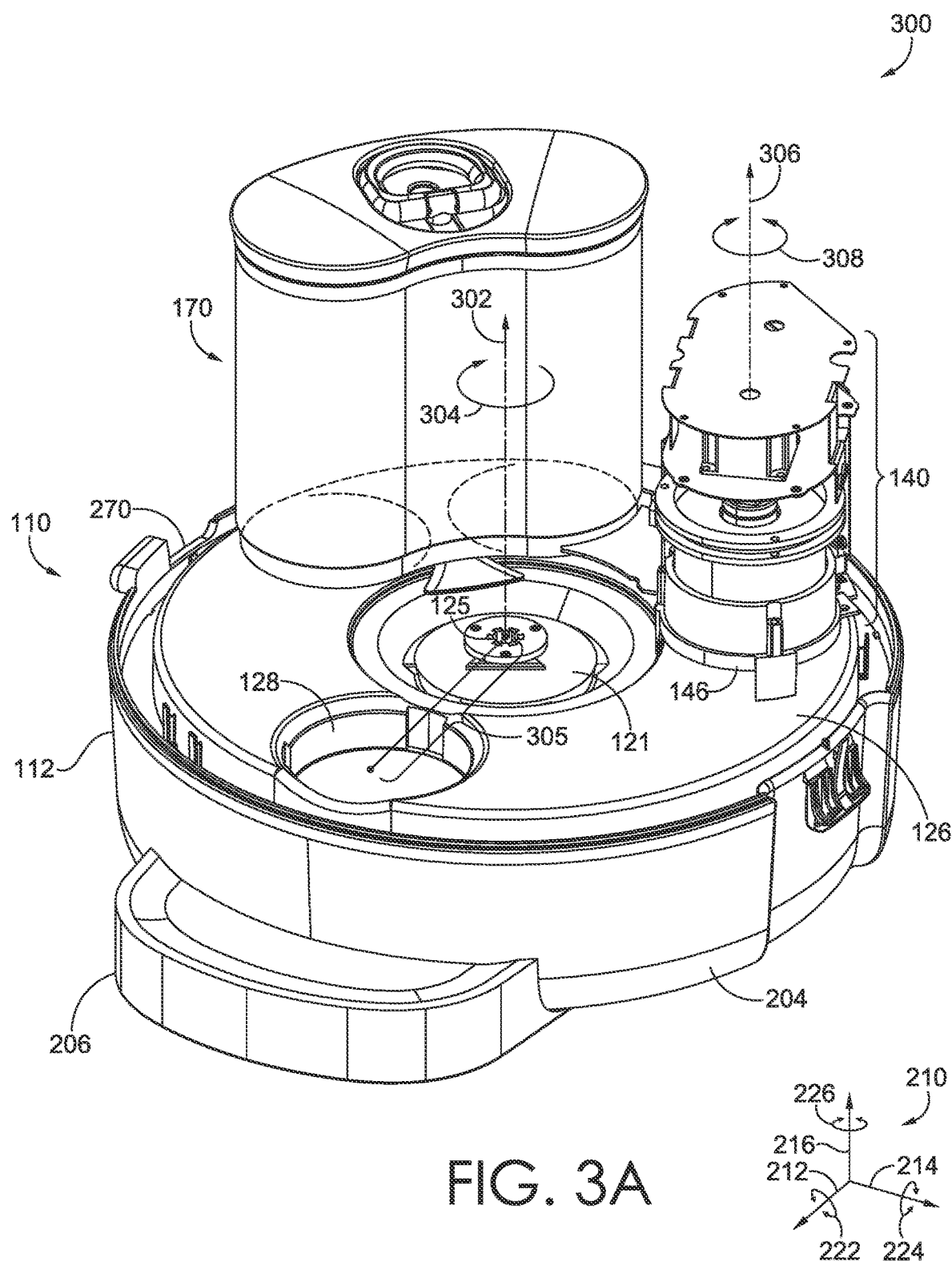
FIG. 3A is a perspective view of an automatic animal feeding system having an enclosure of the automatic food dispenser hidden from view, in accordance with embodiments of the present disclosure.
Figure 4A:
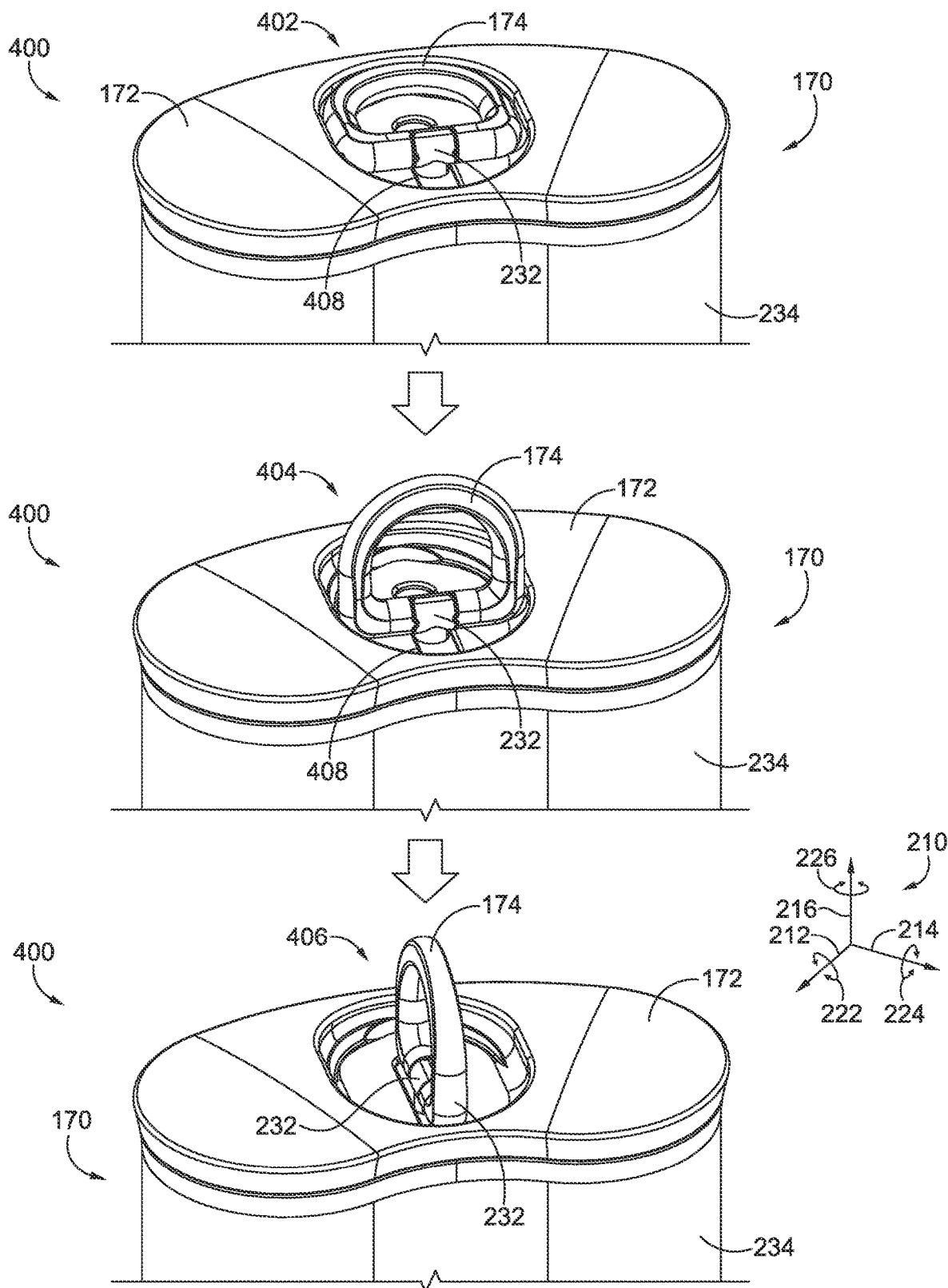
FIG. 4A is a perspective view of a food canister of an automatic animal feeding system that is removable from an automatic food dispenser of the automatic animal feeding system, in accordance with embodiments of the present disclosure.
Figure 4B:
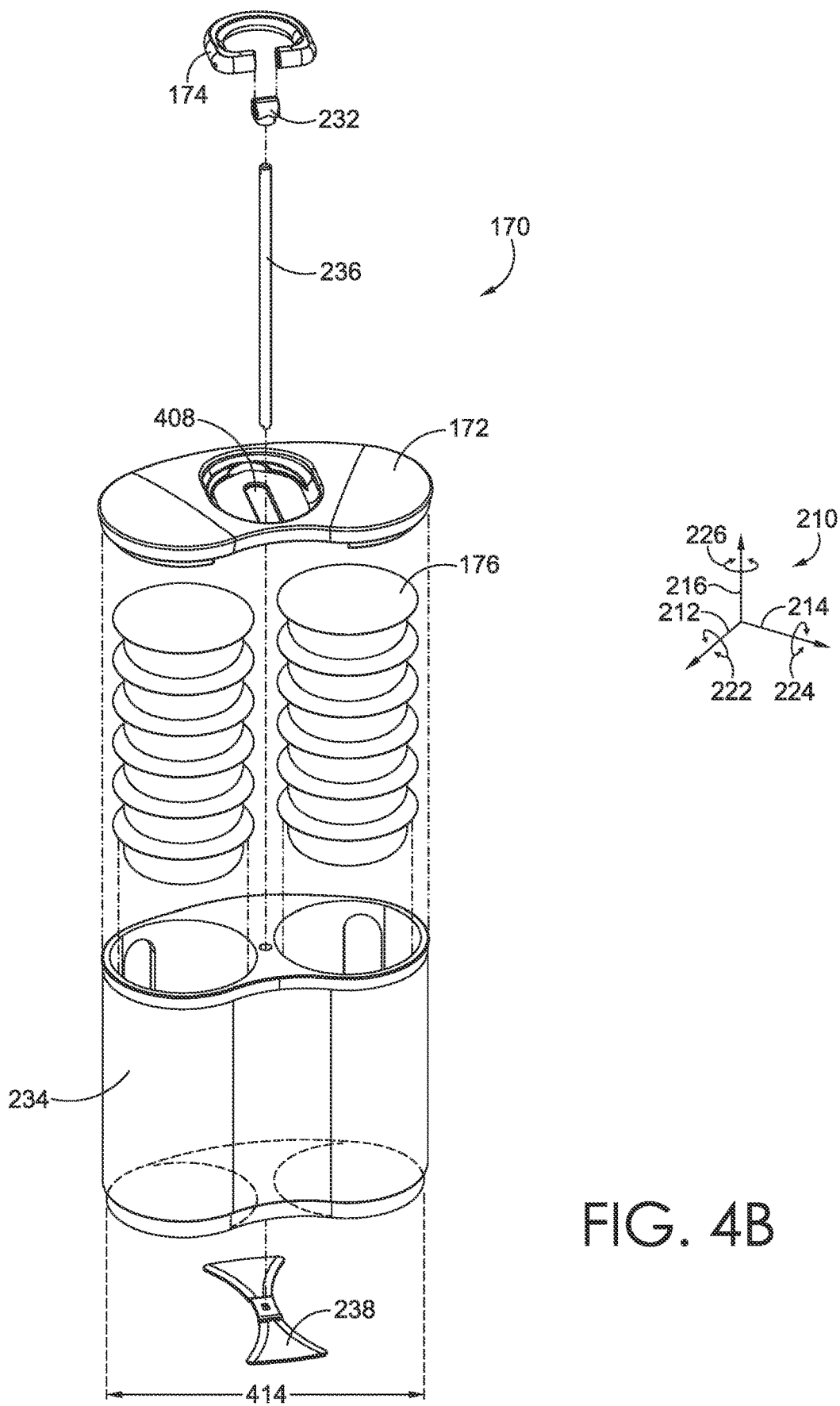
FIG. 4B is an exploded view of a food canister of an automatic animal feeding system, in accordance with embodiments of the present disclosure.
Figure 4C:
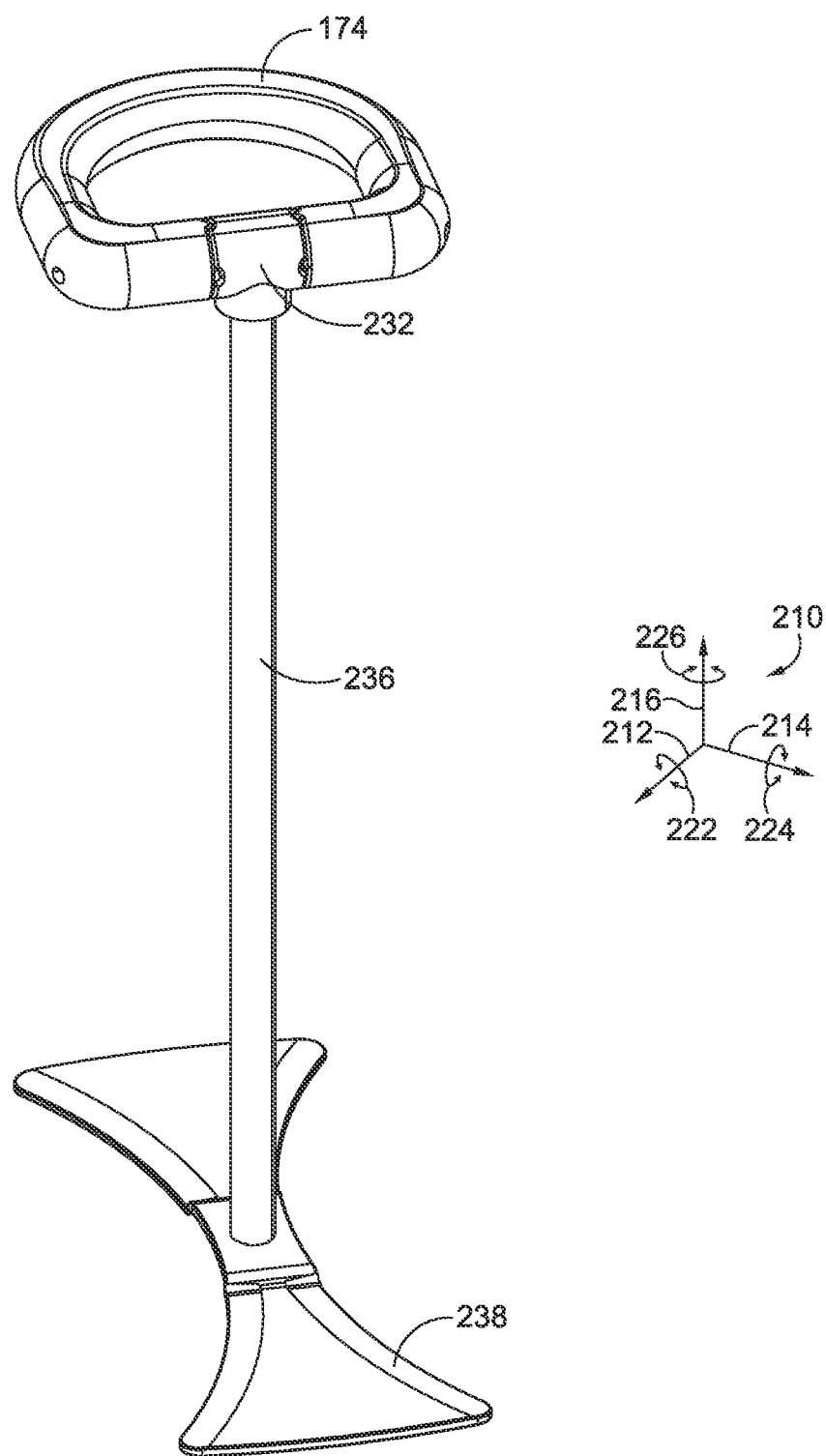
FIG. 4C is a perspective view of a handle, handle hinge point, and a food canister base blade of the food canister of an automatic animal feeding system, in accordance with embodiments of the present disclosure.

In some embodiments, the handle 174 of the food canister 170 is manipulated to remove the food canister 170 from the automatic food dispenser 110. For example, the handle 174 hinges about one axis and rotates about another axis to cause a rod extending along a height of the food canister 170 to also rotate. In this example, rotation of the rod causes rotation of a food canister base blade. The food canister base blade is depicted in or described with respect to at least FIGS. 3A, 4A, 4B, and 4C. As illustrated in FIGS. 4A, 4B, and 4C, rotation of the handle causes rotation of the food canister base blade, for example, between a first position and a second position. In the first position, the food canister base blade does not separate the food pods 176 from contacting the rotary plate 126, but instead couples the food canister 170 to the enclosure 112, as depicted in FIG. 3A. In the second position, the food canister base blade separates the food pods 176 from the rotary plate 126 and makes the food canister removable from the enclosure 112.

In some embodiments, the de-lidding mechanism 140 additionally or alternatively includes a secondary de-lidding device 148. In one embodiment, the secondary de-lidding device 148 is positioned within the automatic food dispenser 110 in lieu of the de-lidding motor 142, the lead screw 144, the cutting module 146, and/or the food canister 170. In another embodiment, the secondary de-lidding device 148 is employed in conjunction with the de-lidding motor 142, the lead screw 144, the cutting module 146, and/or the food canister 170. For example, the secondary de-lidding device 148 includes a mechanical device capable of being depressed to cause food to be expelled via a "tooth-paste mechanism," for example, onto an empty food pod within the food pod holder 128. As used herein, in one example, the "tooth-paste mechanism" refers to a method of releasing food, whereby a pouch or container of food is squeezed via an external force, to cause food to be expelled via an opening.

For example, a food container (e.g., pouch or pod) can be opened so that engaging the secondary de-lidding device 148 causes food to be squeezed out of the food container. To squeeze out food from the food container, the secondary de-lidding device 148 can include any suitable electromechanical or electromagnetic device. Embodiments of the secondary de-lidding device 148 can include a hydraulic system (e.g., a piston system that is depressed within a container to expel food), an magnetic system (e.g., a magnet that causes formation of an electric field to cause actuation of a motor to expel food on an empty food pod), and the like.

Continuing with FIG. 1, embodiments of the automatic food dispenser 110 include an electronics module 179 that includes a collection of electrical circuitry and hardware that facilitates implementing the automatic feeding process in a smart manner, as described herein. As illustrated, embodiments of the electronics module 179 include a control system 180. Embodiments of the control system 180 correspond to the example computing device 1700 of FIG. 17. For example, similar to the computing device 1700 of FIG. 1700, the control system 180 includes a processor 182 configured to execute computer-readable instructions stored in the memory device 184 to cause the control system 180 to implement certain steps in the flow diagrams 1000, 1100, 1200, 1300, 1400, and 1500 of FIGS. 10, 11, 12, 13, 14, and 15, respectively.

In some embodiments, the control system 180 accesses or receives data from the sensor assembly 186, the camera assembly 188, the pod authentication system 192, or any other component of the automatic animal feeding system 100, among others. In one embodiment, the transceiver 190 couples components of the electronics module 179 to other components of the automatic animal feeding system 100 via respective transceivers. For example, a transceiver of the user device 102, of the animal wearable device 104, of the food canister 170, or of the automatic food dispenser 110 couples to the transceiver 190 of the electronics module 179 to couple the respective components.

In one example, the "sensor assembly" 186 refers to one or more hardware devices that generate a sensor signal indicative of a particular measurement, and communicate the sensor signal to the control system 180, to cause the control system 180 to send a control signal to any component of the automatic animal feeding system 100, such as the base rotation motor 121 and/or the de-lidding motor 142. Example sensor signals include a weight measurement associated with the respective food pod that is below a weight threshold value (e.g., a threshold value of weight of the food pod or of food contained in the food pod), an indication of expiration of a preset time, an indication of a sound pattern satisfying sound pattern features, or an indication of a stream of captured content that satisfies image features. Example sensors of the sensor assembly 186 include a weight sensor, a time sensor, a photograph sensor (such as a camera), a force sensor, a torque sensor, a dielectric moisture sensor, a thermostat, a pressure sensor, an accelerometer, a gyroscope, a proximity sensor, a thermometer, a photodetector, a thermocouple, a magnetic assembly, an infrared (IR) sensor, or any other sensor capable of generating and communicating a sensor signal indicative of a measurement. These sensors are included as a non-exclusive list of examples, and it should be understood that additional or alternative sensors may be employed in certain embodiments.

Figure 2A:
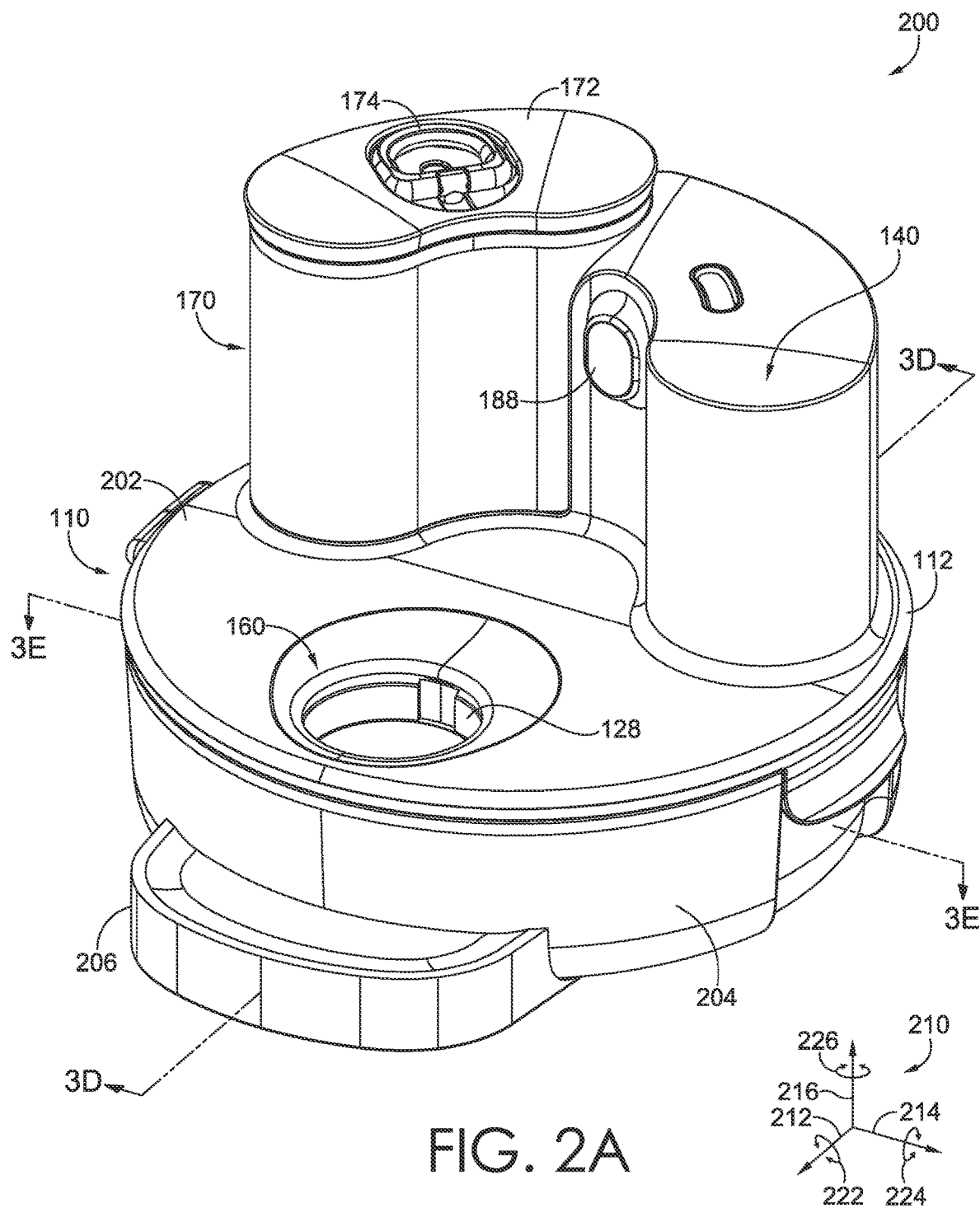
FIG. 2A is a perspective view of an automatic animal feeding system, in accordance with embodiments of the present disclosure.
Figure 2B:
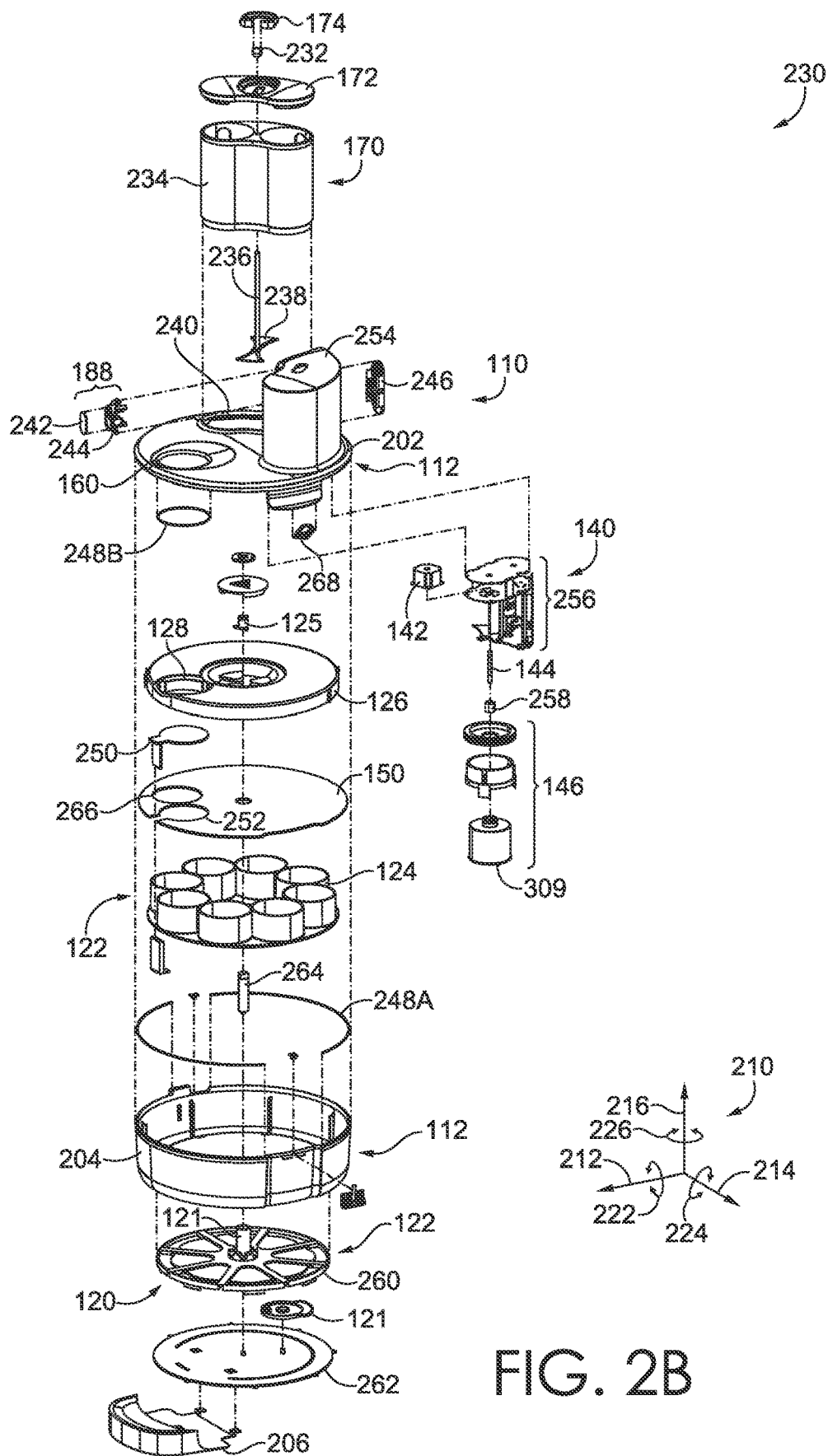
FIG. 2B is an exploded view of an automatic animal feeding system, in accordance with embodiments of the present disclosure.

In one example, "camera assembly" 188 refers to a device that captures an image, such as that of a pet consuming food, and communicates the data associated with the captured image to the control system 180. As depicted in FIGS. 2A and 2B, the camera assembly 188 includes a camera and corresponding camera lens 242 (FIG. 2B) facing the feeding port 160 to capture activity proximate to the feeding port 160. Example cameras used as part of the camera assembly 188 include a monocular camera, a compact camera, a bridge camera, a mirrorless camera, or any other device capable of capturing or recording visual images (e.g., two-dimensional [2-D] images) in the form of photographs, film, video signals, and so forth, to generate a stream of video. However, embodiments of the camera assembly 188 are not limited to devices capturing 2-D images, as other sensors, such as LiDAR sensors that capture three-dimension recordings or images of the surrounding environment, may also or alternatively be employed.

In one embodiment, the camera assembly 188 communicates an image of a particular pet to the control system 180 that can determine the identity of the pet so that the control system 180 can assign correspond food consumption amounts to different pets. For example, suppose a household has two pets, namely, an orange and brown cat. The control system 180 can attribute different food consumption (based on the weight measurements taken at different time stamps) to each of the respective cats based on an image or video captured by the camera assembly 188 and indicative of which cat (e.g., the orange or brown cat) approached the feeding port and began consuming food. In this manner, embodiments disclosed herein support indexing stored measurements indicative of food consumption based on which pet approached the feeding port or performed certain actions, such as eating food out of the feeding port during times when a change in weight measurements is detected.

In one example, the "pod authentication system" 192 refers to circuitry that determines a level of authenticity of the food pods 176. In some embodiments, the pod authentication system 192 includes a sensor, such as those described with respect to the sensor assembly 186, capable of determining a parameter of the food pods 176 that is compared to an authenticity metric to determine authenticity of a food pod 176. For example, the pod authentication system 192 generates an authentication signal based on at least one of: an image of the food pod captured by a camera, a radio-frequency reading captured from the food pod 176 by a radio-frequency identification (RFID) sensor (or a sensor employing any other Automatic Identification Data Capture [AIDC] methodology), a weight measurement associated with the food pod 176, or a chemical reading taken from the food pod 176 by a chemical-sensing sensor. Certain authentication signals are communicated to the control system 180 for determination of the authenticity of the food pod 176. In one example, the pod authentication system 192 is integrated into the food canister 170 or the enclosure 112 so that a food pod is authenticated as it comes into proximity with the pod authentication system 192.

As a first example, suppose the pod authentication system 192 includes a camera that captures an image of the food pod 176. In this example, the camera captures one or more images of one or more orientations of the food pod 176. The camera of the pod authentication system 192 can be positioned at any position within the enclosure 112, such as between the food canister 170 and the de-lidding mechanism 140 along a path traveled by the food pod 176 within the food pod holder 128. The camera can communicate the one or more images to the control system 180 for further processing. In one embodiment, the control system 180 employs a machine learning methodology (e.g., a machine learning model), such as a You Only Look Once (YOLO) methodology, Region-based Convolutional Neural Network (R-CNN) methodology, Single-Shot Detector (SSD) methodology, and the like, to detect objects, classify the image, and/or determine a level of authenticity for the food pod. The level of authenticity may be binary (e.g., the food pod is authentic or the food pod is unauthentic [or not authentic]). An employed machine learning model may be trained via any suitable technique, such as supervised learning, unsupervised learning, and/or reinforcement learning, to name a few. In one embodiment, the control system 180 extracts image features and applies any suitable computation, such as a (1) numerical transformation (e.g., taking fractions or scaling), (2) a category encoder to categorize data, (3) clustering techniques, (4) group aggregation values, (5) principal component analysis, and the like. For example, the image features are compared against an authenticity metric to determine authenticity of a food pod 176. In some embodiments, the control system 180 may assign different levels of significance to the image data, such that certain image features that have a higher level of significance are weighted accordingly. In this manner, the control system 180 may prioritize and/or rank image features to improve identifying, tracking, and/or classifying the object captured by the camera.

As a second example, suppose the pod authentication system 192 includes an RFID sensor configured to detect a radio-frequency reading captured from the food pod 176. In one embodiment, an RFID sensor refers to a sensor cable of implementing any suitable AIDC methods to automatically identify objects. In one example, the RFID sensor utilizes radio waves to identify an object. For example, the food pods 176 include an RFID tag that responds to the waves emitted by the RFID sensor of the pod authentication system 192. In response to detection of a response from the RFID tag of the food pod 176 by the RFID sensor, the pod authentication system 192 can compare the response to an authenticity metric (e.g., an expected response indicative of an authentic food pod) to determine authenticity of a food pod 176. In one embodiment, the pod authentication system 192 generates a signal indicative of authenticity that is communicated to the control system 180. Alternatively, if the RFID sensor of the pod authentication system 192 does not detect a response from food pod 176 after emitting a wave, then the pod authentication system 192 may generate a signal indicative of a lack of authenticity that is communicated to the control system 180.

As a third example, suppose the pod authentication system 192 includes a weight sensor configured to detect a weight measurement associated with the food pod 176. In one embodiment, the weight sensor is positioned on the stationary plate 150 directly aligned with the feeding port 160. The weight sensor of the pod authentication system 192 may generate a weight signal indicative of a weight of content positioned on the weight sensor. In one embodiment, this weight measurement is communicated to the control system 180. The control system 180 can compare the weight measurement against an authenticity metric, such as a target range of weight values that are associated with authenticity of the food pod 176. For example, when the weight measurement is within the range of weight values, the pod authentication system 192 generates an indication of authenticity of the food pod 176. Alternatively, when the weight measurement is outside of the range of weight values, the pod authentication system 192 generates an indication of a lack of authenticity of the food pod 176. Although this example is discussed in the context of a range of weight values, it should be understood that in some embodiments an upper or lower weight threshold may be employed.

As a fourth example, suppose the pod authentication system 192 includes a chemical-sensing sensor configured to detect a chemical reading taken from the food pod 176. The chemical-sensing sensor of the pod authentication system 192 can be positioned at any position within the enclosure 112, such as between the food canister 170 and the de-lidding mechanism 140 along a path traveled by the food pod 176 within the food pod holder 128. In one embodiment, the pod authentication system 192 compares the detected chemical reading to an authenticity metric (e.g., a target chemical reading indicative of authenticity of the food pod 176) to determine authenticity of a food pod 176. In one embodiment, the chemical-sensing sensor is configured to generate a sensor signal indicative of detection of a particular chemical. In some embodiments, the authentic food pods 176 are manufactured or assembled to include a particular chemical (e.g., on the lid or any other surface) that is detected by the chemical-sensing sensor.

For example, when the chemical-sensing sensor detects the particular chemical, the pod authentication system 192 generates an indication of authenticity of the food pod 176. Alternatively, when the chemical-sensing sensor does not detect the particular chemical after the chemical-sensing sensor comes into close contact with a food pod 176, the pod authentication system 192 generates an indication of a lack of authenticity of the food pod 176. Although this example is discussed in the context of detection of one chemical, it should be understood that in some embodiments, multiple chemicals or other detectable properties can be determined from the food pod to determine the authenticity of a food pod 176.

Although the pod authentication system 192 and the control system 180 are discussed as performing certain operations, it should be understood that in some embodiments the pod authentication system 192 is integrated into control system 180 or the control system 180 is integrated into the pod authentication system 192. In one embodiment, certain steps discussed as being performed by the control system 180 are performed by the pod authentication system 192. In one embodiment, certain steps discussed as being performed by the pod authentication system 192 are performed by the control system 180. For example, the pod authentication system 192 and the control system 180 are omitted from an automatic animal feeding system.

In some embodiments, the control system 180 controls the automatic food dispenser based on the indication of authenticity. For example, based on an indication of a lack of authenticity of the food pod, the control system 180 causes an indication to be communicated to the user device 102 or a server device, such as that illustrated in FIGS. 16 and 18. Alternatively or additionally, the control system 180 can control actuation or prevent the actuation of the base rotation motor 121, the de-lidding motor 142, or any other component of the automatic food dispenser 110 based on the indication of the lack of authenticity. In some embodiments, based on an indication of authenticity of the food pod, the control system 180 causes an indication to be communicated to the user device 102 or a server device, such as that illustrated in FIGS. 16 and 18. In some embodiments, the indication of food pods is recorded in a database and indexed based on timestamp or serial number of the food pod, among other indexing data. In one embodiment, based on an indication of authenticity of the food pod, the control system 180 does not perform an action or generate a control signal since authentication of the food pod 176 is verified. Instead, in one embodiment, the control system 180 continues to perform the automatic feeding process based on verifying the authentication of the food pod 176.

FIG. 2A is a perspective view of an automatic animal feeding system 200, in accordance with embodiments of the present disclosure. As illustrated, the automatic animal feeding system 200 includes an automatic food dispenser 110 having an enclosure 112 that includes a top component 202 on a vertical side and a lateral component 204 surrounding a lateral perimeter of the enclosure 112. In the illustrated example, a pet stand 206 is attached to the lateral component 204 in front of the feeding port 160. In this manner, a pet can place their paws on the pet stand 206 to better access the content (e.g., opened food pod) that is accessible via the feeding port 160.

To facilitate discussion, a coordinate system 210 having three orthogonal axes is reproduced. As illustrated, the example coordinate system 210 includes a longitudinal axis 212, a lateral axis 214, and a vertical axis 216. In one embodiment, the longitudinal axis 212 is oriented along a direction a pet faces during food consumption out of the feeding port 160. In one embodiment, the lateral axis 214 is oriented perpendicular to the longitudinal axis and parallel to a ground on which the automatic food dispenser is positioned. In one embodiment, the vertical axis 216 is oriented along the same direction as the gravity vector. Additionally, in the context of rotational motion, the coordinate system 210 defines a roll direction 222 as rotation about the longitudinal axis 212, a pitch direction 224 as rotation about the lateral axis 214, and yaw direction 226 as rotation about the vertical axis 216.

Embodiments of the automatic food dispenser 110 selectively receive a food canister 170 adapted to contain therein a plurality of prepackaged servings of pet food, such as food pods 176 (FIG. 1). In this example, the automatic food dispenser 110 receives the food canister 170 and locks, via respective locking mechanisms, into a top component 202 of the enclosure 112. For example, the food canister 170 locks to the top component 202 by rotating the handle 174 on the lid 172. In one example, rotating the handle 174 causes rotation (e.g., in yaw direction 226) of a food canister base blade to lock the food canister 170 to the automatic food dispenser 110. In one embodiment, locking the food canister 170 to the automatic food dispenser 110 allows the food pods 176 to be dispensed out of the food canister 170 into the food pod holder 128 (FIG. 1) of the rotary plate 126 (FIG. 1), while the rotary plate rotates within the enclosure 112. In some embodiments, except for the content aligned with the feeding port 160, the contents inside the enclosure 112 remain sealed from the ambient air.

In some embodiments, the rotary plate 126 receives and secures the food pod 176 into the food pod holder 128, and thereafter rotates (e.g., along yaw direction 226) the food pod 176 until it is coaxially aligned beneath a de-lidding mechanism 140 (in one example, referred to as a "de-lidding position"), where the rotary plate 126 will stop so that the food pod 176 is opened. Embodiments of the de-lidding mechanism 140 automatically remove a top cover (e.g., a lid, seal, or other covering) from an unopened food pod 176. After the top cover is removed from the food pod 176, certain embodiments of the rotary plate 126 continue rotating underneath the top component 202 of the enclosure 112 until the opened food pod 176 is revealed in coaxial alignment with a feeding port 160 (in one example, referred to as a "feeding position") disposed on the top component 202 of the enclosure 112 of the automatic food dispenser 110. In some embodiments, the opened food pod 176 remains exposed beneath the feeding port 160 for a fixed or otherwise defined period of time (e.g., 15 minutes, 30 minutes, 1 hour, 2 hours, 3 hours, 4 hours, and the like) so that a pet or animal can consume the pet food stored in the opened pod. In some embodiments, the defined period of time corresponds to a feeding schedule that is dynamically adjusted based on pet feeding patterns and other parameters determined by the electronics module 179 (FIG. 1). After the defined period of time has expired, or upon explicit instruction, the automatic food dispenser 110 can activate the rotary plate 126 so that the pod continues to rotate beneath the top component 202 of the enclosure 112 until it is dropped, via a disposal port of a stationary plate 150 (FIG. 1), into the disposal compartment 122 (FIG. 1).

FIG. 2B is an exploded view of an automatic animal feeding system 230, in accordance with embodiments of the present disclosure. In one embodiment, the automatic animal feeding system 230 of FIG. 2B corresponds to the automatic animal feeding system 200 of FIG. 2A.

Starting from the top of FIG. 2B, the automatic animal feeding system 230 includes a food canister 170 that includes a handle 174 coupled to a handle hinge point 232 that enables the handle 174 to hinge about any suitable axis, such as the longitudinal axis 212. Additionally, the illustrated food canister 170 includes a lid 172 removable from the canister body 234 to expose the inside of the canister body 234. As illustrated, the food canister 170 also includes a rod 236 fixed to a food canister base blade 238. In one example, rotating the handle 174 causes rotation (e.g., in yaw direction 226) of the food canister base blade 238 to lock the food canister 170 to the automatic food dispenser 110. In this example, the food canister base blade 238 rotates (e.g., about 90 degrees along a plane spanned by the longitudinal and lateral axes 212 and 214) from being oriented toward the center of the automatic food dispenser 110 (as illustrated) to being oriented substantially along the longest length of the base of the food canister 170.

Continuing with FIG. 2B, the automatic animal feeding system 230 includes an enclosure 112 having a top component 202. As illustrated, the top component 202 includes a first opening corresponding to the feeding port 160 and a second opening corresponding to the canister opening 240. In some embodiments, the canister opening 240 includes a raised edge that mates with the base of the canister body to form a seal between the automatic food dispenser 110 and the food canister 170. In one example, the canister opening 240 is sized to be of the same shape as the base or cross section of the canister body 234.

Additionally, embodiments of the automatic food dispenser 110 include the camera assembly 188, which includes a camera lens 242 and a camera housing 244. In one embodiment, the camera lens 242 is oriented along the longitudinal axis 212 to face the feeding port 160, to record feeding activity. In one embodiment, the camera lens 242 and corresponding camera housing 244 are positioned on the enclosure at a vertical distance that is higher than the feeding port. In this manner, the camera assembly 188 can capture images associated with the inside of the feeding port, to facilitate determination of the feeding level of the food pod exposed via the feeding port 160.

To facilitate access to certain components of the electronics module 179 that are enclosed within the enclosure 112, embodiments of the top component 202 include a rear door 246 that includes an integrated speaker. In some embodiments, the rear door 246 opens to expose components inside the enclosure 112. In one embodiment, the rear door 246 is omitted, such that the rear side of certain embodiments of the tower only includes the integrated speaker.

In some embodiments, any number of gaskets 248 or other seals are utilized to facilitate pressure fits and create seals between components. For example, a first gasket 248A is used between the lateral component 204 and the top component 202. As another example, a second gasket 248B is used between a weight sensor 250, a sensor opening 252 of the stationary plate 150, and/or the food pod holder 128.

With regard to the de-lidding mechanism 140 of FIG. 2B, the de-lidding mechanism 140 can be enclosed in the tower portion 254 of the top component 202 of the enclosure 112. The de-lidding mechanism 140 can include a structural assembly 256 on which the components of the de-lidding mechanism 140 or the electronics module 179 are supported. For example, the structural assembly 256 of the de-lidding mechanism 140 supports the de-lidding motor 142, the lead screw 144 coupled to a split nut 258, and the cutting module 146.

With regard to the rotating assembly 120 of FIG. 2B, illustrated in FIG. 2B is the rotary plate 126, having the food pod holder 128; a plurality of pod chambers 124 fixed to each other; driven base 260; and a base rotation motor 121. In one embodiment, the base rotation motor 121 is fixed to a base enclosure 262 that forms a portion of the enclosure 112 that touches the ground. In some embodiments, the base rotation motor 121 is drivingly coupled to a drive shaft 264 that is coupled to the driven base 260 to cause rotation of the driven base 260 relative to the base enclosure 262 based on actuation of the base rotation motor 121. In this example, the driven base 260 includes engagement ridges that engage with the bottom of the plurality of pod chambers 124 to also cause the plurality of pod chambers 124 to rotate (e.g., along yaw direction 226 about the vertical axis 216) with the driven base 260 based on control signals that the base rotation motor 121 receives from a control system 180 (FIG. 1).

In addition to the base enclosure 262, certain components enclosed by or associated with enclosure 112 do not rotate based on actuation of the base rotation motor 121. For example, the stationary plate 150 remains stationary or fixed to the lateral component 204 during actuation of the base rotation motor 121. As illustrated, the stationary plate 150 includes a sensor opening 252 sized to receive the weight sensor 250 and a disposal port 266. In one embodiment, the disposal port 266 and the sensor opening 252 coaxially align with each other, such that they are equidistant from each other relative to the center of the stationary plate 150 or the axis of rotation of the stationary plate. The sensor opening 252 remains radially aligned with the feeding port 160, for example, even during actuation of the base rotation motor 121 and/or the de-lidding motor 142. In this example, the feeding port 160 is directly above the sensor opening 252. In one embodiment, the disposal port 266 connects the disposal compartment 122 and the rotary plate 126. The disposal port 266 is radially offset from the feeding port 160, such that the feeding port 160 is not directly above the disposal port 266 along the vertical axis 216.

As illustrated, the enclosure 112 includes a handle lever 268, that when engaged, releases a locking mechanism coupling the top component 202 and the lateral component 204. As illustrated in FIG. 7J, releasing or engaging the handle lever 268 allows the top component and corresponding parts to hinge about a hinge point 270 opposite of the handle lever 268 to expose the inside of the automatic food dispenser 110.

Figure 2C:
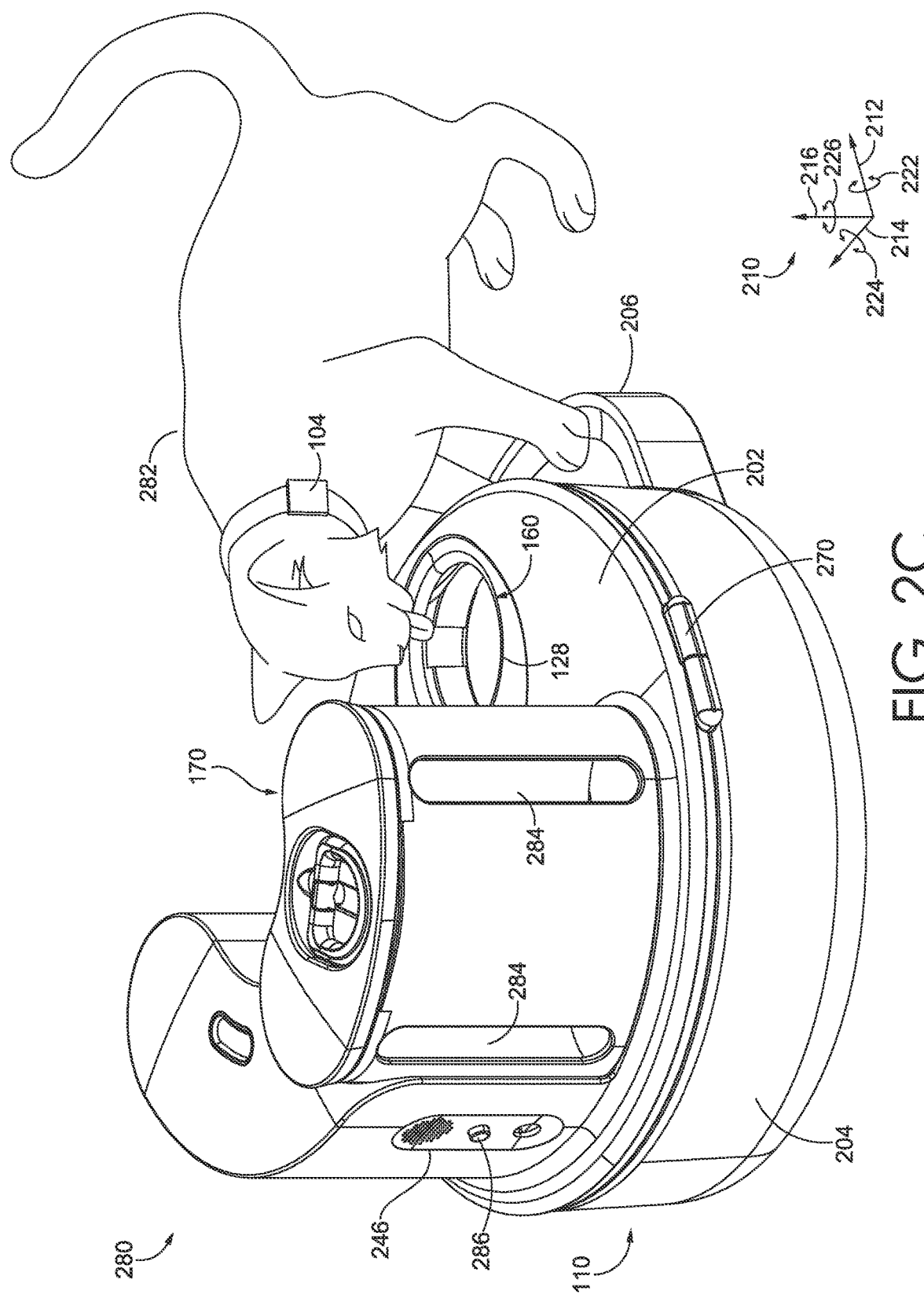
FIG. 2C is a rear view of an automatic animal feeding system, in accordance with embodiments of the present disclosure.

To facilitate showing the hinge point 270, FIG. 2C is a rear view of an automatic animal feeding system 280, in accordance with embodiments of the present disclosure. In one embodiment, the hinge point 270 is positioned opposite the handle lever 268 (FIG. 2B). In some embodiments, engaging with the handle lever 268 allows the top component 202 and other components on the top portion of the automatic food dispenser 110 to rotate in roll direction 222 about the longitudinal axis on the hinge point 270.

As illustrated in FIG. 2C, the automatic animal feeding system 280 allows a pet 282 to access the feeding port 160 and consume food from a food pod 176 (FIG. 1) positioned within the food pod holder 128 in the feeding position or otherwise aligned with the feeding port 160. In some embodiments, the pet stand 206 couples to the base enclosure 262 (FIG. 2B). The pet stand 206 allows pets 282 to rest their paws to allow them greater leverage to access the feeding port 160.

In some embodiments, the food canister 170 includes one or more transparent surfaces 284 that allow for the visual inspection of the inside of the food canister 170. The transparent surface 284 may be manufactured from any suitable transparent material, such as glass, clear plastic, and the like, for example. In one example, the surface 284 is translucent to avoid light to enter the food canister 170 to better preserve food. In one example, the surface 284 is omitted. A user can visually inspect the rear or lateral component 204 of the food canister 170 to identify how many pods are currently inside the food canister 170. In this manner, a user can visually inspect the food canister 170 to determine when the food canister needs to be filled with food pods 176 (FIG. 1), saving the user time in disconnecting the food canister 170 from the automatic food dispenser 110. As discussed herein, the top component 202 includes a rear door 246 that may include an integrated speaker. In some embodiments, the rear door 246 opens to expose components inside the enclosure 112. The rear door 246 may include a button 286 that, when selected, can control the integrated speaker, cause the rear door 246 to open, or activate any other function.

FIG. 3A is a perspective view of an automatic animal feeding system 300, in which the top component 202 (FIGS. 2A, 2B, 2C, and 2D) of the enclosure 112 of the automatic food dispenser 110 has been hidden from view to show components under the top component 202 of the enclosure 112, in accordance with embodiments of the present disclosure. As illustrated, removing the top component 202 shows the rotary plate 126, the components of the de-lidding mechanism 140, the gear assembly 125, and the base rotation motor 121. To facilitate discussion of certain motion, the illustrated embodiment includes two axes of rotation.

First, the illustrated embodiment includes a first axis of rotation 302 that is substantially oriented along the vertical axis 216 (e.g., along the gravity vector) and defines a rotation direction 304 (e.g., yaw 226) of certain components of the rotating assembly 120, such as food pod holder 128, the rotary plate 126, and/or the disposal compartment 122 (FIG. 1). The first axis 302 may intersect the center of the disposal compartment 122, the rotary plate 126, or any other component of the rotating assembly 120 at a corresponding center point. In one embodiment, the base rotation motor 121 causes rotation of the rotary plate 126 and the disposal compartment 122 along the rotation path 702 (FIG. 7). As illustrated, the center of the food pod holder is a distance 305 from the first axis 302. In one example, the distance 305 corresponds to a radial distance away from the first axis 302, for example, to a center of a circle (of the feeding port 160, the disposal port 266, and the food pod holder 128) or other shape. In some embodiments, each of the two chambers of the food canister 170 have center points that are also the distance 305 away from the first axis 302. Similarly, in one embodiment, the cutting module 146 has a center point that is also the distance 305 away from the first axis 302. Accordingly, rotation of the rotary plate 126 about the first axis 302 causes the food pod holder 128 to be directly under and concentric to at least one of the two chambers of the food canister 170 or the de-lidding mechanism 140 (e.g., the cutting module 146).

Second, the illustrated embodiment includes a second axis of rotation 306 that is substantially oriented along the vertical axis 216 (e.g., along the gravity vector) and defines a second rotation path 308 (e.g., yaw 226) of certain components of the de-lidding mechanism 140, such as the lead screw 144 and/or the cutting module 146. In one embodiment, the de-lidding motor 142 causes rotation of the cutting module 146 (e.g., along the screw threads of the lead screw 144), such that corresponding blades 309 rotate along the second rotation path 308. The blades 309 may include any suitable piercing members disposed around the perimeter of the underside of the cutting module 146. In one embodiment, the blades 309 are sized and made of any suitable material capable of piercing a lid of a food pod 176. For example, the blades 309 are made of a metal alloy, steel, cemented carbide, cubic boron nitride, aluminum oxide, silicon nitride, and/or any other material helpful in removing a lid or cover of the food pods 176.

The illustrated food canister 170 includes the food canister base blade 238 oriented toward the first axis 302. In this orientation, the food canister base blade 238 would be positioned under the top component 202 (omitted from this FIG. 3A) and locked in place. Additionally, in this orientation, the food canister base blade 238 would no longer prevent the food pods in the two chambers of the food canister 170 from contacting the rotary plate 126. In other words, when the food canister base blade 238 is oriented as illustrated, the food canister base blade does not create a barrier between the food pods inside the food canister 170 and the rotary plate 126.

Figure 3B:
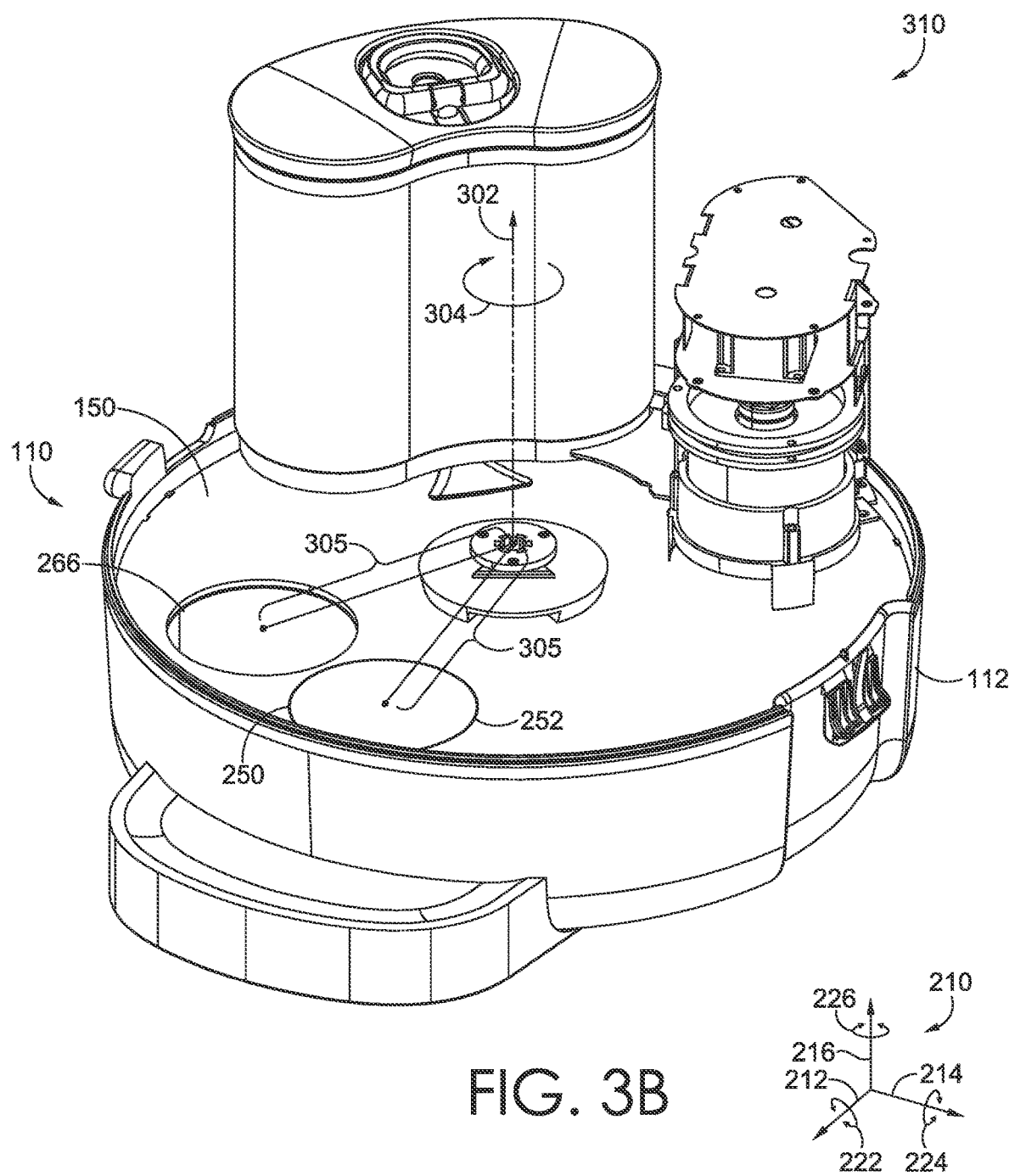
FIG. 3B is a perspective view of an automatic animal feeding system having an enclosure and rotary plate of the automatic food dispenser hidden from view, in accordance with embodiments of the present disclosure.

FIG. 3B is a perspective view of an automatic animal feeding system 310, for which the top component 202 (FIG. 2) of the enclosure 112 and rotary plate 126 (FIG. 1) have been omitted to depict the components that are under the top component 202 of the enclosure 112 and the rotary plate 126. As compared to FIG. 3A, the rotary plate 126 has been removed in FIG. 3A.

As illustrated, the stationary plate 150 includes a sensor opening 252 and a disposal port 266, each of which is circular or oval, although openings of other shapes are also contemplated by this disclosure. In some embodiments, the sensor opening 252 is sized to couple to the weight sensor 250, and the disposal port 266 is at least large enough so that a food pod has space to drop through the disposal port 266 along the vertical axis 216 into the disposal compartment 122. In one embodiment, the feeding port 160 defines, along the vertical direction 216 of the opening of the rotary plate 126, a conduit toward a weight sensor 250 positioned below the top component 202 of the rotary plate 126 or the elevation corresponding to the opening of the rotary plate 126. In this manner, the weight sensor 250 can generate a weight signal indicative of a weight of content positioned within the feeding port 160 so that the control system can determine whether the weight signal is at, above, or below a threshold value of weight, as discussed herein.

In one embodiment, the weight sensor 250 generates a signal indicative of a weight of the food pod while the food pod 176 is in the feeding positioned and aligned with the feeding port 160. For example, the weight sensor 250 communicates time-stamped signals indicative of the weight of the food pod while the food pod 176 is ready for pet consumption. In one example, the weight sensor 250 communicates a sensor signal to the control system 180 (FIG. 1) at predefined times, upon a manual user request, when the food pod 176 is initially aligned with the feeding port 160 (or positioned on the weight sensor 250), or based on detection of a triggering event. As a first example of a triggering event, the control system 180 receives an indication, via the camera assembly 188, that the pet is approaching the feeding port 160 to begin consuming food. As a second example of the triggering event, the control system 180 receives an indication, via the weight sensor 250, that the weight measurement is changing. As a third example, the control system 180 receives an indication, via the weight sensor 250, that the weight measurement changed as a result of receiving a food pod. Other triggering events are also contemplated by this disclosure. Based on the triggering event, based on manual user requests, or based on the predefined times, embodiments of the weight sensor 250 communicate time stamped sensor signals to the control system 180. Based on these time stamped sensor signals from the weight sensor 250, the control system 180 can access or determine an amount of food consumed by the pet over a period of time. Thereafter, the control system 180 can associate the change in weight measurements to an amount of pet food consumed by a particular pet.

The control system 180 may aggregate the food consumed across one or more feeding cycles to determine analytics associated with the food consumed by a pet. The control system 180 receives the weight sensor signals over a period of time, for example, for different food pods consumed by a pet to determine a total amount of food consumed by the pet, average amount of food (in terms of weight) consumed by the pet, and other analytics that can be provided to a user, such as those illustrated in the graphical user interfaces of FIGS. 8A, 8B, and 8C. After a predetermined time or after determining that the weight measurement of the food pod 176 has dropped below a threshold weight amount (for example, indicative of the food pod being empty or near empty), control system 180 may instruct the base rotation motor 121 to further actuate to cause the rotary plate 126 to rotate until the food pod 176 drops through the disposal port 266, as described herein. Thereafter, the feeding process/cycle can repeat.

In some embodiments, the sensor opening 252 and the disposal port 266 are of the same or substantially similar size and shape. In one embodiment, the center point of the sensor opening 252 and the disposal port 266 are equidistant from the first axis 302. As illustrated, the center point of each of the sensor opening 252 and the disposal port 266 is a distance 305 from the first axis 302. In one embodiment, the sensor opening 252, the disposal port 266, the feeding port 160 (FIGS. 1 and 2), and the food pod holder 128 are radially equidistant from the first axis 302. For example, these components are a distance 305 from the first axis 302. As discussed herein, in some embodiments, the stationary plate 150 remains stationary and does not move with the rotating assembly 120 (FIG. 1). For example, the stationary plate 150 is not drivingly coupled to the base rotation motor 121 or the de-lidding motor 142.

Figure 3C:
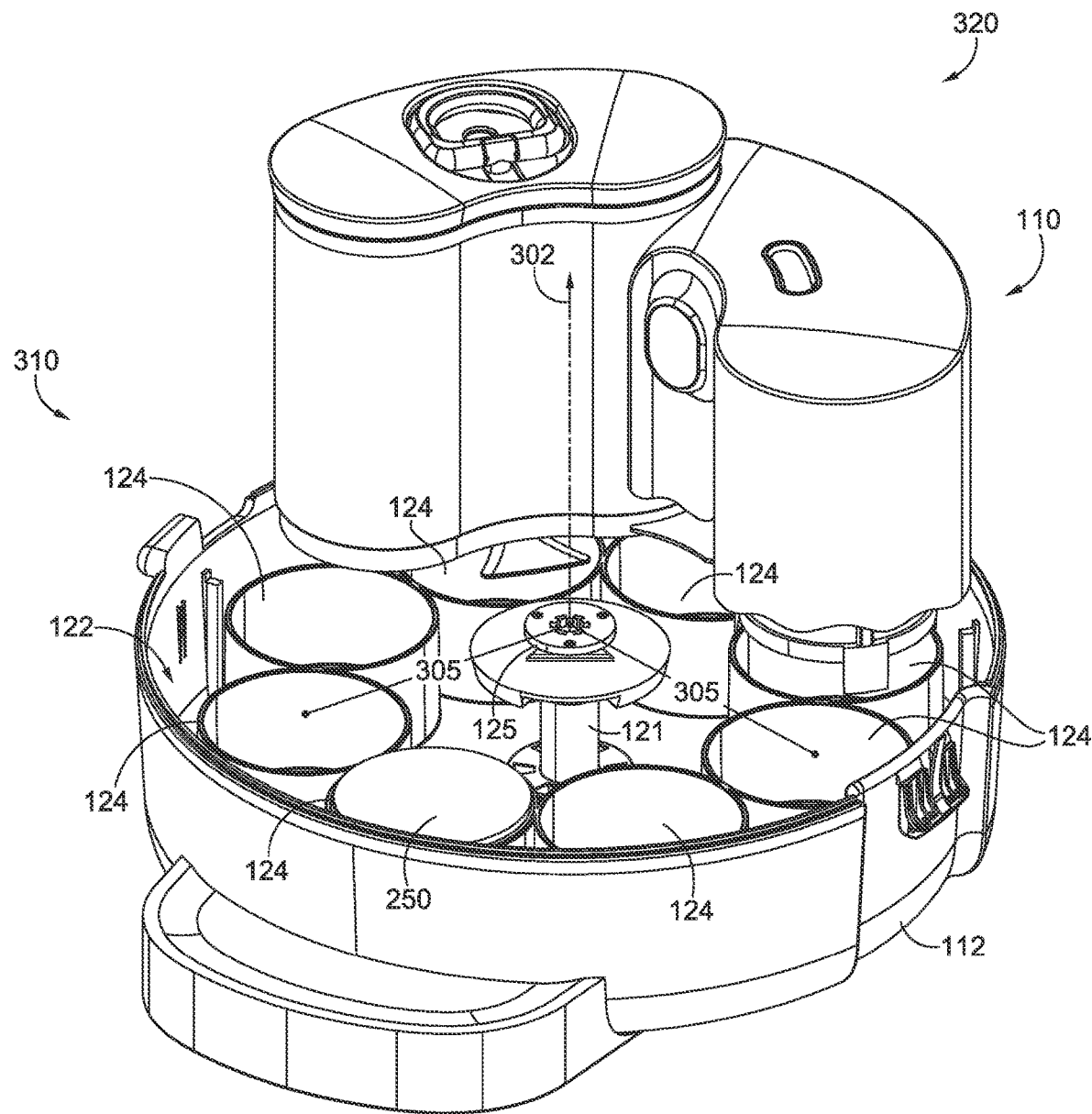
FIG. 3C is a perspective view of an automatic animal feeding system having an enclosure, a rotary plate, and a stationary plate of the automatic food dispenser hidden from view, in accordance with embodiments of the present disclosure.
Figure 3C:
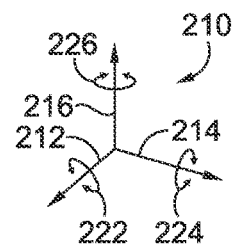

FIG. 3C is a perspective view of an automatic animal feeding system 320, for which the top component 202 (FIG. 2) of the enclosure 112, the rotary plate 126 (FIG. 1), and the stationary plate (FIG. 3B) have been omitted to depict the components that are under the top component 202 of the enclosure 112, the rotary plate 126 (FIG. 3A), and the stationary plate 150 (FIG. 3B). In FIG. 3C, as compared to FIG. 3A, the rotary plate 126 and the stationary plate 150 have been removed, and as compared to FIG. 3B, the stationary plate 150 has been removed.

In some embodiments, the automatic food dispenser 110 includes a plurality of pod chambers 124 that are each sized to accommodate a plurality of food pods. As illustrated, a weight sensor 250 (FIG. 3B) is sized to fit over one pod chamber 124, and is coupled to the stationary plate 150 (FIG. 3B). In some embodiments, the pod chambers 124 are positioned within the disposal compartment 122 and radially disposed around the first axis 302. For example, each of the pod chambers 124 are equidistant from the first axis of rotation of the disposal compartment 122, as shown by distance 305. In one embodiment, the sensor opening 252 (FIG. 3B), the disposal port 266 (FIG. 3B), the feeding port 160 (FIGS. 1 and 2), the food pod holder 128, and the pod chambers 124 are radially equidistant from the first axis 302. For example, these components are a distance 305 from the first axis 302. Although the illustrated embodiment includes eight pod chambers that are touching each other, it should be understood that this disclosure is not limited to any specific number of pod chambers. Indeed, embodiments of any suitable number (e.g., one, two, four, six, ten, and the like) or sizes of pod chambers are contemplated, such that the pod chamber may or may not abut against another pod chamber.

Figure 3D:
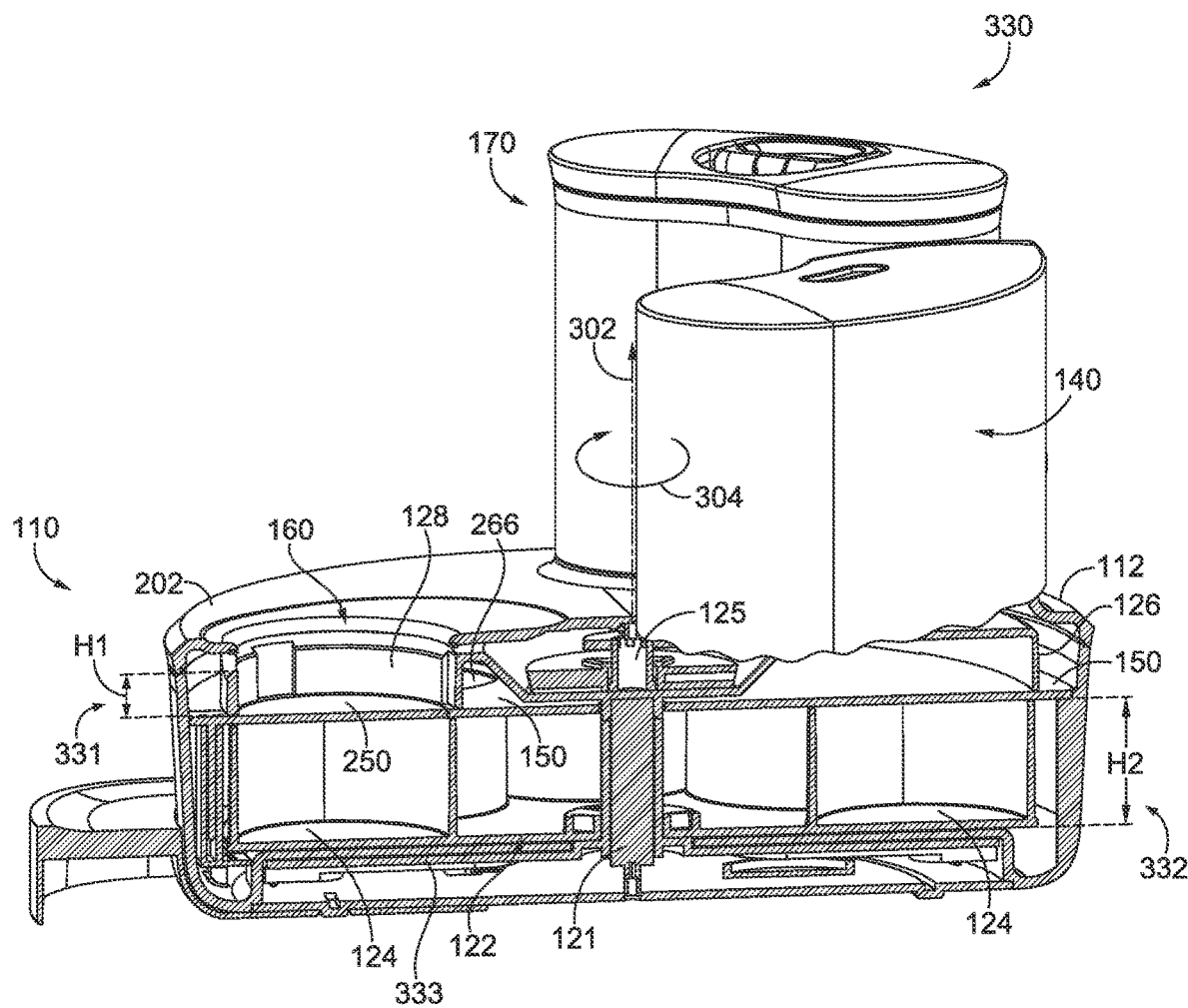
FIG. 3D is a lateral cross-section view of an automatic animal feeding system, in accordance with embodiments of the present disclosure.
Figure 3D:
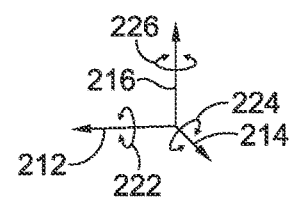

Turning to FIG. 3D, depicted is a lateral cross-section view of an automatic animal feeding system 330, in accordance with embodiments of the present disclosure. Certain components depicted in FIG. 3D correspond to the components depicted in the exploded view of FIG. 2B. As illustrated, the cross section of the automatic food dispenser 110 is taken along a plane spanned by the longitudinal axis 212 and the vertical axis 216. As illustrated, the rotary plate 126 rotates about the first axis 302 in direction 304 within a first section 331 within the enclosure 112, and the disposal compartment 122 rotates about the first axis 302 in direction 304 within a second section 332. In one embodiment, the first section 331 is at a vertically higher distance than the second section 332. In one embodiment, the first section 331 is defined as the region within enclosure 112 that is enclosed by the top component 202 on top, the lateral component 204 on the sides, and the stationary plate 150 toward the bottom. As illustrated, the first section 331 includes the rotary plate 126 and the food pod holder 128. In one embodiment, the food pod holder having a depth (e.g., H1) and cross-section area (e.g., along a plane spanned by the longitudinal axis 212 and the lateral axis 214) sized similarly to the food pod 176, to secure the food pod 176. In this example, the depth of the food pod holder 128 defines a path toward at least one of: a weight sensor 250, the stationary plate 150, or a disposal port 266 of the stationary plate 150. The depth of the food pod holder 128 may be substantially similar to the height (e.g., the distance between the base and the top-most portion) of a food pod 176.

In this manner, embodiments of the automatic food dispenser 110 secures the food pod 176 within the food pod holder 128 during aspects of the automatic feeding process. For example, during certain aspects of the automatic feeding process, a food pod 176 positioned within the food pod holder 128 is (1) radially secured by the inner surface(s) of the food pod holder, is (2) secured at the top by the enclosure 112 (when the food pod holder is positioned within the enclosure and not aligned with the feeding port 160), and is secured at the bottom by at least one of a weight sensor 250, the stationary plate 150, or a disposal port 266 of the stationary plate 150.

In one embodiment, the second section 332 is defined as the region within the enclosure 112 that is enclosed by the stationary plate 150 on top, the lateral component 204 on the sides, and the base on which the pod chambers 124 sit. In one embodiment, the base 333 on which the pod chambers sit and the pod chambers 124 are one single component, while in another embodiment, the pod chambers 124 and the base on which they sit are separate components. The first section 331 and the second section 332 are connected via the disposal port 266 of the stationary plate. As illustrated, the first section 331 has a first height H1, while the second section 332 has a second height H2. The heights of the sections are defined by the components defining the respective section along the vertical axis 216. In one embodiment, the pod chambers accommodate more food pods than the food pods that fit in the food pod holder 128, such that H2 is larger than H1. However, it should be understood that H1 and H2 may be of any suitable dimensions, such that H2 and H1 are the same height or H2 is smaller than H1.

As illustrated, the first section 331 is at a higher elevation than the second section 332. Accordingly, the first section 331 has a base (e.g., bottom portion of H1) that is at a higher elevation than a base (e.g., bottom portion of H2) of the second section 332. In this manner, the food pod 176 can transition from (1) being at a first elevation associated with the first section 331 during rotation along the food pod holder 128 to (2) being at a second elevation (below the first elevation) when the food pod 176 drops via the disposal port 266 into the disposal compartment 122. For example, actuation of the base rotation motor 121 causes the food pod 176 to transition from being (1) aligned with the feeding port 160 at a first elevation to being positioned within a respective pod chamber 124 of the plurality of pod chambers 124 at a second elevation that is lower than the first elevation.

Figure 3E:
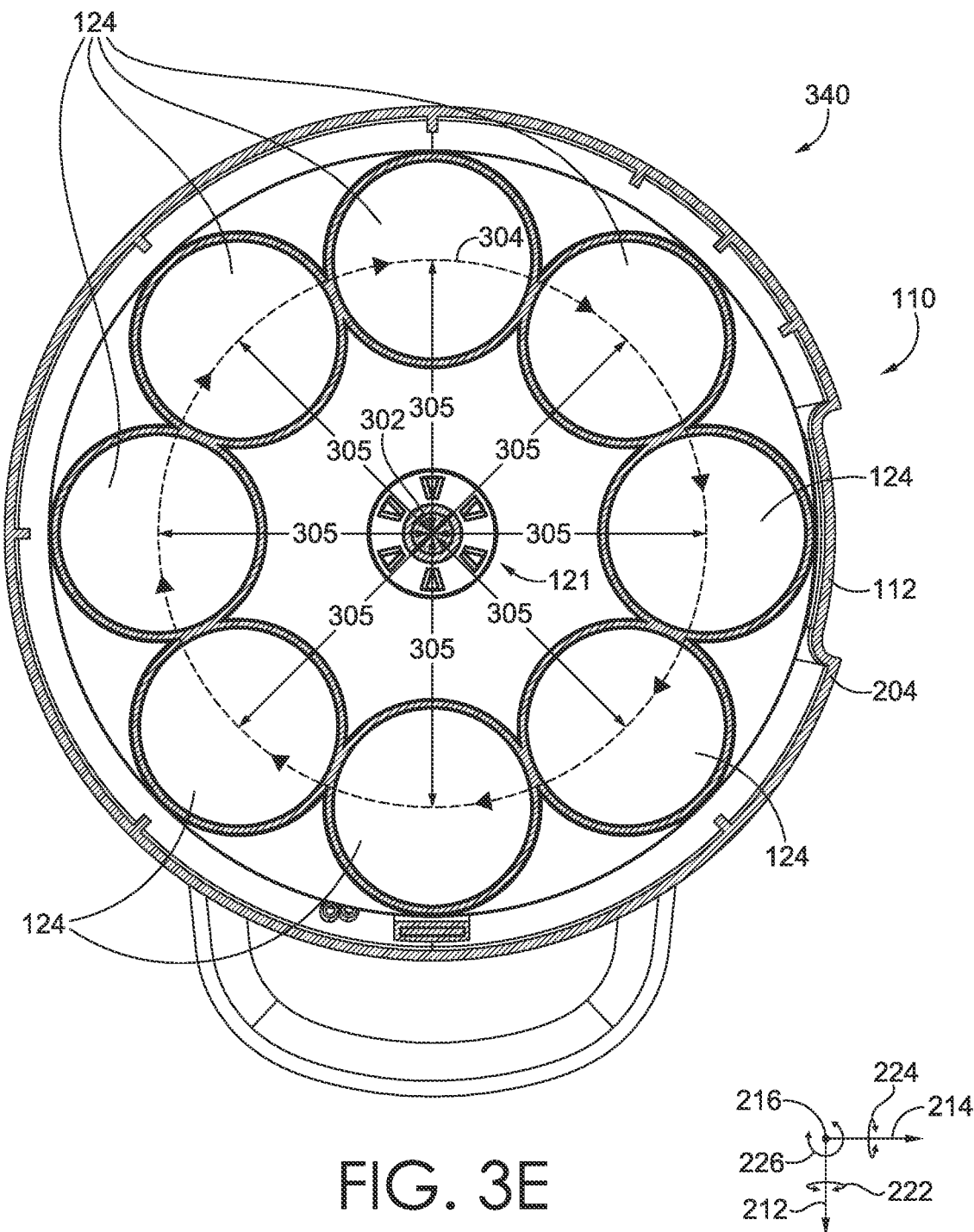
FIG. 3E is a vertical cross-section view of an automatic animal feeding system, in accordance with embodiments of the present disclosure.

FIG. 3E is a vertical cross-section view of an automatic animal feeding system 340, in accordance with embodiments of the present disclosure. Certain components depicted in FIG. 3E correspond to the components depicted in the exploded view of FIG. 2B. As illustrated, the cross-section of the automatic food dispenser 110 is taken along a plane spanned by the longitudinal axis 212 and the lateral axis 214. In one embodiment, the enclosure 112 has a vertical cross section that is substantially round, except for the portion having the handle lever 268 (FIG. 2B) that, when engaged, causes the top component 202 (FIG. 2B) to hinge relative to the lateral component 204. As illustrated, the pod chambers 124 rotate together about the first rotation axis 302 along a rotation direction 304. In one embodiment, the rotation direction 304 is along the rotation direction 304 (FIG. 2B). In some embodiments, the pod chambers 124 are equidistant, for example, a distance 305, from the first axis of rotation 302.

FIG. 3F is a bottom view of an automatic animal feeding system 350, in accordance with embodiments of the present disclosure. As illustrated, the bottom side of the automatic food dispenser 110 includes a base enclosure 262 coupled to the pet stand 206. In one embodiment, the base enclosure 262 forms the lower component or surface of the enclosure 112 of the automatic food dispenser. In one embodiment, the base enclosure includes an opening that receives a component of the base rotation motor to fix the base rotation motor 121 to the enclosure 112. The rotating assembly 120 can rotate about the first axis 302 along direction 304 on top of the base enclosure 262. As illustrated, the base enclosure 262 couples to the handle lever 268. As illustrated in FIG. 7J, releasing or engaging the handle lever 268 allows the top component 202 and corresponding parts to hinge about a hinge point 270, opposite of the handle lever 268, to expose the inside of the automatic food dispenser 110.

Turning to FIG. 4A, depicted is a perspective view of a food canister 170 of an automatic animal feeding system 400 that is removable from an automatic food dispenser 110 (FIG. 1), in accordance with embodiments of the present disclosure. The illustrated food canister 170 includes a handle 174 coupled to a handle hinge point 232 that enables the handle 174 to hinge about any suitable axis, such as the lateral axis 214. For example, as illustrated, the handle 174 hinges along pitch direction 224 about the lateral axis 214 (e.g., a first axis) from a horizontal position 402 to a first vertical upright position 404. Continuing this example, while the handle 174 is in the first vertical upright position 404, the handle is rotated about the vertical axis 216 (e.g., a second axis) in yaw direction 226 to a second vertical upright position 406.

While the handle 174 is in the horizontal position 402 and the first vertical upright position 404, the food canister base blade 238 may be oriented along the longitudinal axis 212 (as shown in FIG. 3A). In one embodiment, when the handle 174 is in the horizontal position 402 and the first vertical upright position 404, a portion of the food canister base blade 238 is inside the enclosure 112 to lock the food canister 170 to the enclosure 112. When the food canister base blade 238 may be oriented along the longitudinal axis 212 (as shown in FIG. 3A), certain embodiments of the food canister base blade 238 prevent food pod 176 from dropping out of the food canister 170 through the canister opening 240 (FIG. 2B).

While the handle 174 is in the second vertical upright position 406, the food canister base blade 238 may be oriented along the lateral axis 214. In one embodiment, when the handle 174 is in the second vertical upright position 406, the food canister base blade 238 forms a base of the food canister and is not inside the enclosure 112. In this manner, the food canister 170 can be removed from the enclosure. While the handle 174 is oriented in the second vertical upright position 406, the handle 174 and the lid 172 are removable, for example, by causing the handle 174 to slide through lid opening 408. When the food canister base blade 238 is oriented along the lateral axis 214, certain embodiments of the food canister base blade 238 allow the food pod 176 to drop from the food canister 170 through the canister opening 240 (FIG. 2B) onto a component of the automatic food dispenser 110. It should be understood that manipulating the handle 174 (e.g., by rotating a food canister base blade forming a base of the food canister) causes certain embodiments of the food canister 170 to become selectively unlocked from or locked to any component of the automatic food dispenser 110, such as the enclosure 112.

FIG. 4B is an exploded view of a food canister 170 of an automatic animal feeding system 410, in accordance with some embodiments of the present disclosure. In one embodiment, the food canister 170 includes a lid 172, a handle 174, a rod 236, and a food canister base blade 238. FIG. 4C omits the canister body 234 and depicts a perspective view of the handle 174, handle hinge point 232, and the food canister base blade 238 assembled together. In one embodiment, the handle 174, handle hinge point 232, and the food canister base blade 238 form a locking mechanism for the food canister 170, as described herein. The lid 172 is removable from the canister body 234 by manipulating the handle 174, as discussed with respect to FIG. 4A. In one embodiment, the rod 236 is fixed to the food canister base blade 238, such that rotation of the rod 236 causes a similar rotation of the food canister base blade 238. For example, rotating the handle 174 causes rotation (e.g., in yaw direction 226) of the food canister base blade 238 to lock or unlock the food canister 170 to the automatic food dispenser 110 (FIG. 2B). In this example, the food canister base blade 238 rotates (e.g., about 90 degrees along a plane spanned by the longitudinal and lateral axes 212 and 214) from being oriented toward the center of the automatic food dispenser 110 (FIG. 2B) to being oriented substantially along the longest length 414 of the base of the food canister 170.

In some embodiments, removing the lid 172 from the canister body 234 exposes the inside of the canister body 234. The canister body 234 can hold any suitable number of unopened or sealed food pods 176. For example, food pods 176 are stacked along a height of the canister body 234. The bottom of the canister body 234 is hollow so that the food pods can drop (e.g., fall or be vertically displaced by gravity into the food pod holder 128 [FIG. 1] of the rotary plate 126. Although the illustrated canister body 234 is a two-chamber member, it should be understood that embodiments of the canister body 234 may include any other suitable number of chambers, such as 1, 3, 4, 5, and so forth.

FIGS. 5A, 5B, and 5C are respective perspective views of a de-lidding mechanism 140 and corresponding mounting assembly 500 of an automatic animal feeding system 502, in accordance with embodiments of the present disclosure. Embodiments of the de-lidding mechanism 140 are positioned under the enclosure 112, such that they are not exposed to the ambient air, but the enclosure 112 has been omitted from FIGS. 5A, 5B, and 5C to facilitate illustration. The mounting assembly 500 includes a first bracket 510, a second bracket 512, a mounting chassis 514, a base motor housing 516, and a de-lidding motor housing 520. In one example, the first bracket 510 is fixed to the mounting chassis 514, provides structure to the cutting module 146, and serves as a surface for mounting components (e.g., a battery) of the electronics module 179. In one example, the second bracket 512 rigidly couples the de-lidding motor housing 520 and the mounting chassis 514. In one example, the base motor housing 516 houses the base rotation motor 121 that is drivingly coupled to the rotary plate 126 (FIG. 1) and the disposal compartment 122. In one example, the de-lidding motor housing 520 at least partially encloses the de-lidding motor 142, as illustrated.

Certain illustrated embodiments include the second axis of rotation 306 that is substantially oriented along the vertical axis 216 (e.g., along the gravity vector) and defines a second rotation path 308 (e.g., yaw 226) of certain components of the de-lidding mechanism 140, such as the lead screw 144 and/or the cutting module 146. In one embodiment, the de-lidding motor 142 causes rotation of the cutting module 146 (e.g., along the screw threads of the lead screw 144), such that corresponding blades 309 rotate along the second rotation path 308. In one embodiment, rotating the lead screw 144 and/or the cutting module 146 along the second rotation path 308 causes the vertical displacement of the cutting module 146. For example, vertically displacing the cutting module 146 to downwardly descend onto the unopened food pod 176 causes the cutting module 146 to pierce the lid, and further rotation of the cutting module 146 causes the lid to be removed from the food pod 176.

To facilitate centering the cutting module 146 over a food pod directly below the cutting module 146, the cutting module includes a centering mount 522 that is concentric with the food pod holder 128 (FIG. 1) when the rotary plate 126 rotates so that the food pod holder 128 is directly below the cutting module 146. In one embodiment, the center point of the centering mount 522 is a distance 305 (FIG. 3A) from the first axis of rotation 302 (FIG. 3A). In one embodiment, the centering mount 522 radially encloses the cutting module 146 that is concentric with the food pod holder 128 of the rotary plate 126. The centering mount 522 may surround a cutter 524. In one embodiment, the cutter 524 refers to the portion of the cutting module 146 that rotates based on actuation of the de-lidding motor 142.

Figure 5D:
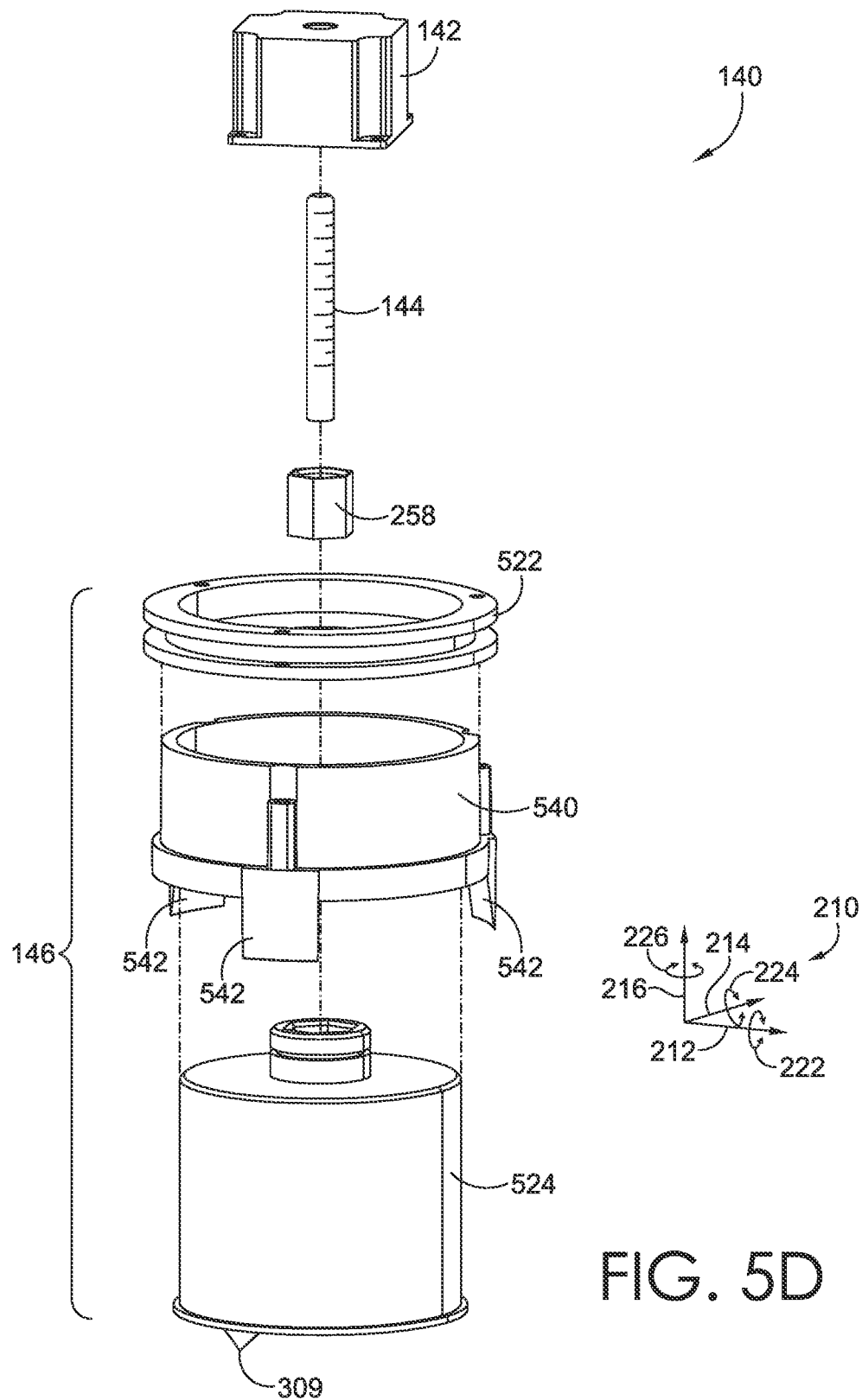
FIG. 5D is an exploded view of a de-lidding mechanism of an automatic animal feeding system, in accordance with embodiments of the present disclosure.

As shown in FIG. 5D, the cutter 524 may be directly coupled to a split nut 258 that is coupled to the lead screw 144, such that the threads of the split nut 258 engage with the threads of the lead screw 144. Embodiments of the cutter 524 include an assembly of blades 309. In one embodiment, the blades 309 are sized to any suitable size and/or manufactured out of any suitable material capable of piercing a lid of a food pod 176. For example, the blades 309 are made of a metal alloy, steel, cemented carbide, cubic boron nitride, aluminum oxide, silicon nitride, and so forth.

The cutting module 146 illustrated in FIG. 5D includes a centering plate 540 that surrounds the cutter 524. In one example, the centering plate 540 is coaxially aligned with the food pod holder 128, such that the centering plate 540 may share a center point with the food pod holder 128 while the cutting module 146 removes a lid or cover from a food pod 176 positioned within the food pod holder 128. In one embodiment, the centering plate 540 includes one or more alignment tabs 542 disposed around the perimeter of the centering plate 540, for example, along the illustrated side openings on the perimeter of the centering plate 540. In one embodiment, when the food pod holder 128 is positioned below and concentric with the centering plate 540, the alignment tabs 542 align with the sides (e.g., inner circumference) of the food pod holder 128 or of the food pod 176 to reduce vibrations or movement associated with the de-lidding mechanism 140 removing a cover of the food pod 176. For example, the alignment tabs 542 engage with the circumference of the food pod holder 128 or the food pod 176 inside the food pod holder 128 as the cutting module 146 descends downward onto the food pod 176. In this manner, certain embodiments of the blades 309 can consistently pierce the lid or cover of the food pod 176 with minimal variability in vibrations or irregular movement of the cutting module 146 or other components of the de-lidding mechanism 140.

Figure 6:
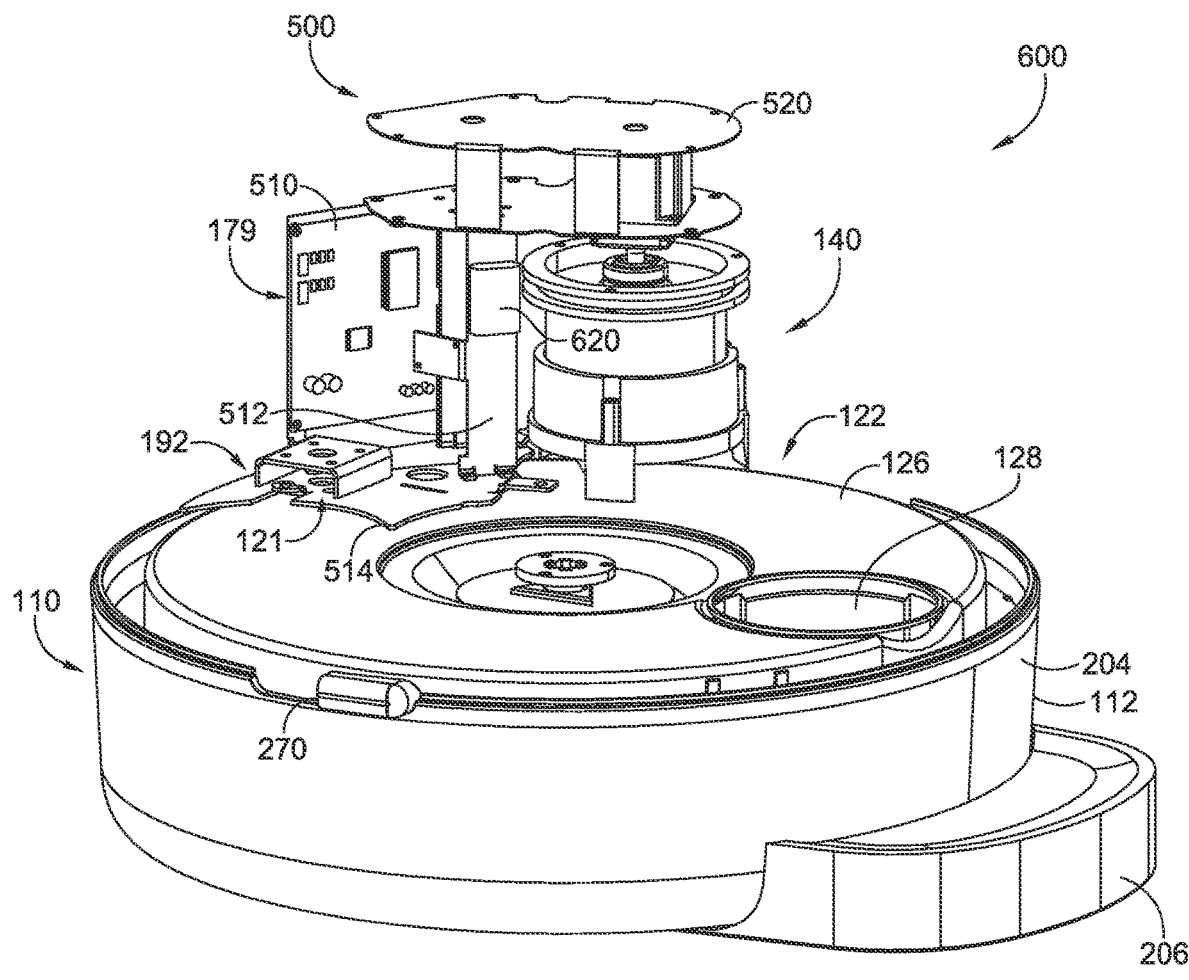
FIG. 6 is an automatic animal feeding system having an electronics module, in accordance with embodiments of the present disclosure.
Figure 6:
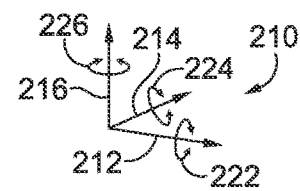
Figure 18:
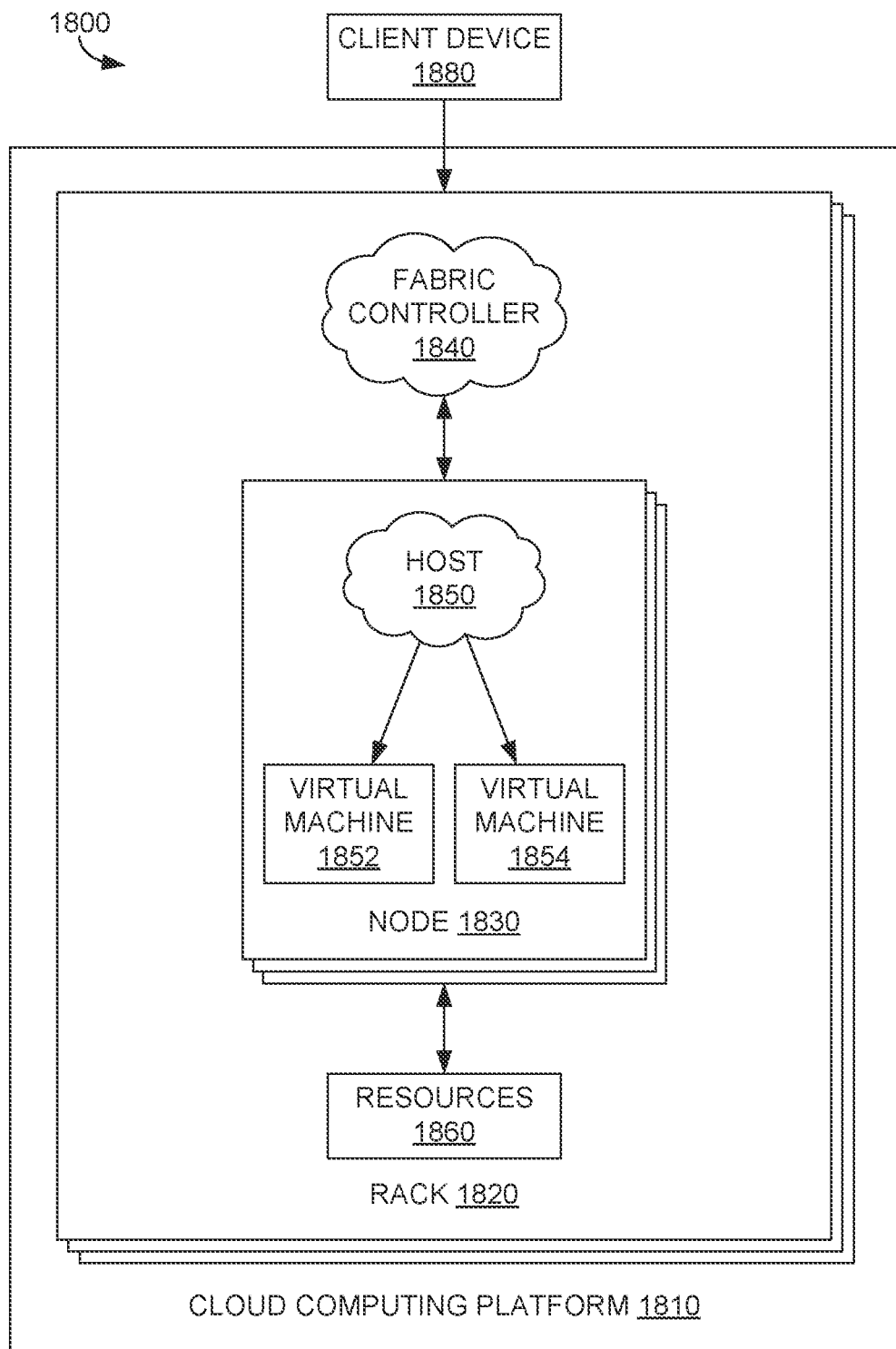
FIG. 18 is a block diagram of an example computing device suitable for use in implementing aspects of the technology described herein.

FIG. 6 is an automatic animal feeding system 600 having an electronics module 179, in accordance with embodiments of the present disclosure. In some embodiments, the electronics module 179 is enclosed by the enclosure 112 to protect the electronics module 179 from the elements. Example components included in the electronics module 179 are illustrated in FIGS. 1, 17, and 18. Components of the electronics module 179 can be mounted on any suitable component of the automatic food dispenser 110. For example, certain components of the electronics module 179 are mounted on any component of the mounting assembly 500, such as the first bracket 510, the second bracket 512, the mounting chassis 514, the base motor housing 516, and/or the de-lidding motor housing 520. As illustrated, the electronics module 179 includes a battery 620 mounted onto one of the components of the mounting assembly 500. Embodiments of the battery 620 power components of the electronics module 179. For example, the battery 620 corresponds to the power supply 1722 of FIG. 17.

FIGS. 7A, 7B, 7C, 7D, 7E, 7F, 7G, 7H, 7I, 7J, and 7K depict a variety of perspective views of the automatic animal feeding system 700 performing aspects of an automatic feeding process, in accordance with embodiments of the present disclosure. In association with these illustrations, certain embodiments are discussed as moving or displacing, as discussed herein. In some embodiments, the movements, displacements, and actuations are automatically caused by a control system, such as the control system 180 of FIG. 1, which sends a control signal to a particular component of the automatic animal feeding system 700. For example, a control system 180 sends a first control signal to a base rotation motor 121 (FIG. 1) to cause rotation of any component of the rotating assembly 120, and/or the control system 180 sends a second control signal to a de-lidding motor 142 (FIG. 1) to cause rotation of any component of the de-lidding mechanism 140. The control system 180 may send the control signals in response to a triggering event, such as receipt of a sensor signal or any other component of the electronics module 179.

Figure 7A:
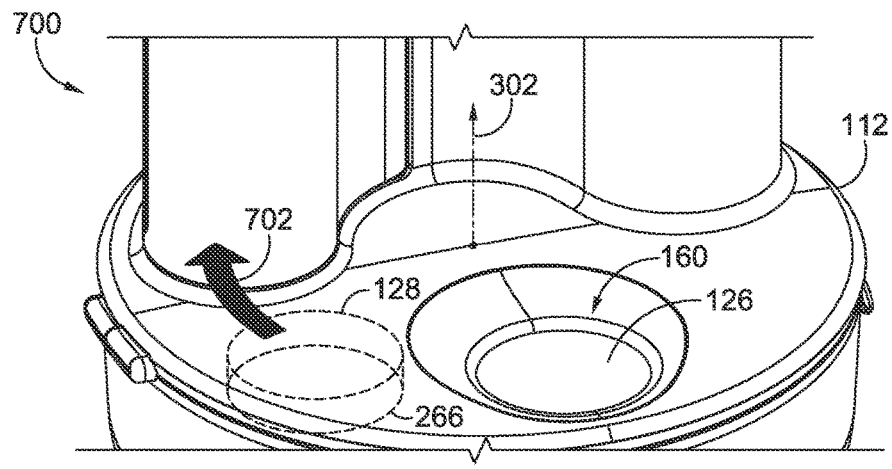
FIGS. 7A, 7B, 7C, 7D, 7E, 7F, 7G, 7H, 7I, 7J, and 7K depict a variety of perspective views of the automatic animal feeding system performing an automatic feeding process, in accordance with embodiments of the present disclosure.
Figure 7A:
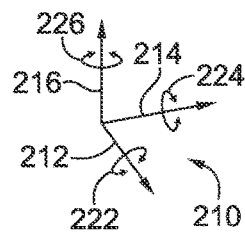

In FIG. 7A, the automatic feeding process includes causing a base rotation motor 121 (FIG. 1) to actuate to cause the rotary plate 126 to rotate about the first axis 302 along rotation path 702. In one embodiment, the automatic feeding process is implemented by components of the automatic animal feeding system, such as the control system 180 (FIG. 1).

Figure 7B:
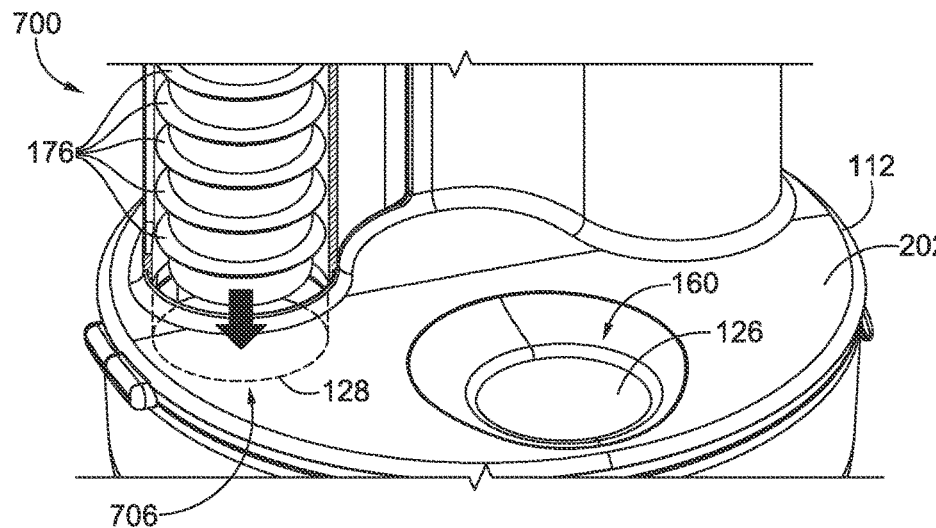

As illustrated in FIG. 7B and continuing with an example automatic feeding operation, the rotary plate 126 rotates until the food pod holder 128 is positioned at a pod-loading position 706 (e.g., first position 706) along the rotation path 702 under the food canister 170. As shown in FIGS. 7A and 7B, a surface of the rotary plate 126 occupies the feeding port 160 while the food pod holder is not positioned under the feeding port 160 along the rotation path 702, thereby maintaining a seal created by the enclosure 112. As described herein, the automatic food dispenser 110 can receive or couple to the food canister 170, which dispenses (e.g., passively dispenses via gravity) a food pod into a rotary plate 126 (not shown) that is disposed underneath the top component 202 of the enclosure 112 of the automatic food dispenser 110. Embodiments of the rotary plate 126 receive the food pod 176 into a food pod holder 128. In one embodiment, the rotary plate 126 maintains an angular velocity that is slow enough to receive the food pod 176 that is gravity-fed from the food canister 170 into the food pod holder 128. In another embodiment, the rotary plate 126 stops or pauses for any suitable time (e.g., 1 second, 3 seconds, 5 seconds, 10 seconds, 30 seconds, 1 minute, and the like or there between) along the rotation path 702 when the food pod holder 128 is under either of the chambers of the food canister 170. In this manner, the food pod holder 128 is given more time to receive the food pod from the food canister 170.

Figure 7C:
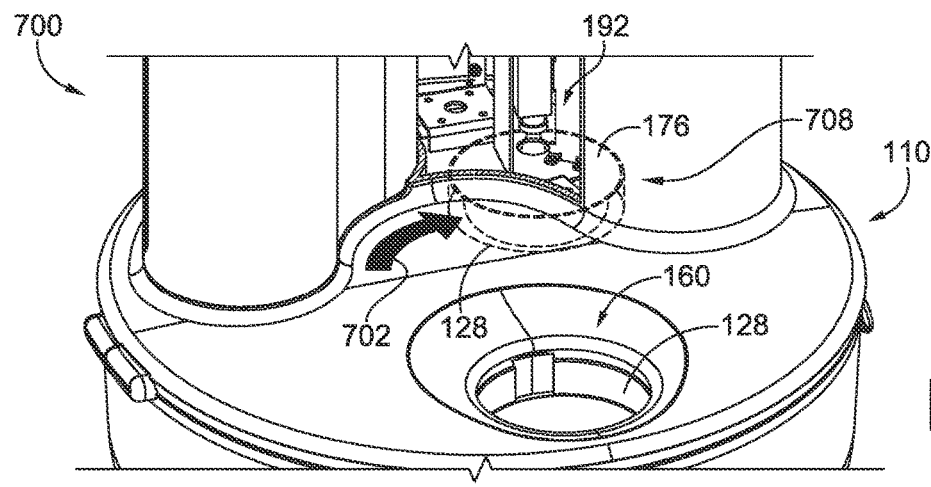

Continuing to FIG. 7C and continuing with an example automatic feeding operation, the rotary plate 126 further rotates until the food pod holder 128 is positioned at a pod authentication position 708 (e.g., second position 708) along the rotation path 702, for example, under or proximate to the pod authentication system 192. In one example, the food pod holder 128 overlaps with at least a portion of the pod authentication system 192 at the pod authentication position 708. In one embodiment, the pod authentication system 192 is enclosed within the enclosure 112 and positioned proximate to the pod authentication position 708 along the rotation path 702. In one embodiment, the rotary plate 126 maintains an angular velocity that is slow enough to allow the pod authentication system 192 to obtain a measurement indicative of a level of authenticity of the food pod 176 positioned within the food pod holder 128. In another embodiment, the rotary plate 126 stops or pauses along the rotation path 702 at the pod authentication position 708. In this manner, the pod authentication system 192 is given more time to receive and communicate to the control system 180 the measurement indicative of a level of authenticity of the food pod 176. In some embodiments, the base rotation motor 121 is actuated to continue to rotate along the rotation path 702 based on authentication of the food pod. However, in some embodiments, the base rotation motor 121 is actuated to continue to rotate along the rotation path 702 despite the food pod 176 not being authenticated.

In some embodiments, the control system 180 associates the inability to authenticate the food pod with an invalidated warranty for the automatic food dispenser 110. In one embodiment, the original purchase terms of the automatic food dispenser define conditions for maintaining a valid warranty, the violation of which results in invalidation or suspension of the warranty. For example, based on the failure of a food pod to satisfy an authenticity metric, a database is updated to indicate a warranty of the automatic food dispenser 110 and the reason for invaliding the warranty (e.g., lack of pod authentication based on a particular measurement taken and also stored in the database). Any other database operation can be performed or entry added, modified, or deleted to indicate a failure to authenticate a corresponding food pod 176. In this manner, the control system 180 can perform any suitable operation based on a failure of a food pod to be authenticated, including causing the warranty to automatically be invalidated for the automatic food dispenser 110 based on the food pod 176 not being authenticated.

Figure 7D:
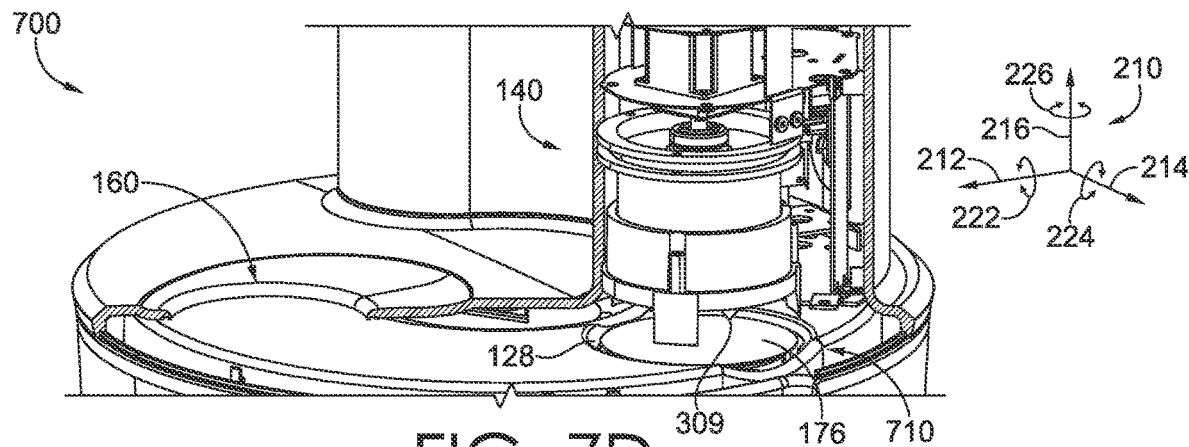

Turning to FIG. 7D and continuing with an example automatic feeding operation, the rotary plate 126 rotates until the food pod holder 128 is positioned at a de-lidding position 710 (e.g., third position 710) along the rotation path 702, for example, under or proximate to the de-lidding mechanism 140. Certain features of the de-lidding mechanism 140 can remain hidden to a user, for example, by operating under the enclosure 112. FIG. 7D depicts a sectional view of a de-lidding mechanism 140. Embodiments of the rotary plate 126 rotate about the first axis 302 until the food pod 176 is coaxially aligned beneath a de-lidding mechanism 140, where the rotary plate 126 stops or pauses so that the food pod 176 is opened by the de-lidding mechanism 140. Embodiments of the de-lidding mechanism 140 automatically remove a top cover (e.g., a lid, seal, or other covering) from the food pod 176. In one example, the top cover of the food pod 176 comprises a foil covering that seals in the pet food contained within the food pod 176, though it is contemplated that the top cover can include any material (e.g., plastic, aluminum, silicon, or rubber).

Figure 7E:
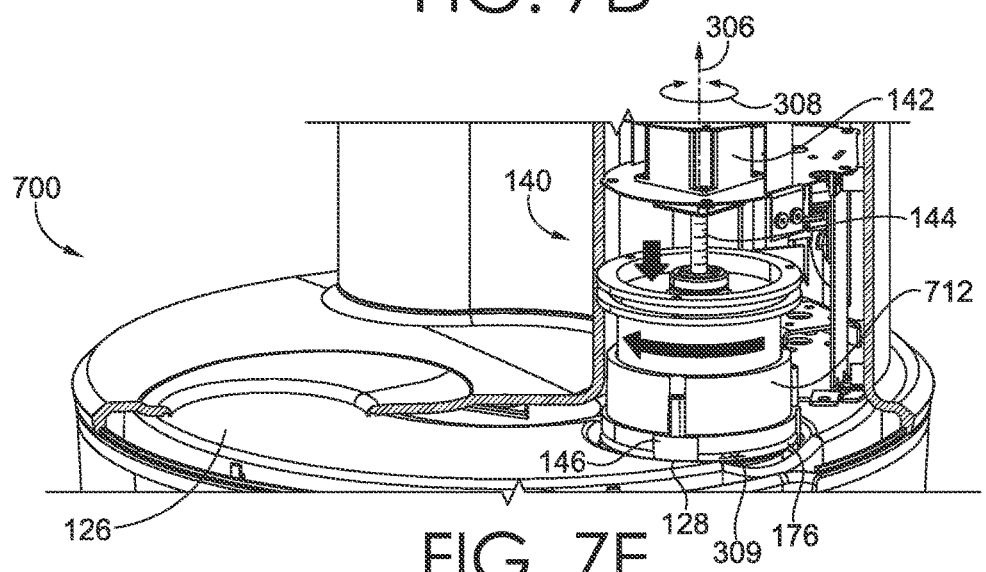

Turning to FIG. 7E and continuing with an example automatic feeding operation, positioned below the illustrated de-lidding mechanism 140 and directly accessible to the cutting module 146 is a sealed or otherwise covered food pod 176 stored in the food pod holder 128. In some embodiments, the cutting module 146 is coupled to a lead screw 144 that rotates with a de-lidding motor 142 to cause the cutting module to selectively and rotatably cut through the top cover of the food pod 176. In some embodiments, the cutting module 146 includes one or more blades 309 that are powered by the de-lidding motor 142. Embodiments of the de-lidding motor 142 are disposed in the de-lidding mechanism 140 and adapted to rotatably cause the cutting module 146 and corresponding blades 309 to cut through the top cover. In some embodiments, based on rotation of the cutting module 146 along a first direction about the second axis, the cutting module 146 descends along the second axis 306 from a raised position down to a cutting position so that the one or more blades 309 can make physical contact with the food pod's 176 top cover. More specifically, the cutting module 146 can be coupled to a lead screw 144 that enables the cutting module 146 to advance downward along the second axis 306 and/or the vertical axis 216 towards the food pod 176 and to a defined cutting depth.

After the one or more blades 309 severs the top cover from the pod, the cutting module 146 can then ascend from the cutting position back to the raised position (e.g., by rotating along screw threads of the lead screw 144). For example, based on rotation of the cutting module 146 along a second direction (e.g., opposite the first direction) about the second axis, the cutting module 146 descends, along the second axis 306, from the lowered cutting position to the raised position so that the one or more blades 309 are above the rotary plate 126 and are not making physical contact with the food pod's 176 top cover. In some embodiments, the rotation path 702 traversed by the food pod holder 128 is orthogonal with a downward path traveled by the cutting module 146 along the second axis 306. For example, rotation of the rotary plate 126 about the first axis 302 transports the food pod 176 along the rotation path 702 on a plane that orthogonally intersects with a downward path traveled by the cutting module 146.

It is contemplated that a predefined number of rotations of the cutting module 146 or the one or more blades 309 can ensure a proper excision of a top cover from a food pod 176, though any means for determining removal of the top cover from the food pod 176 are contemplated. In some further embodiments, the cutting module 146 can include a top cover retention mechanism 712, such as a shroud, adapted to mechanically retain top covers from food pods 176 that have passed through the de-lidding mechanism 140 after the one or more blades 309 excise the top covers from the pods. It should be understood that the top cover retention mechanism 712 can include any suitable mechanism for holding top covers that have been removed from the food pods 176. For example, the top cover retention mechanism 712 includes a spearhead, a hook, a suction device, or other mechanical member oriented to hold the top covers. In another example, the top cover retention mechanism 712 includes a non-mechanical device, such as an electromagnet or hydraulic device capable of exerting a force that exceeds the gravitational force that would otherwise cause the top covers to drop.

Figure 7F:
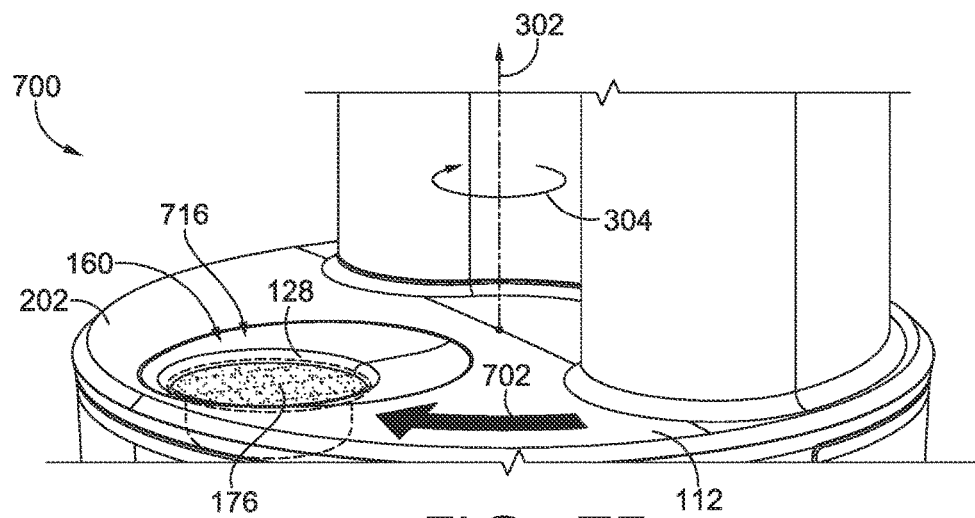

Turning to FIG. 7F and continuing with an example automatic feeding operation, after the top cover is removed from the food pod 176, the rotary plate 126 can continue rotating along the rotation path 702, about the first axis 302, and underneath the top component 202 of the enclosure 112 until the opened food pod 176 (e.g., positioned within the food pod holder 128) is revealed in coaxial alignment with a feeding port 160 disposed along the enclosure 112 of the automatic food dispenser 110. For example, after the food pod 176 has had its top cover removed via the de-lidding mechanism 140, and the rotary plate 126 has rotated so that the opened food pod 176 (and thereby the pet food stored therein) is revealed through feeding port 160. The rotary plate 126 may be configured such that the open food pod 176 (disposed in the food pod holder 128) is presented for consumption via the feeding port 160 when the rotary plate 126 is in a feeding position (or when the food pod holder 128 is in a "6 o'clock" position). In one example, while the food pod holder 128 aligns with the feeding port 160, the food pod holder is at a feeding position 716 (e.g., fourth position 716) along the rotation path 702. In some embodiments, the opened food pod 176 remains exposed to ambient air while positioned beneath the feeding port 160 for a fixed or otherwise defined period of time so that the pet food stored in the opened food pod 176 is accessible for pet consumption.

When the rotary plate 126 is rotated around first axis 302 such that the food pod holder 128 holding the opened food pod 176 is aligned with (e.g., concentric with and below) the feeding port 160, then the automatic food dispenser 110 is in the feeding position. When the automatic food dispenser 110 is in the feeding position, in some certain embodiments, the open food pod 176 is disposed between the feeding port 160 of the enclosure 112 and supported by the stationary plate 150. In one embodiment, the open food pod 176 exposed to the ambient air via the feeding port 160 rests on a weight sensor 250 (FIG. 2B) that is coplanar or rests on the stationary plate 150.

In some embodiments, the weight sensor 250 includes a sensing plate coupled to a load cell or control system 180 (FIG. 1) adapted to calculate a weight of the food pod 176 resting on the sensing plate. The weight calculated via the load cell 630 can be utilized to measure consumption at any time while the food pod 176 is presented for consumption via the feeding port 160. For example, time-stamped weight measurements that have been calculated can be stored in a database or an account associated with a user and/or indexed based on a pet or corresponding feeding schedule. While a weight of the food pod 176 can be known prior to reaching the weight sensor 250, it is contemplated that the weight of the food pod 176 can be calculated throughout its duration on the weight sensor 250 (e.g., from a time it reaches the sensing plate to a time it is rotated away from the sensing plate). In some embodiments, the initial weight of the food pod can be used to authenticate the food pod 176, as discussed herein. In one embodiment, a control signal from the control system 180 is sent to the base rotation motor 121 based on either the period of time expiring or the weight measurement being below the threshold value, for example, whichever is determined first.

Figure 7G:
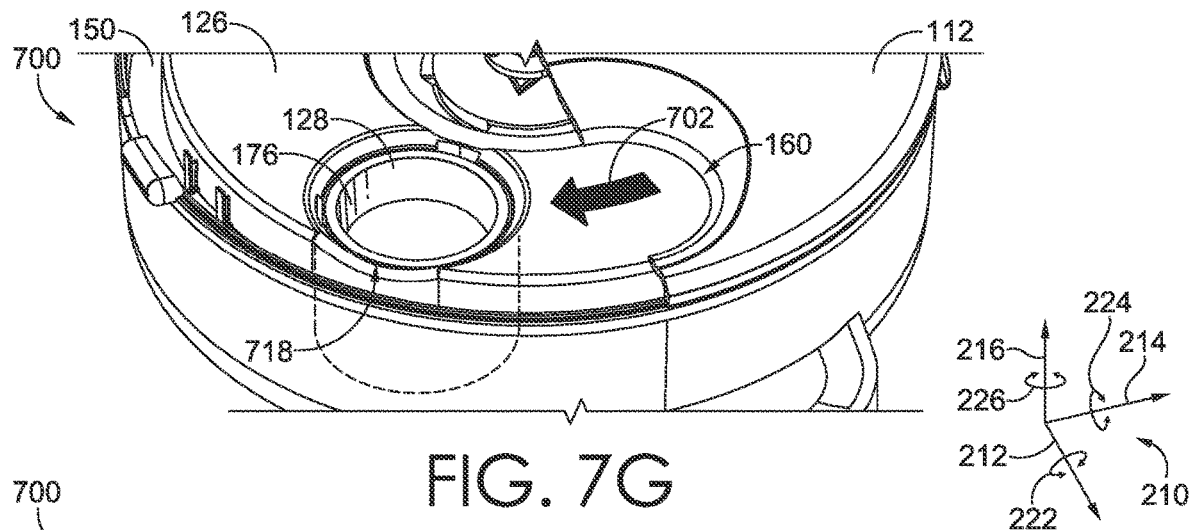

Turning to FIG. 7G and continuing with an example automatic feeding operation, after the defined period of time is expired, or upon receiving (e.g., via a control system 180 of FIG. 1) explicit instructions to proceed with the automatic feeding process, the automatic food dispenser 110 (e.g., base rotation motor 121) activates the rotary plate 126 so that the food pod 176 continues to rotate beneath the enclosure 112. The stationary plate 150 is hidden from view in FIG. 7G because the stationary plate is underneath the rotary plate 126, which is displayed by partially hiding the top component 202 of the enclosure 112. In one embodiment, the rotary plate 126 rotates about the first axis 302 so that the food pod holder 128 transitions from being at the fourth position 716 (FIG. 7F) to being at a pod disposal position 718 (e.g., fifth position 718) along the rotation path 702. While in the pod disposal position 718, the food pod holder 128 aligns with the disposal port 266 (FIG. 1) of the stationary plate 150 (FIG. 1). For example, after the open food pod 176 has been presented for consumption via the feeding port 160 and the rotary plate 126 is moved to the pod disposal position 718.

In some embodiments, the automatic food dispenser 110 rotates the rotary plate 126 so that the food pod holder 128 and the food pod 176 disposed therein is coaxially aligned above the disposal port 266 of the stationary plate 150. In one embodiment, the disposal port 266 corresponds to a disposal port that provides an opening into the disposal compartment 122 through the stationary plate 150 so that when the food pod 176 is moved (e.g., dropped, fed by gravity) into the pod disposal position 718 (e.g., the fifth position), the food pod 176 falls by virtue of its own weight into the retractable or otherwise disposal compartment 122 that includes a plurality of pod chambers 124, as described herein. In some embodiments, the rotary plate 126 stops or temporarily pauses in the pod disposal position 718 (e.g., the fifth position). In some other embodiments, the rotary plate 126 simply passes over the pod disposal position 718 (e.g., the fifth position), as it is returned to the pod-loading position, such that the food pod 176 falls into the retractable or otherwise removable pod chambers 124 of the disposal compartment 122 as the food pod passes over the disposal port 266.

Figure 7H:
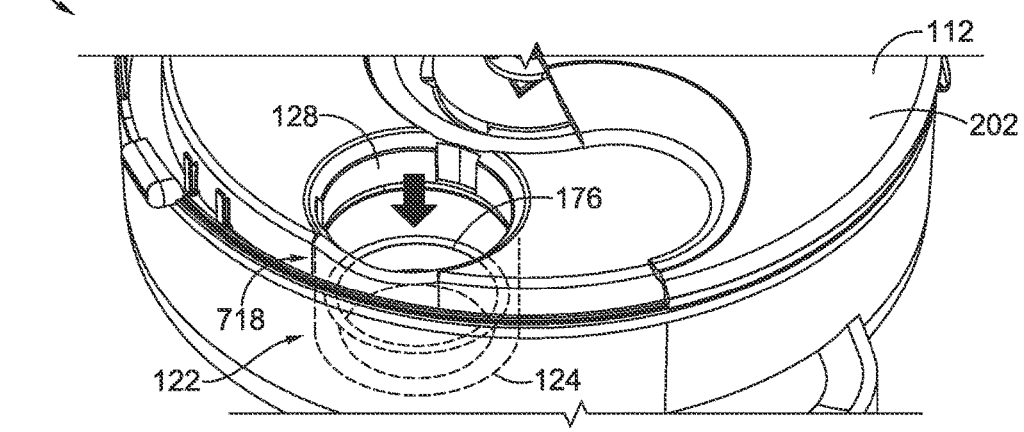

As illustrated in FIG. 7H and continuing with an example automatic feeding operation, while the food pod 176 is at the pod disposal position along the rotation path 702, the food pod 176 drops (e.g., falls or is vertically displaced by gravity) into the disposal compartment 122. In some embodiments, the base of food pod holder 128 is hollow and defined by the stationary plate 150 at the bottom at least during a portion of the rotation path 702, such that any item in the food pod holder 128 contacts the stationary plate 150 while the rotary plate 126 rotates and causes the food pod holder 128 to travel along the rotation path 702. For example, when the food pod 176 is at the pod loading position 706, the pod authentication position 708, the de-lidding position 710, or the feeding position 716, a base of the food pod 176 contacts the stationary plate 150. However, in this example, at the pod disposal position 718, the food pod 176 no longer contacts the stationary plate 150 since the food pod holder coaxially aligns with the disposal port 266. As a result, when the food pod holder 128 is at the pod disposal position 718, the food pod 176 drops (e.g., falls or is vertically displaced by gravity) into a pod chamber 124 within the disposal compartment 122, as shown in FIG. 7H.

Figure 7I:
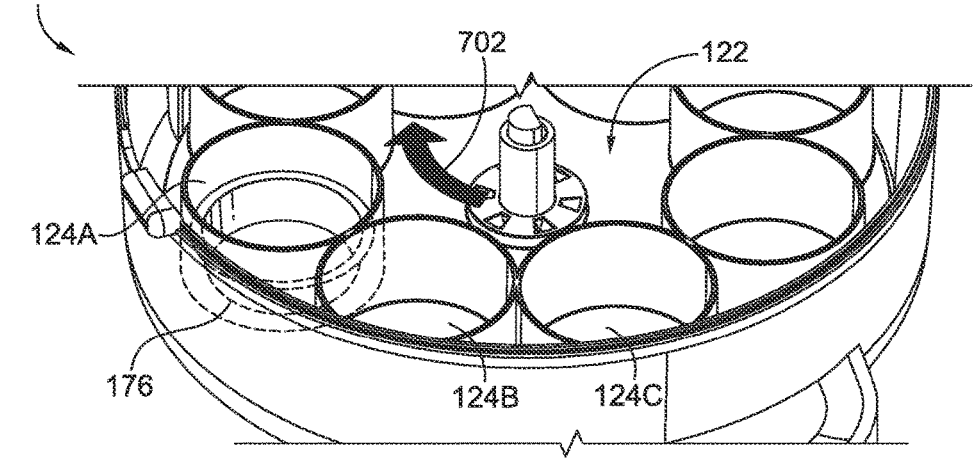
Figure 7J:
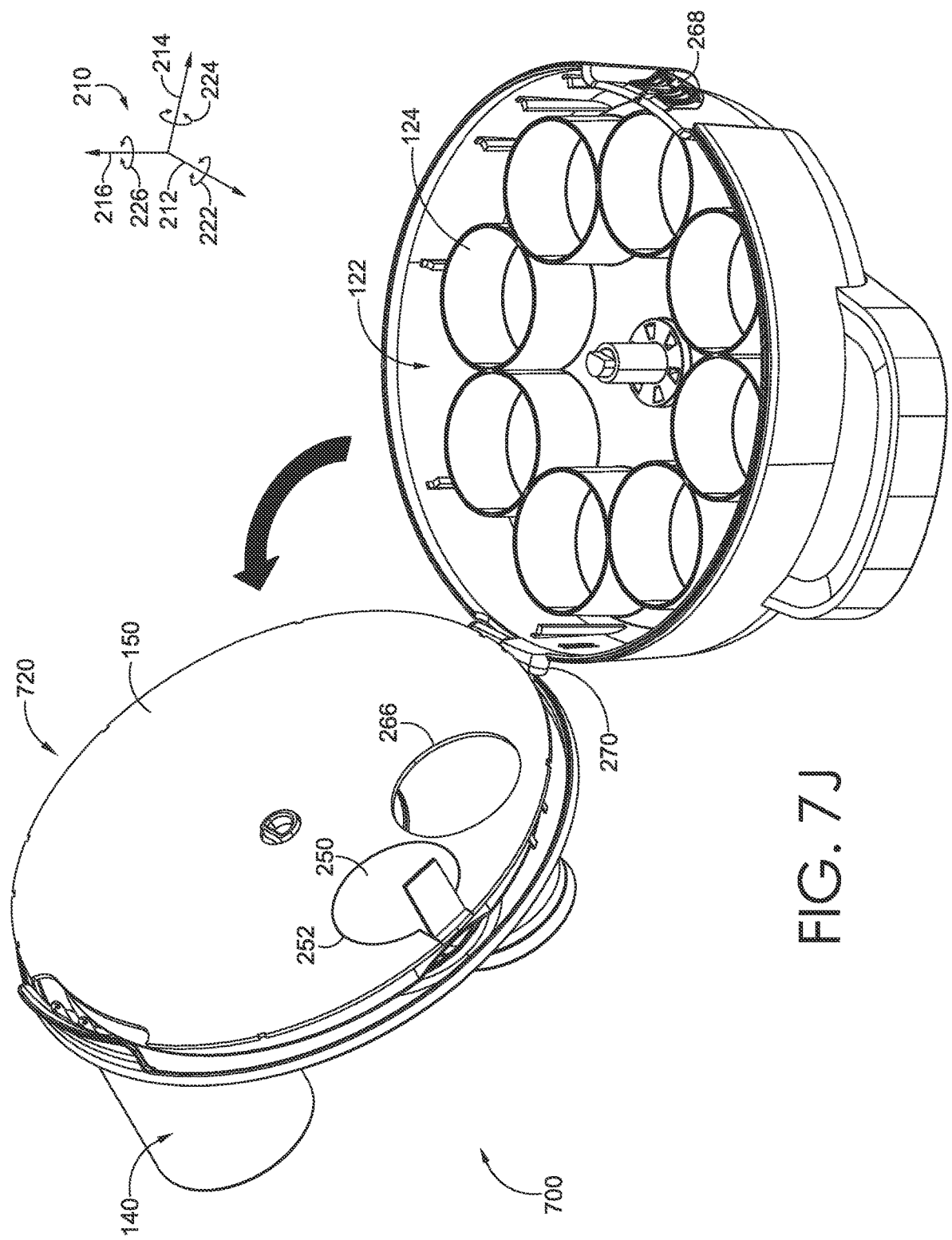
Figure 7K:
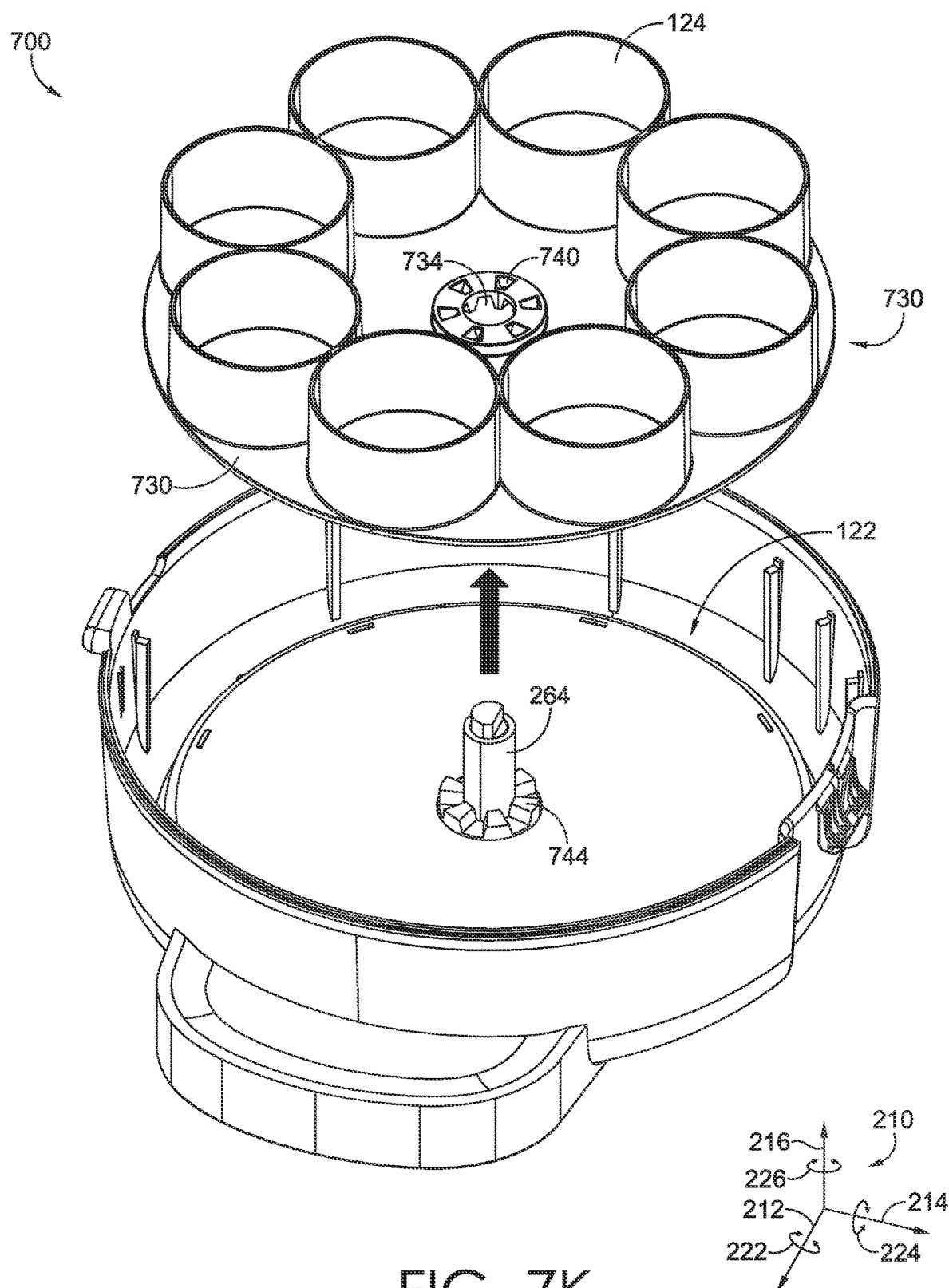

Turning to FIG. 7I and continuing with an example automatic feeding operation, the top component 202 of the enclosure 112, the rotary plate 126, and the stationary plate 150 have been hidden to facilitate illustration of components of the disposal compartment 122. As discussed above, a particular pod chamber 124 receives the used food pod from the food pod holder 128 (FIG. 7H). In some embodiments, motion of the pod chambers 124 is related to motion of the rotary plate 126, both of which are actuatable by the base rotation motor 121 (FIG. 1). For example, the pod chambers 124 and the rotary plate 126 rotate about the first axis 302 based on actuation of the base rotation motor 121. In one embodiment, a gear assembly 125 between the pod chambers 124 and the rotary plate 126 allows the pod chambers 124 and the rotary plate 126 to rotate at different angular velocities despite actuating based on the same base rotation motor 121. For example, the pod chambers rotate about the first axis 302 with a faster or slower angular velocity than the rotary plate 126. In other embodiments, different motors are used to control the pod chambers 124 and the rotary plate 126.

In some embodiments, when the food pod holder 128 is aligned (e.g., coaxially aligned) with the disposal port 266 (omitted from FIG. 7I to facilitate illustration of other components, but examples of the disposal port 266 are illustrated in FIGS. 3B and 7A), a pod chamber 124 also aligns with the disposal port 266. Moving at different angular velocities enables different pod chambers 124 to be coaxially aligned with the disposal port 266 to receive a food pod 176 from the food pod holder 128 via the disposal port 266. For example, during a first rotation, the food pod holder 128 coaxially aligns with the first pod chamber 124A when coaxially aligned with the disposal port at the pod disposal position 718 (e.g., fifth position). Continuing this example, during the next (e.g., second) rotation, the food pod holder 128 coaxially aligns with the second pod chamber 124B when coaxially aligned with the disposal port 266 at the pod disposal position 718. Continuing this example, during the next (e.g., third) rotation, the food pod holder 128 coaxially aligns with the third pod chamber 124C when coaxially aligned with the disposal port at the pod disposal position 718. Although in FIG. 7I the first pod chamber 124 is shown as aligning with the disposal port 266, the sequence of which pod chamber 124 coaxially aligns with the disposal port 266 and the food pod holder 128 is based on the number of pod chambers 124, the size of the disposal port 266, the gear ratio between the rotary plate 126 and the pod chambers 124, and the radius of the rotation path 702, among other factors. In this manner, the used food pods can be disposed of into different pod chambers 124.

The automatic animal feeding system, described in accordance with various embodiments, facilitates disposal of the food pod 176 and at least the partial sealing off of the disposal compartment. By way of example, as the rotary plate 126 continues to rotate and return to the feeding position, a portion (not shown) of the rotary plate 126 moves into a position that begins to cover the disposal port 266 of the stationary plate 150. In one example, when the rotary plate 126 is in the feeding position (e.g., the food pod holder 128 coaxially aligns with the feeding port 160), the portion of the rotary plate 126 that covers the disposal port 266 effectively seals the disposal port 266 from the environment outside of the automatic animal feeding system 700. In this way, the food pod 176 or any pet food remaining therein and disposed of into the disposal compartment 122 (of the retractable or otherwise removable disposal tray containing the pod chamber 124) can be sealed off from the environment, preventing bug access and retaining odors therein. In another embodiment, the stationary plate 150 rotates into a position where the disposal port 266 does not provide an access point to the disposal compartment 122 of the retractable or otherwise removable disposal tray containing the plurality of pod chambers 124.

Turning to FIG. 7J, the illustrated disposal compartment 122 is accessible by engaging the handle lever 268 to release a locking mechanism that allows the top portion 720 of the automatic food dispenser 110 to open. In one embodiment, the automatic food dispenser 110 opens if the power of the automatic food dispenser has been cut off. As illustrated, engaging the handle lever 268 allows the top portion 720 and corresponding parts (e.g., the rotary plate 126, the de-lidding mechanism 140, the stationary plate 150, the weight sensor 250, and/or the food canister 170 to hinge about a hinge point 270 opposite of the handle lever 268 to expose the inside of the automatic food dispenser 110. In this manner, the pod chambers 124 can be emptied or removed from the disposal compartment 122 to dispose of the used food pods 176 (FIG. 1).

For example, as illustrated in FIG. 7K, the pod chambers 124 are part of a pod chamber assembly 730 that allows all the pod chambers 124 (and corresponding used food pods 176) to move as a single unit. The pod chamber assembly 730 may include a base 732 on which the pod chambers 124 are disposed. Embodiments of the base 732 include an opening 734 that aligns with the drive shaft 264. Additionally, the base 732 may include female members 740 that mate with male members 744 of the disposal compartment 122 to rotatably fix the pod chamber assembly 730 to the base of the disposal compartment 122. In some embodiments, the food pods 176 are independent units that are independently removed from the disposal compartment 122, for example, for cleaning purposes. In one embodiment, the base 732 and/or the pod chamber assembly 730 are part of the rotating assembly 120, such that the base 732 and/or the pod chamber assembly 730 rotate about the first axis 302 (FIG. 3) based on a control signal received by the base rotation motor 121.

In some embodiments, certain steps associated with an automatic feeding process are omitted based on the food pod not being authenticated, or a "knockoff" food pod being detected. In one example, certain steps associated with an automatic feeding process are skipped or not performed based on an indication of a failure to authenticate the food pod (e.g., by the pod authentication system 192). In one embodiment, based on the failure to authenticate the food pod, the control system 180 (FIG. 1) causes the automatic feeding process to deviate from the steps illustrated in FIGS. 7A, 7B, 7C, 7D, 7E, 7F, 7G, 7H, 7I, 7J, and 7K. For example, the control system causes certain steps to be omitted, such as sending a control signal to cause the de-lidding mechanism 140 (FIG. 1) to remove a cover from the food pod and/or sending a control signal to cause the rotary plate 126 (FIG. 1) to rotate to align the food pod holder 128 with the feeding port 160. Any other modifications are possible based on a failure to authenticate a food pod 176.

Example Graphical User Interfaces

With reference now to FIGS. 8A, 8B, and 8C, a number of example schematic screenshots from a personal computing device are illustratively depicted, showing aspects of example graphical user interfaces (GUIs) that include presentation of aspects of the embodiments described herein. The example GUIs in FIGS. 8A, 8B, and 8C are determined for a particular user and contextualized for a user, such as is described in connection with the components of the automatic animal feeding systems of FIGS. 1-7K. In some embodiments, a user interacts with GUI controls in FIGS. 8A, 8B, and 8C to control the components of the automatic animal feeding systems of FIGS. 1-7K and implemented an automatic feeding process that is personalized to the user and her/his pet. The screenshots illustrated in FIGS. 8A, 8B, and 8C represent a screenshot captured from a screen display of a computing device, such as user device 102 (FIG. 1). The screenshots can be produced by any number of different computer programs, applications or other displays discussed herein.

With reference now to FIG. 8A, an example schematic screenshot from a personal computing device is illustratively depicted, showing aspects of a first example graphical user interface (GUI) 800 that includes a feeding schedule 802 specific to a pet of the user. In this example, two feeding times are set (e.g., 9:00 AM and 6:00 PM), such that the automatic feeding operation is performed at the two specified times. A user can control the feeding schedule by engaging with any of the illustrated GUI controls. For example, a user engages with the "Add Schedule" control 804 to manually add a new schedule. In some embodiments, the schedules are automatically generated based on data received and processed by the electronics module 179 (FIG. 1). In this manner, feeding can be automatically personalized for a pet based on video captured by the camera assembly 188 (FIG. 1) for example. Additionally, a user can engage with the on/off controls 806 to activate or de-active certain specified times for implementing the automatic feeding process. Other control features can be implemented by example GUI 800, such as those in panel 808.

Turning to FIGS. 8B and 8C, example schematic screenshots from a personal computing device are illustratively depicted, showing aspects of example graphical user interfaces (GUIs) 820 and 840 that include information associated with a particular feeding schedule specific to a pet of the user. In this example, scrolling down from the GUI 820 of FIG. 8B results in the GUI 840 of FIG. 8C.

In this example, the GUI 820 displays a food consumed indication 822 (e.g., determined based on a weight difference measured by the sensor assembly 186 of FIG. 1 or the weight sensor 250 of FIG. 2B), a fill level indication 824 indicative of a number of food pods 176 (FIG. 1) remaining in the food canister 170 (FIG. 1) (e.g., determined based on the number of rotations of the rotary plate 126), a trash level indication 826 indicative of a number of used food pods 176 (FIG. 1) or weight of used food pods 176 inside the disposal compartment 122 (FIG. 1) (e.g., determined based on the number of rotations of the rotary plate 126 or a weight sensor), and a remaining food indication 828 indicative of how much food the user has left. In one embodiment, the remaining food indication 828 is determined based on a user's subscription, the user's prior food purchase, and the amount of food pods that have been consumed. In some embodiments, the GUI 820 displays analytics, such as the percent change in the pet's consumption pattern, feeding activity 830, a status of the automatic food dispenser 110 (FIG. 1) indicating whether the automatic food dispenser is powered on and connected to a network (e.g., internet network). Additionally, the GUIs 820 and 840 include a manual feed control that when selected initiates the automatic feeding process, such as that illustrated in FIG. 7A, 7B, 7C, 7D, 7E, 7F, 7G, 7H, 7I or 9.

Figure 9:
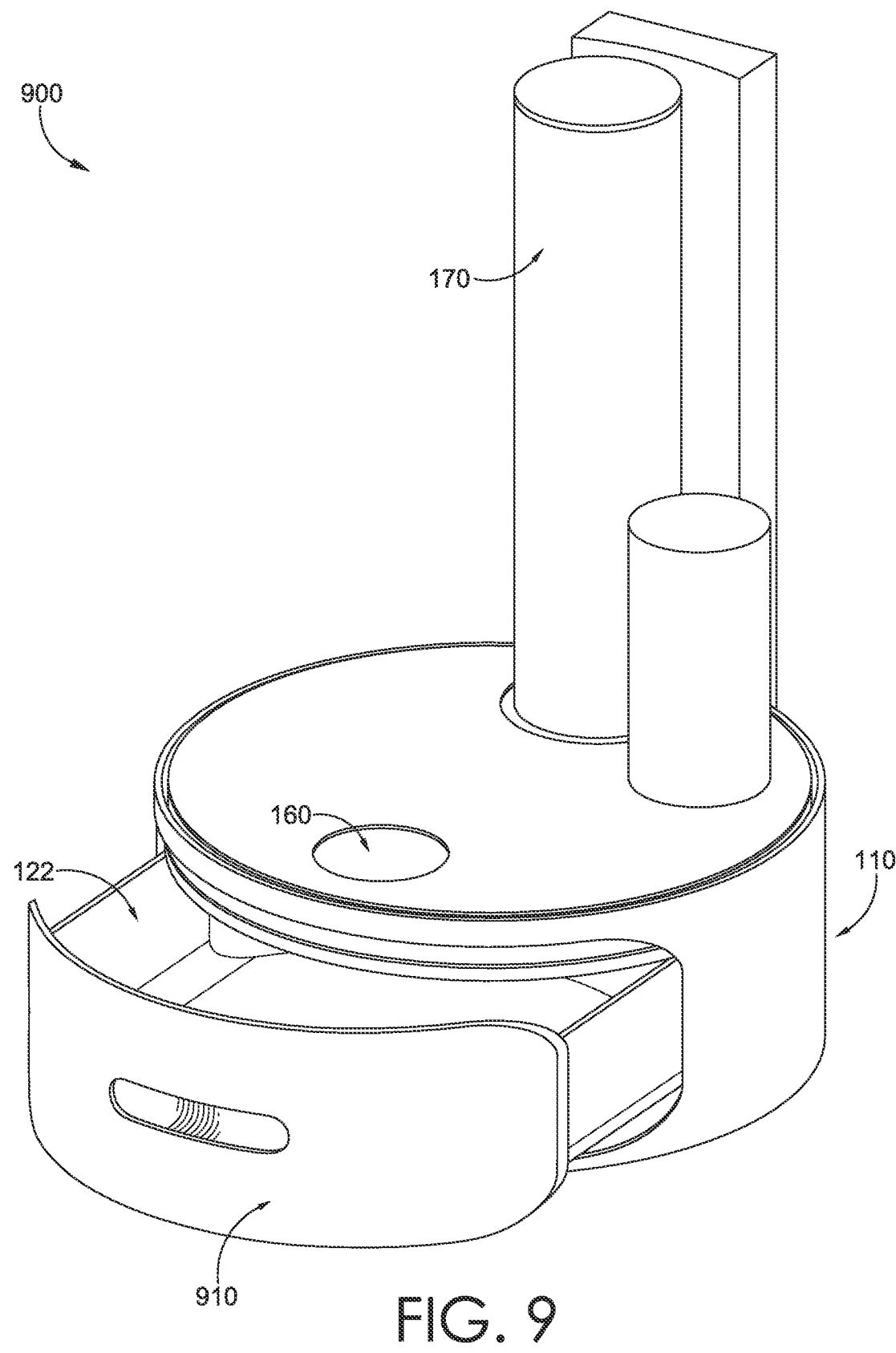
FIG. 9 depicts a perspective view of an automatic animal feeding system with the retractable or otherwise removable disposal tray in an open configuration, in accordance with embodiments of the present disclosure.

Referring now to FIG. 9, the illustration shows the automatic animal feeding system 900 in accordance with various embodiments described herein, particularly with the retractable or otherwise removable disposal tray 910 in an open configuration. In the illustration, a disposal compartment 122 of the retractable or otherwise removable disposal tray 910 is depicted, showing a disposal area in which used pods and excised top covers thereof are disposed of. In some embodiments, a sensor assembly 186 (FIG. 1) or other module can provide a signal (e.g., audible, visible, wireless alert, and so forth) to a user, providing an indication as to when the disposal compartment 122 should be emptied. In some embodiments, the automatic animal feeding system 900 includes an automatic food dispenser 110, one or more processors, and/or logic that monitors and tracks a number of pods utilized from a time the disposal compartment 122 was last emptied. In some further embodiments, the automatic animal feeding system 900 includes a drawer sensor (e.g., switch) employed to determine when the disposal compartment was last opened and/or emptied. In some even further embodiments, the retractable or otherwise removable disposal tray of the disposal compartment 122 employs other sensors that calculate a weight of the disposal compartment to facilitate a determination as to when the disposal compartment should be emptied. It is contemplated that any combination of the above technologies can be utilized to provide a signal to the user as to when the disposal compartment 122 should be emptied.

Example Flow Diagrams Implemented in Accordance with Embodiments Disclosed Herein Turning now to FIGS. 10, 11, 12, 13, 14, and 15, aspects of example process flows 1000, 1100, 1200, 1300, 1400, and 1500 are illustratively depicted for some embodiments of the disclosure. Embodiments of process flows 1000, 1100, 1200, 1300, 1400, and 1500 each comprise a method (sometimes referred to herein as methods 1000, 1100, 1200, 1300, 1400, and 1500) carried out to implement various example embodiments described herein. For instance, at least one of process flows 1000, 1100, 1200, 1300, 1400, and 1500 are performed to implement aspects of the automatic feeding process described herein.

In some embodiments, the blocks or steps of process flows 1000, 1100, 1200, 1300, 1400, and 1500, and other methods described herein, comprise a computing process performed using any combination of hardware, firmware, and/or software. For instance, various functions are carried out by a processor executing instructions stored in memory, such as memory 1712, as described in FIG. 17. Embodiments of the methods can also be embodied as computer-usable instructions stored on computer storage media. Embodiments of the methods are provided by a stand-alone application, a service or hosted service (stand-alone or in combination with another hosted service), or a plug-in to another product, to name a few.

For example, certain blocks of process flows 1000, 1100, 1200, 1300, 1400, and 1500 that correspond to actions (or steps) to be performed (as opposed to information to be processed or acted on) are carried out by one or more computer applications or services, in some embodiments, which operate on the control system 180 (FIG. 1), one or more user devices (such as user device 102 of FIG. 1), servers (such as server 1606 of FIG. 16), and/or are distributed across multiple user devices and/or servers, or by a distributed computing platform, and/or are implemented in the cloud, such as is described in connection with FIG. 18. In some embodiments, the functions performed by the blocks or steps of process flows 1000, 1100, 1200, 1300, 1400, and 1500 are carried out by components described in FIGS. 1-9 or FIGS. 16-18.

Figure 10:
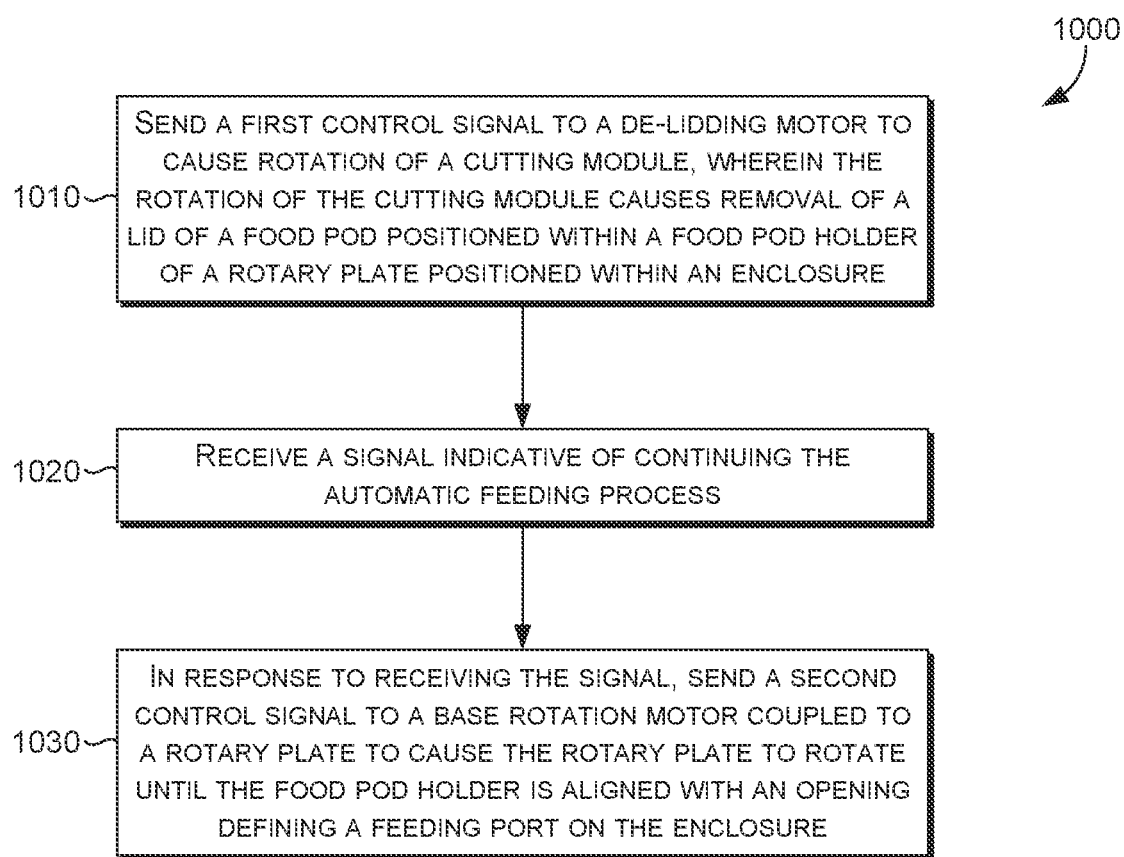
FIG. 10 is a flow diagram of a method for controlling a de-lidding mechanism and a rotary plate of an automatic food dispenser, in accordance with embodiments of the present disclosure.

With reference to FIG. 10, aspects of example process flow 1000 are illustratively provided for controlling a de-lidding mechanism 140 (FIG. 1) and a rotary plate 126 (FIG. 1) of an automatic food dispenser 110 (FIG. 1). Examples of these components are described herein and their features are described herein. At block 1010, process flow 1000 includes sending a first control signal to a de-lidding motor 142 (FIG. 1) to cause rotation of a cutting module 146 (FIG. 1), such that the rotation of the cutting module 146 causes removal of a lid of a food pod 176 (FIG. 1) positioned within a food pod holder 128 (FIG. 1) of a rotary plate 126 (FIG. 1) positioned within an enclosure 112 (FIG. 1). At block 1020, process flow 1000 includes receiving a signal indicative of continuing the automatic feeding process. In one example, the signal indicative of continuing the automatic feeding process comprises an authentication signal indicative of authentication of the food pod 176. An example automatic feeding process is depicted and described with respect to FIGS. 7A, 7B, 7C, 7D, 7E, 7F, 7G, 7H, 7I, 7J, and/or 7K. At block 1030, process flow 1000 includes, in response to receiving the signal, sending a second control signal to a base rotation motor 121 (FIG. 1) coupled to the rotary plate 126 to cause the rotary plate 126 to rotate until the food pod holder 128 is aligned with an opening defining a feeding port 160 (FIG. 1) on the enclosure 112.

Figure 11:
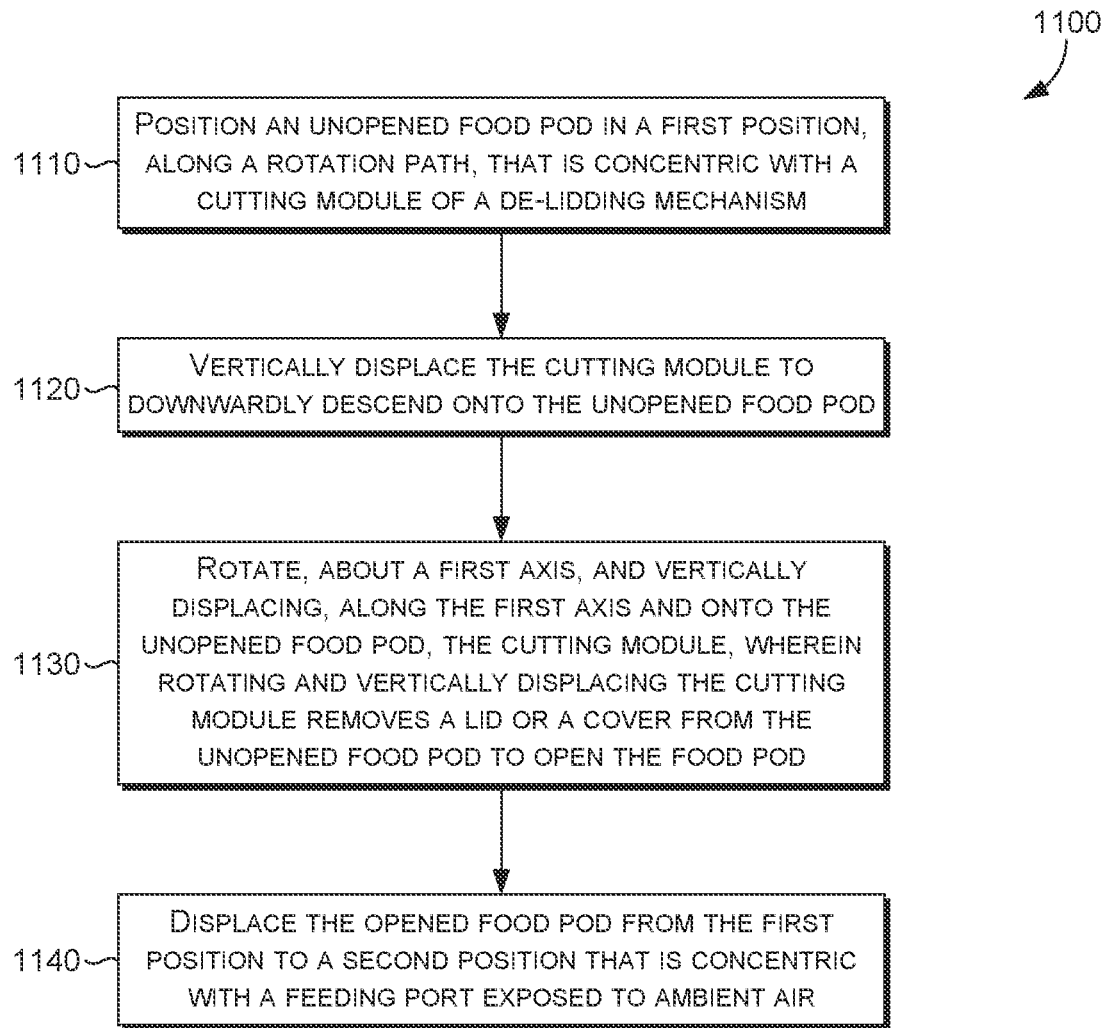
FIG. 11 is a flow diagram of a method for performing aspects of an automatic feeding process including removing a lid from a food pod, in accordance with embodiments of the present disclosure.

With reference to FIG. 11, aspects of example process flow 1100 are illustratively provided for performing aspects of an automatic feeding process, including removing a lid from a food pod 176 (FIG. 1), in accordance with embodiments of the present disclosure. An example automatic feeding process is depicted and described with respect to FIGS. 7A, 7B, 7C, 7D, 7E, 7F, 7G, 7H, 7I, 7J, and/or 7K. At block 1110, process flow 1100 includes positioning an unopened food pod 176 (FIG. 1) in a de-lidding position (in this example, a first position) along a rotation path 702 (FIG. 7) that is concentric with a cutting module 146 (FIG. 1) of a de-lidding mechanism 140 (FIG. 1). At block 1120, process flow 1100 includes vertically displacing the cutting module 146 to downwardly descend onto the unopened food pod 176. At block 1130, process flow 1100 includes rotating, about an axis (e.g., the second axis 306 of FIG. 3), and vertically displacing along the axis and onto the unopened food pod 176, the cutting module 146. In one example, rotating and vertically displacing the cutting module 146 removes a lid or a cover from the unopened food pod 176 to open the food pod 176. At block 1140, process flow 1100 includes displacing the opened food pod from the de-lidding position (in this example, a first position) to a feeding position (in this example, a second position) that is concentric with a feeding port exposed to ambient air.

Figure 12:
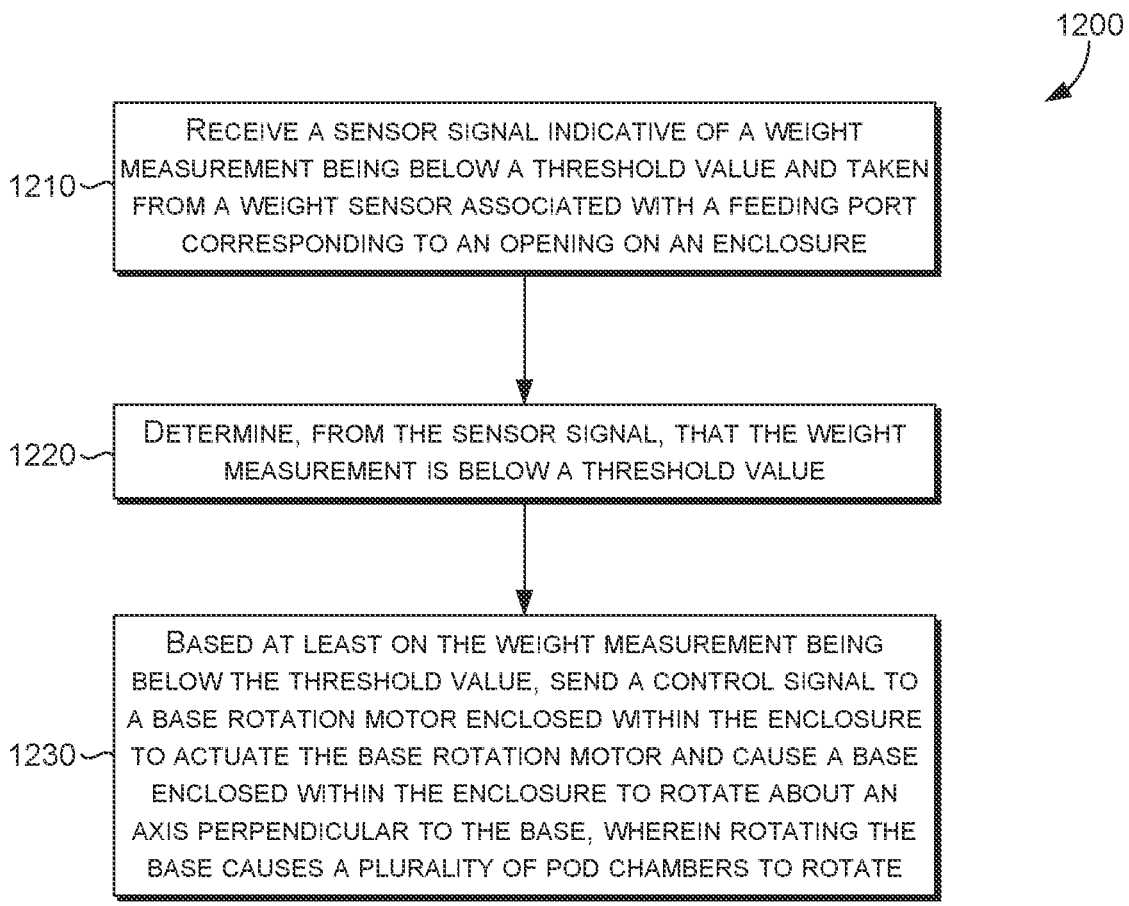
FIG. 12 is a flow diagram of a method for actuating a base rotation motor to rotate at least one component of an automatic food dispenser, in accordance with embodiments of the present disclosure.

With reference to FIG. 12, aspects of example process flow 1200 are illustratively provided for actuating a base rotation motor 121 (FIG. 1) to rotate at least one component of an automatic food dispenser 110 (FIG. 1), in accordance with embodiments of the present disclosure. At block 1210, process flow 1200 includes receiving a sensor signal indicative of a weight measurement being below a threshold value and taken from a weight sensor 250 (FIG. 2B) associated with a feeding port 160 (FIG. 1) corresponding to an opening on an enclosure 112 (FIG. 1). Alternatively or additionally, in some embodiments, a sensor signal indicative of a weight measurement is received from a sensor assembly 186 (FIG. 1) associated with a feeding port 160 (FIG. 1) corresponding to an opening on an enclosure 112 (FIG. 1).

At block 1220, process flow 1200 includes determining, from the sensor signal, that the weight measurement is below a threshold value. At block 1230, process flow 1200 includes, based at least on the weight measurement being below the threshold value, sending a control signal to a base rotation motor 121 enclosed within the enclosure 112 to actuate the base rotation motor 121 and cause a base 732 (or the pod chamber assembly 730) enclosed within the enclosure to rotate about an axis (e.g., the first axis 302 of FIG. 3) perpendicular to the base 732. In one example, rotating the base 732 causes a plurality of pod chambers 124 (FIG. 1) to rotate. Alternatively or additionally, in some embodiments, based at least on the weight measurement being below the threshold value, a control signal is sent to the base rotation motor 121 to actuate the base rotation motor and cause a rotary plate 126 (FIG. 1) enclosed within the enclosure 112 to rotate about the axis.

Figure 13:
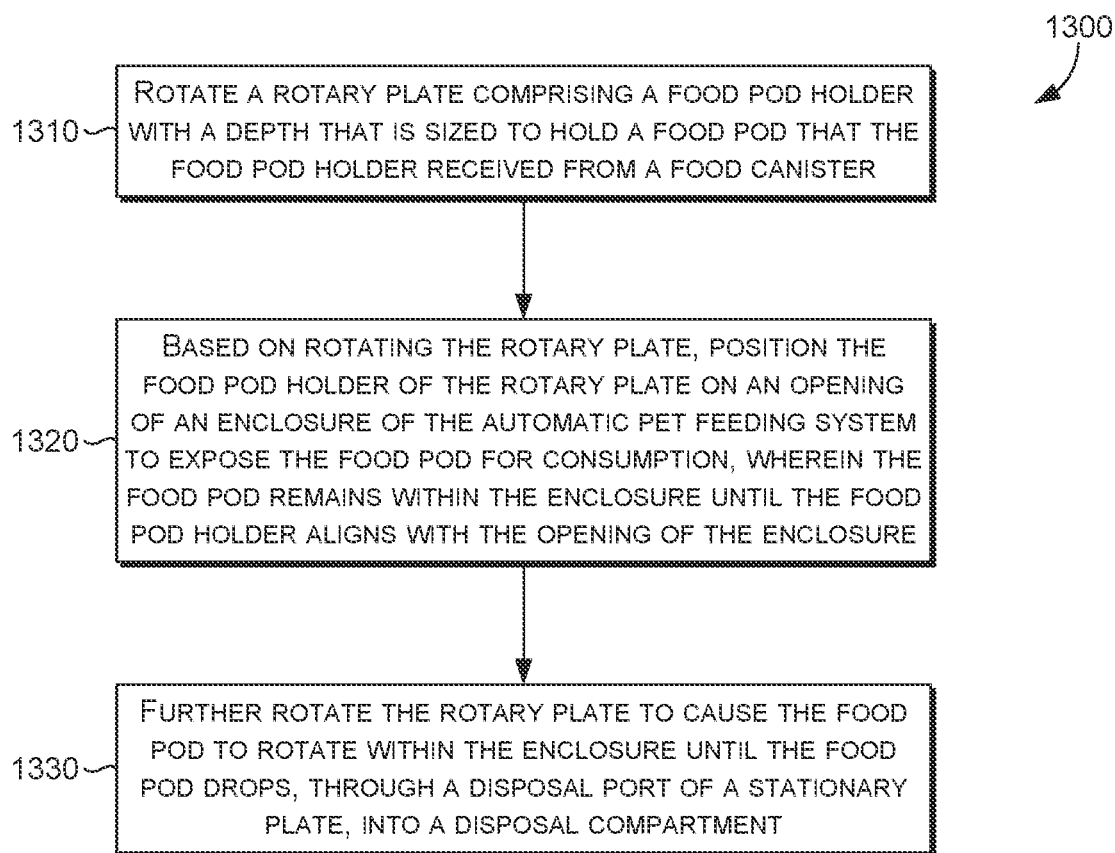
FIG. 13 is a flow diagram of a method for rotating a rotary plate to cause a food pod to drop into a disposal compartment of an automatic food dispenser, in accordance with embodiments of the present disclosure.

With reference to FIG. 13, aspects of example process flow 1300 are illustratively provided for rotating a rotary plate 126 (FIG. 1) to cause a food pod 176 (FIG. 1) to drop into a disposal compartment 122 (FIG. 1) of an automatic food dispenser 110 (FIG. 1), in accordance with embodiments of the present disclosure. At block 1310, process flow 1300 includes rotating the rotary plate 126 comprising a food pod holder 128 (FIG. 1) with a depth that is sized to hold the food pod that the food pod holder received from a food canister 170 (FIG. 1). At block 1320, process flow 1300 includes, based on rotating the rotary plate 126, positioning the food pod holder 128 on an opening of an enclosure 112 (FIG. 1) of the automatic food dispenser 110 to expose the food pod 176 for consumption. The opening of the enclosure 112 may correspond to the feeding port 160 (FIG. 1). In one example, the food pod 176 remains enclosed within the enclosure 112 and not exposed to ambient air until the food pod holder 128 is below and concentric (e.g., aligns) with the opening of the enclosure 112. At block 1330, process flow 1300 includes further rotating the rotary plate 126 to cause the food pod 176 to rotate within the enclosure 112 until the food pod 176 drops, through a disposal port 266 of a stationary plate 150, into the disposal compartment 122.

Figure 14:
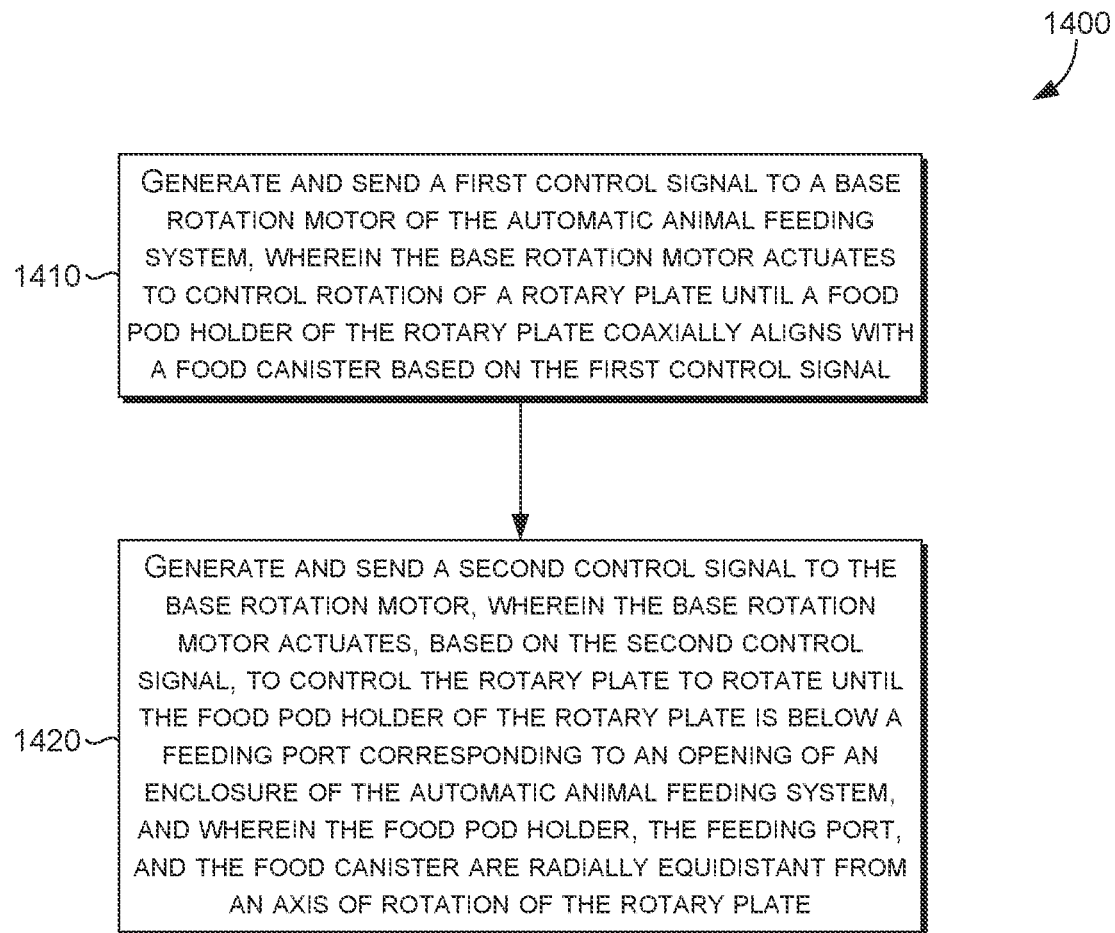
FIG. 14 is a flow diagram of a method for generating and sending control signals to control an automatic feeding process implemented by an automatic food dispenser, in accordance with embodiments of the present disclosure.

With reference to FIG. 14, aspects of example process flow 1400 are illustratively provided for generating and sending control signals to control an automatic feeding process implemented by an automatic food dispenser 110 (FIG. 1), in accordance with embodiments of the present disclosure. At block 1410, process flow 1400 includes generating and sending a first control signal to a base rotation motor 121 (FIG. 1) to cause the base rotation motor to actuate, and in turn, control rotation of a rotary plate 126 (FIG. 1) until a food pod holder 128 (FIG. 1) of the rotary plate coaxially aligns with a food canister 170 (FIG. 1) based on the first control signal. At block 1420, process flow 1400 includes generating and sending a second control signal to the base rotation motor 121 to cause the base rotation motor 121 to actuate and to cause rotation of the rotary plate 126 until the food pod holder 128 is below a feeding port 160 (FIG. 1). In one example, the feeding port 160 corresponds to an opening of an enclosure 112 (FIG. 1) of the automatic food dispenser 110. In one embodiment, the food pod holder, the feeding port, and the food canister are radially equidistant from an axis of rotation (e.g., the first axis 302 of FIG. 3) about which the rotary plate 126 rotates.

Figure 15:
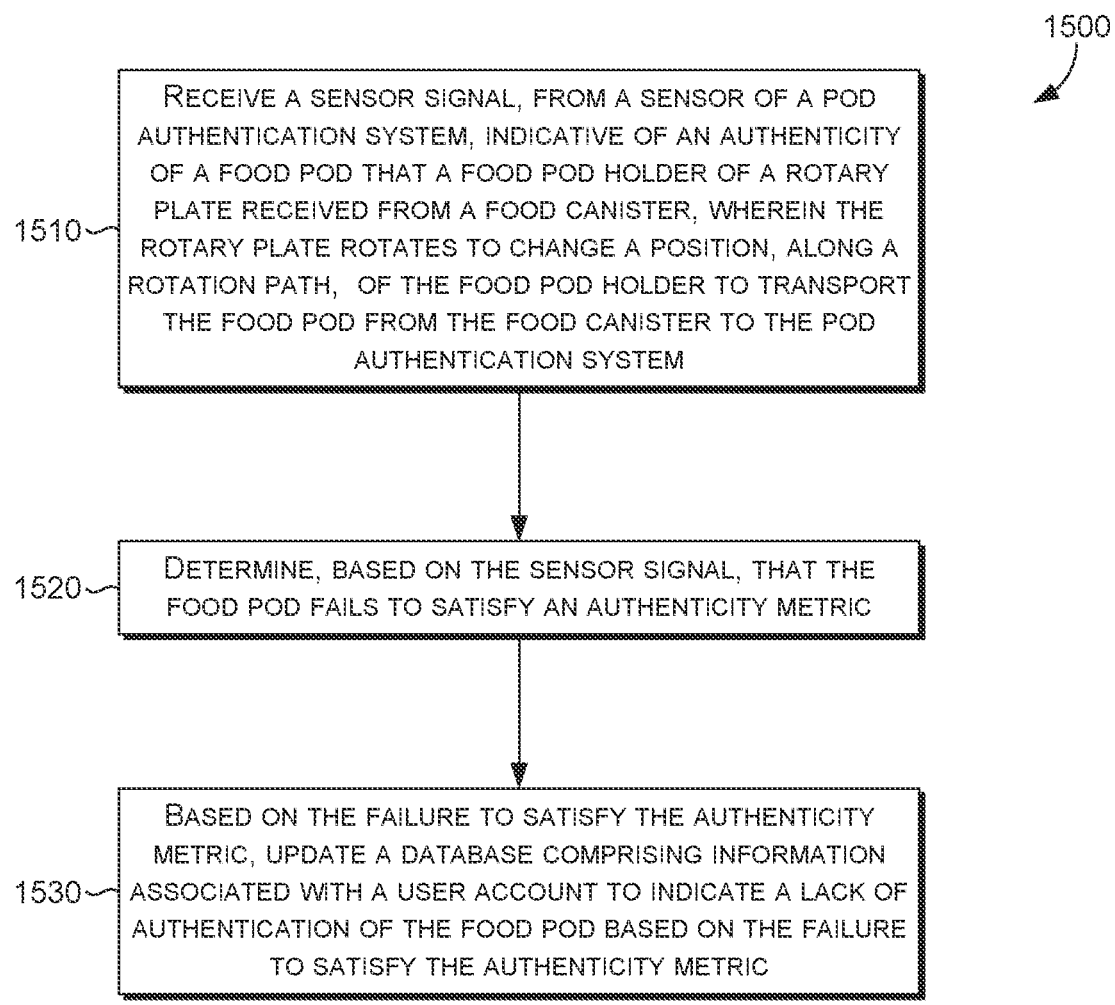
FIG. 15 is a flow diagram of a method for updating a database associated with an automatic animal feeding system based on a failure of a food pod to satisfy an authenticity metric, in accordance with embodiments of the present disclosure.

With reference to FIG. 15, aspects of example process flow 1500 are illustratively provided for updating a database associated with an automatic animal feeding system based on a failure of a food pod 176 (FIG. 1) to satisfy an authenticity metric, in accordance with embodiments of the present disclosure. At block 1510, process flow 1500 includes receiving a sensor signal, from a sensor assembly 186 (FIG. 1) associated with a pod authentication system 192 (FIG. 1), indicative of an authenticity of a food pod 176 that a food pod holder 128 (FIG. 1) of a rotary plate 126 (FIG. 1) received from a food canister 170 (FIG. 1). In one embodiment, the rotary plate 126 rotates to change a position along a rotation path 702 (FIG. 7) of the food pod holder 128 to transport the food pod 176 from the food canister 170 to the pod authentication system 192. At block 1520, process flow 1500 includes determining, based on the sensor signal, that the food pod 176 fails to satisfy an authenticity metric. At block 1530, process flow 1500 includes, based on the failure to satisfy the authenticity metric, updating a database comprising information associated with a user account to indicate a lack of authentication of the food pod based on the failure to satisfy the authenticity metric. In one embodiment, based on the failure to satisfy the authenticity metric, the database is updated to indicate automatic invalidation of a warranty associated with a component of the automatic pet feeding system, such as the automatic food dispenser 110.

Example Operating Environment

Figure 16:
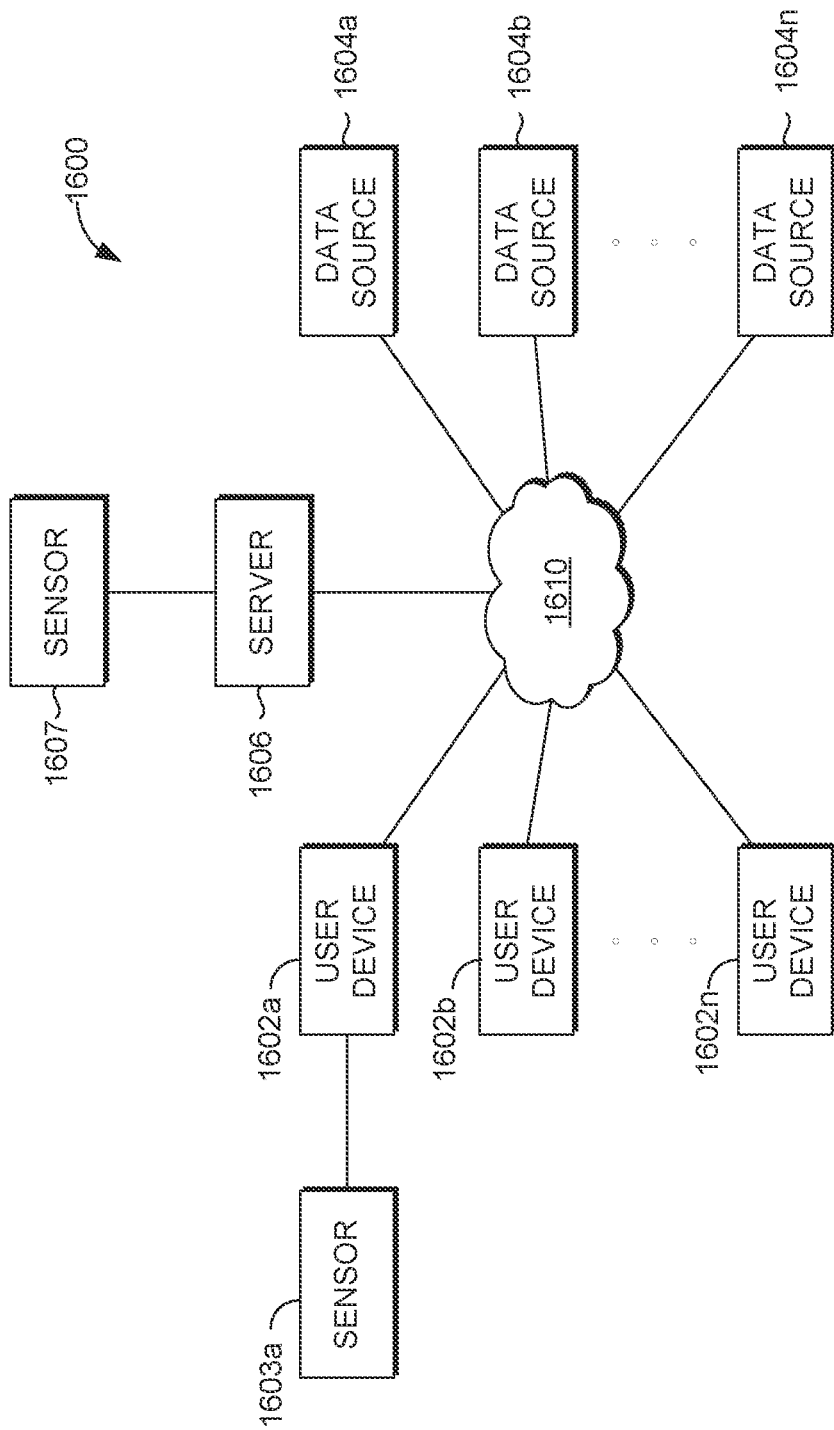
FIG. 16 is a block diagram of an example operating environment suitable for implementations of the present disclosure.

Turning now to FIG. 16, a block diagram is provided showing an example operating environment 1600 in which some embodiments of the present disclosure can be employed. It should be understood that this and other arrangements described herein are set forth only as examples. Other arrangements and elements (for example, machines, interfaces, functions, orders, and groupings of functions) can be used in addition to or instead of those shown, and some elements can be omitted altogether for the sake of clarity. Further, many of the elements described herein are functional entities that are implemented as discrete or distributed components or in conjunction with other components, and in any suitable combination and location. Various functions described herein as being performed by one or more entities are carried out by hardware, firmware, and/or software. For instance, some functions are carried out by a processor executing instructions stored in memory to cause a corresponding control system 180 (FIG. 1) of the automatic food dispenser 110 to perform operations. Operating environment 1600 can be utilized to implement one or more of the components described herein, and/or to implement aspects of methods 1000, 1100, 1200, 1300, 1400, and 1500 in FIGS. 10, 11, 12, 13, 14, and 15, respectively.

Among other components not shown, example operating environment 1600 includes a number of user computing devices, such as user devices 1602a and 1602b through 1602n; a number of data sources, such as data sources 1604a and 1604b through 1604n; server 1606; sensors 1603a and 1607; network 1610; automatic food dispenser 110; and food canister 170. It should be understood that operating environment 1600 shown in FIG. 16 is an example of one suitable operating environment. Each of the components shown in FIG. 16 is implemented via any type of computing device, such as computing device 1700 illustrated in FIG. 17, for example. In one embodiment, these components communicate with each other via network 1610, which include, without limitation, one or more local area networks (LANs) and/or wide area networks (WANs). In one example, network 1610 comprises the internet, intranet, and/or a cellular network, amongst any of a variety of possible public and/or private networks.

It should be understood that any number of user devices, servers, and data sources can be employed within operating environment 1600 within the scope of the present disclosure. Each may comprise a single device or multiple devices cooperating in a distributed environment, such as the distributed computing device 1800 in FIG. 18. For instance, server 1606 is provided via multiple devices arranged in a distributed environment that collectively provide the functionality described herein. Additionally, other components not shown may also be included within the distributed environment.

User devices 1602a and 1602b through 1602n can be client user devices on the client side of operating environment 1600, while server 1606 can be on the server side of operating environment 1600. Server 1606 can comprise server-side software designed to work in conjunction with client-side software on user devices 1602a and 1602b through 1602n so as to implement any combination of the features and functionalities discussed in the present disclosure. This division of operating environment 1600 is provided to illustrate one example of a suitable environment, and there is no requirement for each implementation that any combination of server 1606 and user devices 1602a and 1602b through 1602n remain as separate entities.

In some embodiments, user devices 1602a and 1602b through 1602n comprise any type of computing device capable of use by a user. Example user devices 1602a and 1602b through 1602n include the user device 102 of FIG. 1 and the animal wearable device 104 of FIG. 1. In one embodiment, user devices 1602a and 1602b through 1602n are the type of computing device 1700 described in relation to FIG. 17 herein. By way of example and not limitation, a user device 1602 is embodied as a personal computer (PC), a laptop computer, a mobile device, a smartphone, a smart speaker, a tablet computer, a smart watch, a wearable computer, a personal digital assistant (PDA) device, a virtual-reality (VR) or augmented-reality (AR) device or headset, music player or an MP3 player, an animal wearable device, a global positioning system (GPS) device, a video player, a handheld communication device, a gaming device or system, an entertainment system, a vehicle computer system, an embedded system controller, a camera, a remote control, an appliance, a consumer electronic device, a workstation, any other suitable computer device, or any combination of these delineated devices.

In some embodiments, data sources 1604a and 1604b through 1604n comprise data sources and/or data systems, which are configured to make data available to any of the various constituents of operating environment 1600 or system 200 described in connection to FIG. 2. For instance, in one embodiment, one or more data sources 1604a and 1604b through 1604n provide (or make available for accessing) machine learning models trained to determine information about a pet (e.g., optimal feeding patterns, a mood of the pet, and the like); discrete packages of software for authenticating the food pods; and software modules interpretable by the control system 180 of the automatic food dispenser 110 to implement the automatic feeding process discussed herein. Certain data sources 1604a and 1604b through 1604n are discrete from user devices 1602a and 1602b through 1602n and server 1606 or are incorporated and/or integrated into at least one of those components. In one embodiment, one or more of data sources 1604a and 1604b through 1604n comprise one or more sensors, which are integrated into or associated with one or more of the user device(s) 1602a and 1602b through 1602n or server 1606. Examples of data made available by data sources 1604a and 1604b through 1604n are described further in connection to the user device 102, the animal wearable device 104, the automatic food dispenser 110, and the food canister 170 of FIG. 1.

Example Computing Environments

Having described various implementations, several example environments suitable for implementing embodiments of the disclosure are now described, including an example computing device and an example distributed computing environment in FIGS. 17 and 18, respectively. With reference to FIG. 17, computing device 1700 includes a bus 1710 that directly or indirectly couples the following devices: memory 1712, one or more processors 1714, one or more presentation components 1716, one or more input/output (I/O) ports 1718, one or more I/O components 1720, and an illustrative power supply 1722. In one example, bus 1710 represents one or more buses (such as an address bus, data bus, or combination thereof). Although the various blocks of FIG. 17 are shown with lines for the sake of clarity, in reality, these blocks represent logical, not necessarily actual, components. For example, a presentation component includes a display device, such as an I/O component. Also, processors have memory. The inventors hereof recognize that such is the nature of the art and reiterate that the diagram of FIG. 17 is merely illustrative of an example computing device that can be used in connection with one or more embodiments of the present disclosure. Distinction is not made between such categories as "workstation," "server," "laptop," or "handheld device," as all are contemplated within the scope of FIG. 17 and with reference to "computing device."

Computing device 1700 typically includes a variety of computer-readable media. Computer-readable media can be any available media that can be accessed by computing device 1700 and includes both volatile and non-volatile, removable and non-removable media. By way of example, and not limitation, computer-readable media comprises computer storage media and communication media. Computer storage media includes both volatile and non-volatile, removable and non-removable media implemented in any method or technology for storage of information such as computer-readable instructions, data structures, program modules, or other data. Computer storage media includes, but is not limited to, Random Access Memory (RAM), Read-Only Memory (ROM), Electronically Erasable Programmable Read-Only Memory (EEPROM), flash memory or other memory technology, Compact Disc (CD)-ROM, Digital Versatile Disks (DVDs) or other optical disk storage, magnetic cassettes, magnetic tape, magnetic disk storage or other magnetic storage devices, or any other medium that can be used to store the desired information and which can be accessed by computing device 1700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner so as to encode information in the signal. By way of example, and not limitation, communication media includes wired media, such as a wired network or direct-wired connection, and wireless media, such as acoustic, radio frequency (RF), infrared, and other wireless media. Combinations of any of the above should also be included within the scope of computer-readable media.

Memory 1712 includes computer storage media in the form of volatile and/or non-volatile memory. In one example, the memory is removable, non-removable, or a combination thereof. Hardware devices include, for example, solid-state memory, hard drives, and optical-disc drives. Computing device 1700 includes one or more processors 1714 that read data from various entities such as memory 1712 or I/O components 1720. As used herein and in one example, the term processor or "a processer" refers to more than one computer processor. For example, the term processor (or "a processor") refers to at least one processor, such as a physical or virtual processor, including a computer processor on a virtual machine. In one example, the term processor (or "a processor") refers to a plurality of processors, which are physical or virtual, such as a multiprocessor system, distributed processing or distributed computing architecture, cloud computing system, or parallel processing by more than a single processor. Further, various operations described herein as being executed or performed by a processor are performed by more than one processor.

Presentation component(s) 1716 presents data indications to a user or other device. Presentation components include, for example, a display device, speaker, printing component, vibrating component, and the like.

The I/O ports 1718 allow computing device 1700 to be logically coupled to other devices, including I/O components 1720, some of which are built in. Illustrative components include a microphone, joystick, game pad, satellite dish, scanner, printer, or a wireless device. The I/O components 1720 can provide a natural user interface (NUI) that processes air gestures, voice, or other physiological inputs generated by a user. In some instances, inputs are transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1700. In one example, the computing device 1700 is equipped with depth cameras, such as stereoscopic camera systems, infrared camera systems, RGB (Red-Green-Blue) camera systems, and combinations of these, for gesture detection and recognition. Additionally, embodiments of the computing device 1700 are equipped with accelerometers or gyroscopes that enable detection of motion. The output of the accelerometers or gyroscopes may be provided to the display of the computing device 1700 to render immersive augmented reality or virtual reality.

Some embodiments of computing device 1700 include one or more radio(s) 1724 (or similar wireless communication components). The radio transmits and receives radio or wireless communications. Example computing device 1700 is a wireless terminal adapted to receive communications and media over various wireless networks. Computing device 1700 may communicate via wireless protocols, such as code-division multiple access ("CDMA"), Global System for Mobile ("GSM") communication, or time-division multiple access ("TDMA"), as well as others, to communicate with other devices. In one embodiment, the radio communication is a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (for example, a primary connection and a secondary connection). A short-range connection includes, by way of example and not limitation, a Wi-Fi® connection to a device (for example, mobile hotspot) that provides access to a wireless communications network, such as a wireless local-area network (WLAN) connection using the 802.11 protocol; a Bluetooth connection to another computing device is a second example of a short-range connection, or a near-field communication connection. A long-range connection may include a connection using, by way of example and not limitation, one or more of CDMA, General Packet Radio Service (GPRS), GSM, TDMA, and 802.16 protocols.

Referring now to FIG. 18, an example distributed computing environment 1800 is illustratively provided, in which implementations of the present disclosure can be employed. In particular, FIG. 18 shows a high-level architecture of an example cloud computing platform 1810 that can host a technical solution environment or a portion thereof (for example, a data trustee environment). It should be understood that this and other arrangements described herein are set forth only as examples. For example, as described above, many of the elements described herein are implemented as discrete or distributed components or in conjunction with other components, and in any suitable combination and location. Other arrangements and elements (for example, machines, interfaces, functions, orders, and groupings of functions) can be used in addition to or instead of those shown.

Data centers can support distributed computing environment 1800 that includes cloud computing platform 1810, rack 1820, and node 1830 (for example, computing devices, processing units, or blades) in rack 1820. The technical solution environment can be implemented with cloud computing platform 1810, which runs cloud services across different data centers and geographic regions. Cloud computing platform 1810 can implement the fabric controller

1840 component for provisioning and managing resource allocation, deployment, upgrade, and management of cloud services. Typically, cloud computing platform 1810 acts to store data or run service applications in a distributed manner. Cloud computing platform 1810 in a data center can be configured to host and support operation of endpoints of a particular service application. In one example, the cloud computing platform 1810 is a public cloud, a private cloud, or a dedicated cloud.

Node 1830 can be provisioned with host 1850 (for example, operating system or runtime environment) running a defined software stack on node 1830. Node 1830 can also be configured to perform specialized functionality (for example, computer nodes or storage nodes) within cloud computing platform 1810. Node 1830 is allocated to run one or more portions of a service application of a tenant. A tenant can refer to a customer utilizing resources of cloud computing platform 1810. Service application components of cloud computing platform 1810 that support a particular tenant can be referred to as a multi-tenant infrastructure or tenancy. The terms "service application," "application," or "service" are used interchangeably with regards to FIG. 18, and broadly refer to any software, or portions of software, that run on top of or access storage and computing device locations within a datacenter.

When more than one separate service application is being supported by nodes 1830, certain nodes 1830 are partitioned into virtual machines (for example, virtual machine 1852 and virtual machine 1854). Physical machines can also concurrently run separate service applications. The virtual machines or physical machines can be configured as individualized computing environments that are supported by resources 1860 (for example, hardware resources and software resources) in cloud computing platform 1810. It is contemplated that resources can be configured for specific service applications. Further, each service application may be divided into functional portions such that each functional portion is able to run on a separate virtual machine. In cloud computing platform 1810, multiple servers may be used to run service applications and perform data storage operations in a cluster. In one embodiment, the servers perform data operations independently but exposed as a single device, referred to as a cluster. Each server in the cluster can be implemented as a node.

In some embodiments, client device 1880 is linked to a service application in cloud computing platform 1810. Client device 1880 may be any type of computing device, such as user device 102*n* described with reference to FIG. 1, and the client device 1880 can be configured to issue commands to cloud computing platform 1810. In embodiments, client device 1880 communicates with service applications through a virtual Internet Protocol (IP) and load balancer or other means that direct communication requests to designated endpoints in cloud computing platform 1810. Certain components of cloud computing platform 1810 communicate with each other over a network (not shown), which includes, without limitation, one or more local area networks (LANs) and/or wide area networks (WANs).

Additional Structural and Functional Features of Embodiments of Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components can be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions) can be used in addition to or instead of those shown.

Certain embodiments described in the paragraphs below are combined with one or more of the specifically described alternatives. In particular, an embodiment that is claimed may contain a reference, in the alternative, to more than one other embodiment. The embodiment that is claimed may specify a further limitation of the subject matter claimed.

For purposes of this disclosure, "substantially," when used to describe a level of similarity, generally refers to a group of elements sharing a degree of similarity. For example, a first axis of rotation substantially oriented parallel to a second axis of rotation indicates that the first axis of rotation has at least a level of similarity regarding their respective orientations (expressed as a percentage, ratio, threshold number, and so forth, such as 50%, 60%, 70%, 80%, 90%, 100% and the like). To further clarify, in one example, a first axis of rotation is substantially oriented parallel to a second axis of rotation when the first axis of rotation is 90 degrees from a horizontal surface and the second axis is 75, 80, 85, 88, 89, 90, 91, 95, 100, and 105 degrees from a horizontal surface.

For purposes of this disclosure, the word "including" has the same broad meaning as the word "comprising," and the word "accessing" comprises "receiving," "referencing," or "retrieving." Furthermore, the word "communicating" has the same broad meaning as the word "receiving" or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

As used herein and in one example, the term "set" refers to an ordered (i.e., sequential) or an unordered (i.e., non-sequential) collection of objects (or elements), such as machines (for example, computer devices), physical and/or logical addresses, graph nodes, graph edges, functionalities, and the like. As used herein, a set may include N elements, where N is any positive integer. For example, a set includes 1, 2, 3, . . . N objects and/or elements, where N is a positive integer with no upper bound. Therefore, as used herein, a set does not include a null set (i.e., an empty set), that includes no elements (for example, N=0 for the null set). A set may include only a single element. In other embodiments, a set includes a number of elements that is greater than one, two, three, or billions of elements. For example, a set is an infinite set or a finite set. The objects included in some sets are discrete objects (for example, the set of natural numbers N). The objects included in other sets are continuous objects (for example, the set of real numbers R). In some embodiments, "a set of objects" that is not a null set of the objects is interchangeably referred to as either "one or more objects" or "at least one object," where the term "object" stands for any object or element included in a set. Accordingly, example phrases such as "one or more objects" and "at least one object" are employed interchangeably to refer to a set of objects that is not the null or empty set of objects. A set of objects that includes at least two of the objects may be referred to as "a plurality of objects."

As used herein and in one example, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, suppose set A and set B are equal sets, and set B is referred to as a subset of set A. In such an example, set A is also referred to as a subset of set B. Two sets may be disjointed sets if the intersection between the two sets is the null set.

As used herein and in one example, the terms "application" or "app" are employed interchangeably to refer to any software-based program, package, or product that is executable via one or more (physical or virtual) computing machines or devices. An application may be any set of software products that, when executed, provide an end user one or more computational and/or data services. In some embodiments, an application refers to a set of applications that may be executed together to provide the one or more computational and/or data services. The applications included in a set of applications may be executed serially, in parallel, or any combination thereof. The execution of multiple applications (comprising a single application) may be interleaved. For example, suppose an application includes a first application and a second application. An execution of the application may include the serial execution of the first and second applications or a parallel execution of the first and second applications. In other embodiments, the execution of the first and second applications is interleaved.

For purposes of a detailed discussion above, embodiments of the present disclosure are described with reference to a computing device or a distributed computing environment; however the computing device and distributed computing environment depicted herein are non-limiting examples. Moreover, the terms computer system and computing system may be used interchangeably herein, such that a computer system is not limited to a single computing device, nor does a computing system require a plurality of computing devices. Rather, various aspects of the embodiments of this disclosure may be carried out on a single computing device or a plurality of computing devices, as described herein. Additionally, components can be configured for performing novel aspects of embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. An automatic pet feeding system that implements an automatic feeding process, the automatic pet feeding system comprising:
    a rotary plate positioned within an enclosure, configured to rotate about an axis, and comprising a food pod holder positioned a radial distance away from the axis, wherein the food pod holder corresponds to a vertical opening extending along a height of the rotary plate; and
    a food canister comprising:
        at least two chambers each positioned the radial distance away from the axis, wherein each chamber is configured to hold a plurality of vertically stacked food pods; and
        a handle coupled to a rod extending along a height of the food canister in between the at least two chambers, wherein the rod comprises a food canister base blade, wherein turning the handle causes the food canister base blade to rotate along the rotary plate to selective lock or unlock the food canister from the enclosure and to selectively expose a food pod of the plurality of vertically stacked food pods to the rotary plate, wherein aligning the food pod holder below the food canister at the radial distance causes the food pod to drop from the food canister into the food pod holder, and wherein the food pod holder is configured to at least partially secure the food pod during at least a portion of the automatic feeding process.

2. The automatic pet feeding system of claim 1, wherein the food canister comprises a locking mechanism engageable to selectively remove the food canister from the enclosure of the automatic pet feeding system.

3. The automatic pet feeding system of claim 1, wherein the food canister comprises a lid comprising the handle configured to hinge about a first axis and rotate about a second axis to selectively unlock the food canister from the enclosure by rotating the food canister base blade forming a base of the food canister, wherein the food canister base blade allows the food pod to drop when the food canister is in a first orientation, wherein the food canister base blade prevents the food pod from dropping out of the food canister when the food canister is in a second orientation.

4. The automatic pet feeding system of claim 1, wherein the food pod holder coaxially aligns with a feeding port on the enclosure, wherein the feeding port coaxially aligns with the food pod holder, such that the feeding port and the food pod holder are equidistant from the axis.

5. The automatic pet feeding system of claim 1, comprising a base rotation motor actuatable to cause rotation of the rotary plate, wherein the enclosure and the food canister do not rotate with the rotary plate based on the actuation of the base rotation motor.

6. The automatic pet feeding system of claim 1, further comprising a control system, the control system comprising:
    one or more processors; and computer memory having computer-readable instructions embodied thereon, that, when executed by at least one processor of the one or more processors, causes the control system to:
  generate and send a first control signal causing a base rotation motor to actuate to cause the rotary plate to rotate until the food pod holder of the rotary plate is positioned under the food canister, and
  generate a second control signal causing the base rotation motor to actuate to cause the rotary plate to rotate until the food pod holder of the rotary plate is below a feeding port that coaxially aligns with the food pod holder.

7. The automatic pet feeding system of claim 1, wherein the food pod is unopened the food pod drops from the food canister into the food pod holder of the rotary plate.

8. The automatic pet feeding system of claim 1, wherein the food pod positioned within the food canister contacts a surface of the rotary plate until the food pod falls into the food pod holder of the rotary plate.

9. The automatic pet feeding system of claim 1, further comprising:
  a base within the enclosure and having a plurality of pod chambers, the base being rotatable about a center point, wherein the food pod holder and each pod chamber of the plurality of pod chambers are radially equidistant from the center point.

10. The automatic pet feeding system of claim 9, wherein the rotary plate is configured to rotate at a different angular velocity than the base based on a gear ratio between the rotary plate and the base, wherein the gear ratio is defined by a gear assembly.

11. The automatic pet feeding system of claim 1, wherein the food pod positioned within the food canister contacts a top surface of the rotary plate as the rotary plate rotates and until the food pod holder is directly below the food canister at the radial distance at which point the food pod is gravity fed from the food canister into the food pod holder.

* * * * *